United States Patent
Lee et al.

(10) Patent No.: US 12,486,304 B2
(45) Date of Patent: Dec. 2, 2025

(54) PEPTIDE LIGAND TARGETING CARBONIC ANHYDRASE IX, PEPTIDE CONSTRUCT COMPRISING SAME, AND USES THEREOF

(71) Applicant: C-BIOMEX CO., LTD., Gyeongsangbuk-do (KR)

(72) Inventors: Song Gil Lee, Gyeongsangbuk-do (KR); Hye Sook Ha, Gyeongsangbuk-do (KR); Jin Hwi Park, Gyeongsangbuk-do (KR); Se Won Kim, Seoul (KR); Yoo Joung Oh, Gyeongsangbuk-do (KR); Seo Hyun Park, Gyeongsangbuk-do (KR); Shin Young Park, Gyeongsangbuk-do (KR); Jun Hoe Cha, Seoul (KR)

(73) Assignee: C-BIOMEX CO., LTD., Gyeongsangbuk-do (KR)

( * ) Notice: Subject to any disclaimer, the term of this patent is extended or adjusted under 35 U.S.C. 154(b) by 0 days.

(21) Appl. No.: 18/289,027

(22) PCT Filed: Feb. 10, 2023

(86) PCT No.: PCT/KR2023/001951
§ 371 (c)(1),
(2) Date: Oct. 31, 2023

(87) PCT Pub. No.: WO2023/153847
PCT Pub. Date: Aug. 17, 2023

(65) Prior Publication Data
US 2024/0327464 A1    Oct. 3, 2024

(30) Foreign Application Priority Data
Feb. 11, 2022    (KR) .................. 10-2022-0018467

(51) Int. Cl.
C07K 7/64          (2006.01)
A61K 47/64         (2017.01)
A61K 49/00         (2006.01)
A61K 51/08         (2006.01)
A61P 35/00         (2006.01)
C07K 1/107         (2006.01)

(52) U.S. Cl.
CPC .............. C07K 7/64 (2013.01); A61K 47/64 (2017.08); A61K 49/0056 (2013.01); A61K 51/088 (2013.01); A61P 35/00 (2018.01); C07K 1/1077 (2013.01)

(58) Field of Classification Search
CPC ........ C07K 7/64; C07K 1/1077; A61K 47/64; A61K 49/0056; A61K 51/088; A61P 35/00
USPC .................................................. 424/1.69
See application file for complete search history.

(56) References Cited

U.S. PATENT DOCUMENTS

| 2011/0045603 | A1* | 2/2011 | Guo ............... G01N 33/6842 436/501 |
| 2021/0154334 | A1 | 5/2021 | Guan et al. |
| 2022/0062433 | A1 | 3/2022 | Zhang et al. |

FOREIGN PATENT DOCUMENTS

| CN | 111183146 | | 5/2020 | |
| KR | 20170093248 | A | 8/2017 | |
| KR | 20180136567 | A | 12/2018 | |
| KR | 20200114854 | A | 10/2020 | |
| WO | WO-2023111350 | A2 * | 6/2023 | ............. A61K 38/10 |

OTHER PUBLICATIONS

Feng et al. BioMol Concepts 2016; 7(3): 179-187. (Year: 2016).*
"Hypothetical protein LEMA_P001240.1 [Plenodomus lingam JN3]", NCBI Reference Sequence: XP_003844816.1, 2 pages.
PCT International Search Report and Written Opinion in PCT/KR2023/001951 dated May 12, 2023, 12 pages.
Sethi, Kalyan K., et al., "Carbonic anhydrase inhibitors: synthesis and inhibition of the human carbonic anhydrase isoforms I, II, IX, and XII with benzene sulfonamides incorporating 4,5,6,7-tetrabromophthalimide moiety", Bioorganic & Medicinal chemistry, 2014, vol. 22, pp. 1586-1595.
English translation of Notification of Reasons for Rejection in JP Patent Application No. 2023-563929, Mailing Date Nov. 19, 2024, 5 pages.
Notification of Reasons for Rejection in JP Patent Application No. 2023-563929, Mailing Date Nov. 19, 2024, 4 pages.
Reymond, M. T., et al., "Truncated, Branched, and/or Cyclic Analogues of Neuropeptide Y: Importance of the Pancreatic Peptide Fold in the Design of Specific Y2 Receptor Ligands", Journal of Medicinal Chemistry, 1992, vol. 35 pp. 3653-3659.

* cited by examiner

*Primary Examiner* — Michael G. Hartley
*Assistant Examiner* — Sean R Donohue
(74) *Attorney, Agent, or Firm* — SERVILLA WHITNEY LLC

(57) ABSTRACT

The present invention relates to a peptide ligand that specifically binds to carbonic anhydrase IX (CAIX), a peptide construct comprising the ligand, and a use thereof. The CAIX-binding peptide ligand of the present invention includes D-amino acids, so it is stable in the body and has high binding specificity to CAIX. And the linear or cyclic CAIX-binding peptide construct comprising the ligand can bind to CAIX with high affinity in the body. Therefore, it is useful for diagnosis, prevention, suppression or treatment of diseases mediated by CAIX.

18 Claims, 40 Drawing Sheets
Specification includes a Sequence Listing.

Change amino acid residues of No. 35 to L-form

No. 35 where all amino acid residues are composed of D-form

Change amino acid residues of No. 35 to L-form

No. 35 where all amino acid residues are composed of D-form

SEQUENCE LISTING

```
Sequence total quantity: 44
SEQ ID NO: 1              moltype = AA  length = 7
FEATURE                   Location/Qualifiers
REGION                    1..7
                          note = Synthetic Polypeptide
REGION                    1..7
                          note = MISC_FEATURE - L-amino acid residue or D-amino acid
                           residue
source                    1..7
                          mol_type = protein
                          organism = synthetic construct
SEQUENCE: 1
RAHKHYH                                                                   7

SEQ ID NO: 2              moltype = AA  length = 7
FEATURE                   Location/Qualifiers
REGION                    1..7
                          note = Synthetic Polypeptide
REGION                    1..7
                          note = MISC_FEATURE - L-amino acid residue or D-amino acid
                           residue
source                    1..7
```

```
                              mol_type = protein
                              organism = synthetic construct
SEQUENCE: 2
HRKHDDN                                                                      7

SEQ ID NO: 3                  moltype = AA   length = 7
FEATURE                       Location/Qualifiers
REGION                        1..7
                              note = Synthetic Polypeptide
REGION                        1..7
                              note = MISC_FEATURE - L-amino acid residue or D-amino acid
                               residue
source                        1..7
                              mol_type = protein
                              organism = synthetic construct
SEQUENCE: 3
AYYRKKW                                                                      7

SEQ ID NO: 4                  moltype = AA   length = 7
FEATURE                       Location/Qualifiers
REGION                        1..7
                              note = Synthetic Polypeptide
REGION                        1..7
                              note = MISC_FEATURE - L-amino acid residue or D-amino acid
                               residue
source                        1..7
                              mol_type = protein
                              organism = synthetic construct
SEQUENCE: 4
RRLLFSG                                                                      7

SEQ ID NO: 5                  moltype = AA   length = 7
FEATURE                       Location/Qualifiers
REGION                        1..7
                              note = Synthetic Polypeptide
REGION                        1..7
                              note = MISC_FEATURE - L-amino acid residue or D-amino acid
                               residue
source                        1..7
                              mol_type = protein
                              organism = synthetic construct
SEQUENCE: 5
RRFHFTH                                                                      7

SEQ ID NO: 6                  moltype = AA   length = 7
FEATURE                       Location/Qualifiers
REGION                        1..7
                              note = Synthetic Polypeptide
REGION                        1..7
                              note = MISC_FEATURE - L-amino acid residue or D-amino acid
                               residue
source                        1..7
                              mol_type = protein
                              organism = synthetic construct
SEQUENCE: 6
FHSRRDV                                                                      7

SEQ ID NO: 7                  moltype = AA   length = 7
FEATURE                       Location/Qualifiers
REGION                        1..7
                              note = Synthetic Polypeptide
REGION                        1..7
                              note = MISC_FEATURE - L-amino acid residue or D-amino acid
                               residue
source                        1..7
                              mol_type = protein
                              organism = synthetic construct
SEQUENCE: 7
VLRNKSD                                                                      7

SEQ ID NO: 8                  moltype = AA   length = 7
FEATURE                       Location/Qualifiers
REGION                        1..7
                              note = Synthetic Polypeptide
REGION                        1..7
                              note = MISC_FEATURE - L-amino acid residue or D-amino acid
                               residue
source                        1..7
                              mol_type = protein
```

```
                       organism = synthetic construct
SEQUENCE: 8
RSRHFHY                                                                7

SEQ ID NO: 9           moltype = AA  length = 7
FEATURE                Location/Qualifiers
REGION                 1..7
                       note = Synthetic Polypeptide
REGION                 1..7
                       note = MISC_FEATURE - L-amino acid residue or D-amino acid
                        residue
source                 1..7
                       mol_type = protein
                       organism = synthetic construct
SEQUENCE: 9
FHRIKHL                                                                7

SEQ ID NO: 10          moltype = AA  length = 7
FEATURE                Location/Qualifiers
REGION                 1..7
                       note = Synthetic Polypeptide
REGION                 1..7
                       note = MISC_FEATURE - L-amino acid residue or D-amino acid
                        residue
source                 1..7
                       mol_type = protein
                       organism = synthetic construct
SEQUENCE: 10
RITAINY                                                                7

SEQ ID NO: 11          moltype = AA  length = 7
FEATURE                Location/Qualifiers
REGION                 1..7
                       note = Synthetic Polypeptide
REGION                 1..7
                       note = MISC_FEATURE - L-amino acid residue or D-amino acid
                        residue
source                 1..7
                       mol_type = protein
                       organism = synthetic construct
SEQUENCE: 11
YHKHIRQ                                                                7

SEQ ID NO: 12          moltype = AA  length = 7
FEATURE                Location/Qualifiers
REGION                 1..7
                       note = Synthetic Polypeptide
REGION                 1..7
                       note = MISC_FEATURE - L-amino acid residue or D-amino acid
                        residue
source                 1..7
                       mol_type = protein
                       organism = synthetic construct
SEQUENCE: 12
HFVKKFR                                                                7

SEQ ID NO: 13          moltype = AA  length = 7
FEATURE                Location/Qualifiers
REGION                 1..7
                       note = Synthetic Polypeptide
REGION                 1..7
                       note = MISC_FEATURE - L-amino acid residue or D-amino acid
                        residue
source                 1..7
                       mol_type = protein
                       organism = synthetic construct
SEQUENCE: 13
FFKRKHE                                                                7

SEQ ID NO: 14          moltype = AA  length = 7
FEATURE                Location/Qualifiers
REGION                 1..7
                       note = Synthetic Polypeptide
REGION                 1..7
                       note = MISC_FEATURE - L-amino acid residue or D-amino acid
                        residue
source                 1..7
                       mol_type = protein
                       organism = synthetic construct
```

```
SEQUENCE: 14
HGHLFKR                                                                    7

SEQ ID NO: 15           moltype = AA  length = 7
FEATURE                 Location/Qualifiers
REGION                  1..7
                        note = Synthetic Polypeptide
REGION                  1..7
                        note = MISC_FEATURE - L-amino acid residue or D-amino acid
                          residue
source                  1..7
                        mol_type = protein
                        organism = synthetic construct
SEQUENCE: 15
RFHHFRN                                                                    7

SEQ ID NO: 16           moltype = AA  length = 7
FEATURE                 Location/Qualifiers
REGION                  1..7
                        note = Synthetic Polypeptide
REGION                  1..7
                        note = MISC_FEATURE - L-amino acid residue or D-amino acid
                          residue
source                  1..7
                        mol_type = protein
                        organism = synthetic construct
SEQUENCE: 16
RLSKFHS                                                                    7

SEQ ID NO: 17           moltype = AA  length = 7
FEATURE                 Location/Qualifiers
REGION                  1..7
                        note = Synthetic Polypeptide
REGION                  1..7
                        note = MISC_FEATURE - L-amino acid residue or D-amino acid
                          residue
source                  1..7
                        mol_type = protein
                        organism = synthetic construct
SEQUENCE: 17
YETFRTR                                                                    7

SEQ ID NO: 18           moltype = AA  length = 7
FEATURE                 Location/Qualifiers
REGION                  1..7
                        note = Synthetic Polypeptide
REGION                  1..7
                        note = MISC_FEATURE - L-amino acid residue or D-amino acid
                          residue
source                  1..7
                        mol_type = protein
                        organism = synthetic construct
SEQUENCE: 18
RRFRHYH                                                                    7

SEQ ID NO: 19           moltype = AA  length = 7
FEATURE                 Location/Qualifiers
REGION                  1..7
                        note = Synthetic Polypeptide
REGION                  1..7
                        note = MISC_FEATURE - L-amino acid residue or D-amino acid
                          residue
source                  1..7
                        mol_type = protein
                        organism = synthetic construct
MOD_RES                 3
                        note = 3-(1-naphthyl)-D-alanine
SITE                    3
                        note = D-alanine
SEQUENCE: 19
RRXRHKH                                                                    7

SEQ ID NO: 20           moltype = AA  length = 7
FEATURE                 Location/Qualifiers
REGION                  1..7
                        note = Synthetic Polypeptide
REGION                  1..7
                        note = MISC_FEATURE - L-amino acid residue or D-amino acid
                          residue
```

```
source                       1..7
                             mol_type = protein
                             organism = synthetic construct
SEQUENCE: 20
HYHRFRR                                                                    7

SEQ ID NO: 21                moltype = AA  length = 7
FEATURE                      Location/Qualifiers
REGION                       1..7
                             note = Synthetic Polypeptide
REGION                       1..7
                             note = MISC_FEATURE - L-amino acid residue or D-amino acid
                              residue
source                       1..7
                             mol_type = protein
                             organism = synthetic construct
MOD_RES                      2
                             note = 2,3,4,5,6-Pentafluoro-D-phenylalanine
SITE                         2
                             note = D-phenylalanine
SEQUENCE: 21
HXHRFRR                                                                    7

SEQ ID NO: 22                moltype = AA  length = 7
FEATURE                      Location/Qualifiers
REGION                       1..7
                             note = Synthetic Polypeptide
REGION                       1..7
                             note = MISC_FEATURE - L-amino acid residue or D-amino acid
                              residue
source                       1..7
                             mol_type = protein
                             organism = synthetic construct
MOD_RES                      2
                             note = 4-amino-D-phenylalanine
SITE                         2
                             note = D-phenylalanine
SEQUENCE: 22
HXHRFRR                                                                    7

SEQ ID NO: 23                moltype = AA  length = 7
FEATURE                      Location/Qualifiers
REGION                       1..7
                             note = Synthetic Polypeptide
REGION                       1..7
                             note = MISC_FEATURE - L-amino acid residue or D-amino acid
                              residue
source                       1..7
                             mol_type = protein
                             organism = synthetic construct
MOD_RES                      2
                             note = 3-(1-naphthyl)-D-alanine
SITE                         2
                             note = D-alanine
SEQUENCE: 23
HXHRFRR                                                                    7

SEQ ID NO: 24                moltype = AA  length = 7
FEATURE                      Location/Qualifiers
REGION                       1..7
                             note = Synthetic Polypeptide
REGION                       1..7
                             note = MISC_FEATURE - L-amino acid residue or D-amino acid
                              residue
source                       1..7
                             mol_type = protein
                             organism = synthetic construct
MOD_RES                      2
                             note = (R)-3-([1,1'-biphenyl]-4-yl)-2-aminopropanoic acid
SEQUENCE: 24
HXHRFRR                                                                    7

SEQ ID NO: 25                moltype = AA  length = 7
FEATURE                      Location/Qualifiers
REGION                       1..7
                             note = Synthetic Polypeptide
REGION                       1..7
                             note = MISC_FEATURE - L-amino acid residue or D-amino acid
                              residue
```

```
source                      1..7
                            mol_type = protein
                            organism = synthetic construct
MOD_RES                     5
                            note = 2,3,4,5,6-Pentafluoro-D-phenylalanine
SITE                        5
                            note = D-phenylalanine
SEQUENCE: 25
HYHRXRR                                                                      7

SEQ ID NO: 26               moltype = AA  length = 7
FEATURE                     Location/Qualifiers
REGION                      1..7
                            note = Synthetic Polypeptide
REGION                      1..7
                            note = MISC_FEATURE - L-amino acid residue or D-amino acid
                             residue
source                      1..7
                            mol_type = protein
                            organism = synthetic construct
MOD_RES                     5
                            note = 4-amino-D-phenylalanine
SITE                        5
                            note = D-phenylalanine
SEQUENCE: 26
HYHRXRR                                                                      7

SEQ ID NO: 27               moltype = AA  length = 7
FEATURE                     Location/Qualifiers
REGION                      1..7
                            note = Synthetic Polypeptide
REGION                      1..7
                            note = MISC_FEATURE - L-amino acid residue or D-amino acid
                             residue
source                      1..7
                            mol_type = protein
                            organism = synthetic construct
MOD_RES                     5
                            note = 3-(1-naphthyl)-D-alanine
SITE                        5
                            note = D-alanine
SEQUENCE: 27
HYHRXRR                                                                      7

SEQ ID NO: 28               moltype = AA  length = 7
FEATURE                     Location/Qualifiers
REGION                      1..7
                            note = Synthetic Polypeptide
REGION                      1..7
                            note = MISC_FEATURE - L-amino acid residue or D-amino acid
                             residue
source                      1..7
                            mol_type = protein
                            organism = synthetic construct
MOD_RES                     5
                            note = (R)-3-([1,1'-biphenyl]-4-yl)-2-aminopropanoic acid
SEQUENCE: 28
HYHRXRR                                                                      7

SEQ ID NO: 29               moltype = AA  length = 5
FEATURE                     Location/Qualifiers
REGION                      1..5
                            note = Synthetic Polypeptide
REGION                      1..5
                            note = MISC_FEATURE - L-amino acid residue or D-amino acid
                             residue
source                      1..5
                            mol_type = protein
                            organism = synthetic construct
SEQUENCE: 29
RRFRY                                                                        5

SEQ ID NO: 30               moltype = AA  length = 5
FEATURE                     Location/Qualifiers
REGION                      1..5
                            note = Synthetic Polypeptide
REGION                      1..5
                            note = MISC_FEATURE - L-amino acid residue or D-amino acid
                             residue
```

```
source                  1..5
                        mol_type = protein
                        organism = synthetic construct
MOD_RES                 3
                        note = 3-(1-naphthyl)-D-alanine
SITE                    3
                        note = D-alanine
SEQUENCE: 30
RRXRY                                                                        5

SEQ ID NO: 31           moltype = AA   length = 5
FEATURE                 Location/Qualifiers
REGION                  1..5
                        note = Synthetic Polypeptide
REGION                  1..5
                        note = MISC_FEATURE - L-amino acid residue or D-amino acid
                         residue
source                  1..5
                        mol_type = protein
                        organism = synthetic construct
SEQUENCE: 31
RRFRK                                                                        5

SEQ ID NO: 32           moltype = AA   length = 5
FEATURE                 Location/Qualifiers
REGION                  1..5
                        note = Synthetic Polypeptide
REGION                  1..5
                        note = MISC_FEATURE - L-amino acid residue or D-amino acid
                         residue
source                  1..5
                        mol_type = protein
                        organism = synthetic construct
MOD_RES                 3
                        note = 3-(1-naphthyl)-D-alanine
SITE                    3
                        note = D-alanine
SEQUENCE: 32
RRXRK                                                                        5

SEQ ID NO: 33           moltype = AA   length = 5
FEATURE                 Location/Qualifiers
REGION                  1..5
                        note = Synthetic Polypeptide
REGION                  1..5
                        note = MISC_FEATURE - L-amino acid residue or D-amino acid
                         residue
source                  1..5
                        mol_type = protein
                        organism = synthetic construct
SITE                    3
                        note = D-alanine
MOD_RES                 3
                        note = 3-(1-naphthyl)-D-alanine
SEQUENCE: 33
ERXRK                                                                        5

SEQ ID NO: 34           moltype = AA   length = 5
FEATURE                 Location/Qualifiers
REGION                  1..5
                        note = Synthetic Polypeptide
REGION                  1..5
                        note = MISC_FEATURE - L-amino acid residue or D-amino acid
                         residue
source                  1..5
                        mol_type = protein
                        organism = synthetic construct
MOD_RES                 3
                        note = 3-(1-naphthyl)-D-alanine
SITE                    3
                        note = D-alanine
SEQUENCE: 34
RRXEK                                                                        5

SEQ ID NO: 35           moltype = AA   length = 5
FEATURE                 Location/Qualifiers
REGION                  1..5
                        note = Synthetic Polypeptide
REGION                  1..5
```

```
                            note = MISC_FEATURE - L-amino acid residue or D-amino acid
                             residue
source                      1..5
                            mol_type = protein
                            organism = synthetic construct
MOD_RES                     3
                            note = D-homophenylalanine
SITE                        3
                            note = D-homophenylalanine
SEQUENCE: 35
RRXRY                                                                               5

SEQ ID NO: 36               moltype = AA  length = 5
FEATURE                     Location/Qualifiers
REGION                      1..5
                            note = Synthetic Polypeptide
REGION                      1..5
                            note = MISC_FEATURE - L-amino acid residue or D-amino acid
                             residue
source                      1..5
                            mol_type = protein
                            organism = synthetic construct
MOD_RES                     3
                            note = 3-(1-naphthyl)-D-alanine
SITE                        3
                            note = D-alanine
SEQUENCE: 36
ERXEK                                                                               5

SEQ ID NO: 37               moltype = AA  length = 5
FEATURE                     Location/Qualifiers
REGION                      1..5
                            note = Synthetic Polypeptide
REGION                      1..5
                            note = MISC_FEATURE - L-amino acid residue or D-amino acid
                             residue
source                      1..5
                            mol_type = protein
                            organism = synthetic construct
SEQUENCE: 37
YRFRR                                                                               5

SEQ ID NO: 38               moltype = AA  length = 5
FEATURE                     Location/Qualifiers
REGION                      1..5
                            note = Synthetic Polypeptide
REGION                      1..5
                            note = MISC_FEATURE - L-amino acid residue or D-amino acid
                             residue
source                      1..5
                            mol_type = protein
                            organism = synthetic construct
SEQUENCE: 38
YEFRR                                                                               5

SEQ ID NO: 39               moltype = AA  length = 5
FEATURE                     Location/Qualifiers
REGION                      1..5
                            note = Synthetic Polypeptide
REGION                      1..5
                            note = MISC_FEATURE - L-amino acid residue or D-amino acid
                             residue
source                      1..5
                            mol_type = protein
                            organism = synthetic construct
SEQUENCE: 39
YRFER                                                                               5
```

```
SEQ ID NO: 40            moltype = AA  length = 5
FEATURE                  Location/Qualifiers
REGION                   1..5
                         note = Synthetic Polypeptide
REGION                   1..5
                         note = MISC_FEATURE - L-amino acid residue or D-amino acid
                          residue
source                   1..5
                         mol_type = protein
                         organism = synthetic construct
SEQUENCE: 40
YRFRE                                                                       5

SEQ ID NO: 41            moltype = AA  length = 5
FEATURE                  Location/Qualifiers
REGION                   1..5
                         note = Synthetic Polypeptide
REGION                   1..5
                         note = MISC_FEATURE - L-amino acid residue or D-amino acid
                          residue
source                   1..5
                         mol_type = protein
                         organism = synthetic construct
MOD_RES                  3
                         note = 3-(1-naphthyl)-D-alanine
SITE                     3
                         note = D-alanine
SEQUENCE: 41
KRXRR                                                                       5

SEQ ID NO: 42            moltype = AA  length = 5
FEATURE                  Location/Qualifiers
REGION                   1..5
                         note = Synthetic Polypeptide
REGION                   1..5
                         note = MISC_FEATURE - L-amino acid residue or D-amino acid
                          residue
SITE                     3
                         note = D-alanine
source                   1..5
                         mol_type = protein
                         organism = synthetic construct
MOD_RES                  3
                         note = 3-(1-naphthyl)-D-alanine
SEQUENCE: 42
YRXRR                                                                       5

SEQ ID NO: 43            moltype = AA  length = 5
FEATURE                  Location/Qualifiers
REGION                   1..5
                         note = Synthetic Polypeptide
REGION                   1..5
                         note = MISC_FEATURE - L-amino acid residue or D-amino acid
                          residue
source                   1..5
                         mol_type = protein
                         organism = synthetic construct
SEQUENCE: 43
KRFRR                                                                       5

SEQ ID NO: 44            moltype =     length =
SEQUENCE: 44
000
```

PEPTIDE LIGAND TARGETING CARBONIC ANHYDRASE IX, PEPTIDE CONSTRUCT COMPRISING SAME, AND USES THEREOF

CROSS-REFERENCE TO RELATED APPLICATIONS

This application is a National Phase entry of International Application No. PCT/KR2023/001951, filed Feb. 10, 2023, which claims priority to Korean Patent Application No. 10-2022-0018467, filed Feb. 11, 2022, the disclosures of which are incorporated herein by reference in their entireties.

REFERENCE TO THE SEQUENCE LISTING

This application includes a Sequence Listing XML submitted in electronic format. The Sequence Listing XML is identified as "S22P-0007-WO-US_Replacement Sequence Listing.xml" (82.6 KB, created on Jun. 11, 2024) and is hereby incorporated by reference.

TECHNICAL FIELD

The present invention relates to a peptide ligand that specifically binds to carbonic anhydrase IX (CAIX) and a peptide construct comprising the same. Specifically, the present invention relates to a CAIX binding peptide ligand, which is specific for CAIX and has improved stability due to the inclusion of D-amino acids, a linear or cyclic high-affinity CAIX binding peptide construct comprising the peptide ligand, and uses thereof for diagnosing, preventing, inhibiting or treating diseases mediated by CAIX.

BACKGROUND ART

Carbonic Anhydrase (CA), which is a zinc ($Zn^{2+}$) metalloenzyme, commonly exists in higher vertebrates including humans. It is an enzyme that catalyzes a reversible hydration reaction that converts carbon dioxide into a hydrogen ion and a bicarbonate ion ($CO_2+H_2O \leftrightarrow HCO^{3-}+H^+$). CAs have been identified in 16 isozyme forms and exist in various tissues in humans such as gastrointestinal tract, reproductive tract, nervous system, kidney, lung, skin, and eyeball. The CA isoenzymes are mostly known to be involved in important physiological processes such as respiration, calcification, acid-base balance, bone resorption and formation of aqueous humor, cerebrospinal fluid, saliva and gastric acid (Thiry et al., *TRENDS in Pharmacological Sciences,* 27(11): 566-573, 2006).

Among the CA family, carbonic anhydrase IX (CAIX) is expressed very restrictedly in normal tissues and abnormally overexpressed in the majority of solid tumors. It has been reported that this is mainly due to strong transcriptional activation by hypoxia-inducible factor (HIF-1), which is a transcription factor induced by hypoxia caused by excessive proliferation of solid tumors (De Simone et al., *Biochimica et Biophysica Acta,* 1804:404-409, 2010; Thiry et al., ditto).

Tumor hypoxia results from the creation of an oxygen-poor environment as solid tumors grow at a rate that exceeds the blood supply capacity provided by the host's vascular system. Even in a hypoxic microenvironment, the solid tumors maintain continuous growth and proliferation through various genetic mutations. These hypoxic tumor cells are challenging to target with anti-cancer chemotherapy drugs through the bloodstream, and they lack the oxygen required for the cytotoxic action of radiation-derived free radicals during radiotherapy. Consequently, this leads to increased resistance to both anti-cancer chemotherapy and radiotherapy. In addition, the hypoxic tumor cells induce overexpression of CAIX on cell surfaces, thereby lowering the pH of the extracellular environment of tumor cells due to hydration of $CO_2$ by the extracellular catalytic domain of CAIX. The acidic tumor microenvironment thus formed can promote invasion and metastasis of tumor cells and neutralize pH-sensitive drugs (Thiry et al., ditto). Therefore, a tumor hypoxia is generally known to be a poor prognostic factor for cancer patients.

Recently, studies to inhibit the growth and proliferation of CAIX-related tumors have been actively conducted by targeting CAIX overexpressed in tumor cells or by disrupting the pH regulation induced by tumor cells by way of interfering the catalytic activity of CAIX. Most of these studies concentrate on the development of CAIX-binding monoclonal antibodies and sulfonamide-based small molecule inhibitors. However, delivering high-molecular-weight monoclonal antibodies efficiently to solid tumors poses challenges and sulfonamide-based small molecule inhibitors are relatively unstable in solution, which limit their usefulness as pharmaceutical compounds.

Therefore, there is a demand for the development of novel CAIX-specific binding agents and inhibitors with high affinity and stability and suitability for medical and pharmaceutical applications in cancer treatment, which include treatment, prevention, diagnosis, prognosis prediction, and imaging of cancer diseases.

PRIOR ART LITERATURE

Non-Patent Literature (Non-patent literature 1) Thiry et al., *TRENDS in Pharmacological Sciences,* 27(11): 566-573, 2006

(Non-patent literature 2) De Simone et al., *Biochimica et Biophysica Acta,* 1804:404-409, 2010

DETAILED DESCRIPTION

Technical Objective

One objective of the present invention is to provide a stable CAIX-specific binding agent and inhibitor suitable for uses in treatment, prevention, diagnosis or prognosis prediction of cancer diseases.

One objective of the present invention is to provide a stable CAIX-specific binding peptide ligand.

One objective of the present invention is to provide a high-affinity CAIX-specific peptide construct comprising one or more effectors or functional groups, including sulfonamide functional groups, together with a CAIX-specific binding peptide ligand.

Another objective of the present invention is to provide a conjugate comprising the peptide construct.

Another objective of the present invention is to provide a composition for diagnosing, preventing or treating cancer comprising the peptide ligand, the peptide construct or the conjugate.

Another objective of the present invention is to provide a method for diagnosing cancer using the peptide ligand, the peptide construct or the conjugate.

Another objective of the present invention is to provide a method for treating cancer using the peptide ligand, the peptide construct or the conjugate.

Another objective of the present invention is to provide a method for predicting prognosis after treating cancer using the peptide ligand, the peptide construct or the conjugate.

Means for Solving the Problems

As a result of intensive research to achieve these goals, the inventors of the present application have developed a novel CAIX-specific binding agent and inhibitor, which is stable due to the inclusion of D-amino acids and can specifically bind to CAIX with high affinity.

In one aspect, the present invention provides a CAIX-specific peptide ligand comprising an amino acid sequence of any one of SEQ ID NOs: 1 to 44. The CAIX-specific peptide ligand is composed of at least one D-amino acids among the constituent amino acids, by which it can be stably maintained in the body. Among the constituent amino acids of the CAIX-specific peptide ligand, a lysine (Lys) residue may be substituted with chemical functional groups at the side chain ε-amino group. Non-limiting examples of the above chemical functional groups include pentafluorobenzoic acid or diphenolic acid.

In one aspect, the present invention provides a peptide construct comprising a sulfonamide functional group-containing amino acid residue linked to the CAIX-specific peptide ligand directly or via a spacer. The peptide construct may further comprise one or more functional group-containing amino acid residues other than sulfonamide functional groups and may form a cyclic or linear structure.

In one aspect, the present invention provides a CAIX-specific peptide construct having the cyclic structure of Formula 1 below:

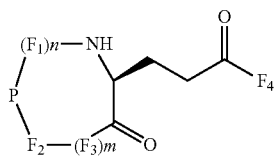

[Formula 1]

wherein,
P is a CAIX-specific binding peptide of the present invention,
$F_j$ is a glycine (Gly) or a sulfonamide functional group-containing amino acid residue,
$F_2$ is a sulfonamide functional group-containing amino acid residue,
$F_3$ is a glycine (Gly) or a functional group-containing amino acid residue other than sulfonamide,
n and m are each independently 0 or 1,
$F_4$ is a group of the general formula $-(S_1)_o-(F_5)_p-(S_2)_q-(F_6)_r-NH_2$, wherein
$S_1$ and $S_2$ are each independently a spacer,
$F_5$ and $F_6$ are each independently a functional group-containing amino acid residue other than sulfonamide, and
o, p, q and r each independently represent an integer of 0 to 6.

In one aspect, the present invention provides a CAIX-specific peptide construct having the linear structure of Formula 2 below:

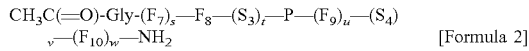

[Formula 2]

wherein,
P is a CAIX-specific binding peptide of the present invention,
$F_8$ is a sulfonamide functional group-containing amino acid residue,
$F_7$, $F_9$ and $F_{10}$ is each independently a functional group-containing amino acid residues other than sulfonamide, or
if $F_9$ is present in plural, then at least one $F_9$ is a sulfonamide functional group-containing amino acid residue, and the remaining $F_9$s, $F_7$ and $F_{10}$ are each independently a functional group-containing amino acid residue other than sulfonamide,
$S_3$ and $S_4$ are each independently a spacer, and
s, t, u, v and w each independently represent an integer of 0 to 3.

In the CAIX-specific peptide construct, the sulfonamide functional group-containing amino acid residue may have the following structure but is not limited thereto.

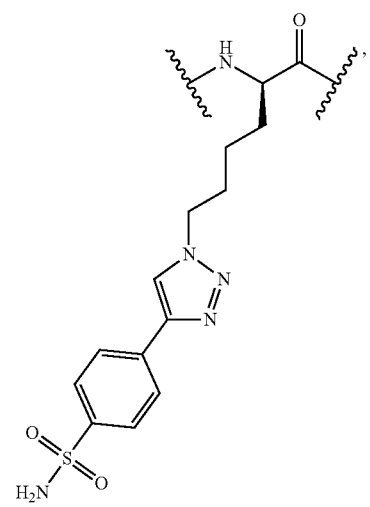

Uk(SFA)

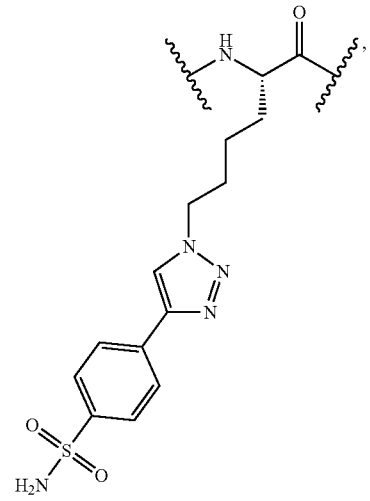

K(SFA)

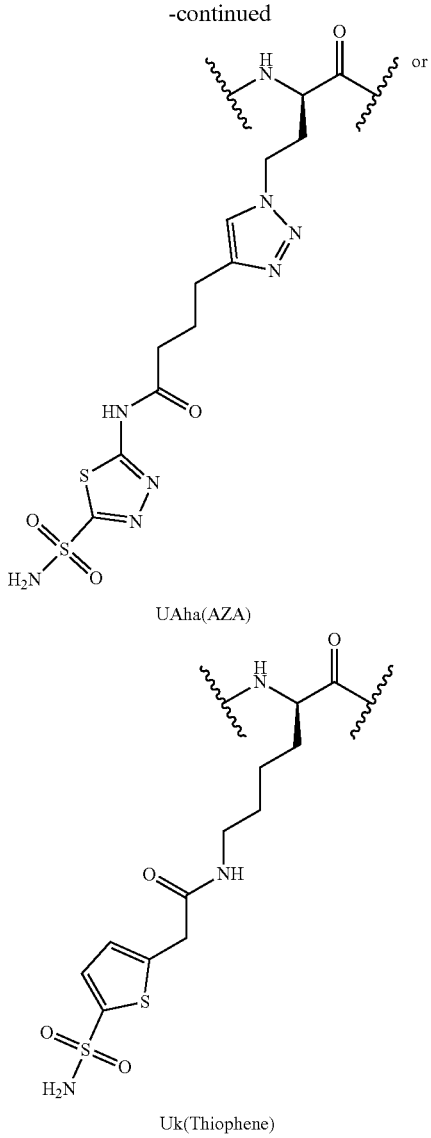

UAha(AZA)

Uk(Thiophene)

In the CAIX-specific peptide construct, the functional group-containing amino acid residues other than sulfonamide may be introduced through the side chain 6-amino group of lysine residues. For example, the functional group may include chelators, cycloalkanes, biotins, glucoheptonic acids, 4-(p-iodophenyl)butyric acids (IB), fluorescent dyes, or cytotoxic agents.

In one aspect, the present invention provides a conjugate in which fluorescent dyes, cytotoxic agents or radioactive isotopes is conjugated to the CAIX-specific peptide construct.

In one aspect, the present invention provides a pharmaceutical composition for diagnosis, prevention or treatment of cancer comprising the CAIX-specific peptide construct or conjugate. The cancer may be a cancer expressing CAIX. The cancer can be selected from the group consisting of liver cancer, lung cancer, colorectal cancer, stomach cancer, breast cancer, colon carcinoma, bone cancer, pancreatic cancer, head and neck cancer, uterine cancer, ovarian cancer, rectal cancer, esophageal cancer, small intestine cancer, perianal cancer, fallopian tube carcinoma, endometrial carcinoma, cervical carcinoma, vaginal carcinoma, vulvar carcinoma, prostate cancer, biliary cancer, bladder cancer, kidney cancer, ureteric cancer, renal cell carcinoma, renal pelvic carcinoma, melanoma, thyroid cancer, astrocytoma and glioblastoma, but is not limited to thereto.

In one aspect, the present invention provides a method for diagnosing cancer comprising administering the CAIX-specific peptide construct or the conjugate to a subject.

In one aspect, the present invention provides a method for treating cancer comprising administering the CAIX-specific peptide construct or the conjugate to a subject.

In one aspect, the present invention provides a method for predicting prognosis after cancer treatment comprising administering the CAIX-specific peptide construct or the conjugate to a subject.

Working Effect of the Invention

According to the present invention, the novel, high-affinity CAIX binding agent and inhibitor are provided, which specifically bind to CAIX and are stable. The CAIX binding agent of the present invention comprises a CAIX-specific binding peptide ligand comprising one or more D-amino acids, thereby exhibiting excellent stability in the body and being useful for CAIX targeting. In addition, the present invention provides the peptide construct in which one or more effectors or functional groups, including a sulfonamide functional group, are introduced into the CAIX-specific peptide ligand through the side chain of an amino acid residue, thereby the CAIX binding agent that are particularly useful for imaging or diagnosing cancer with high binding affinity to CAIX can be provided. The CAIX-specific peptide construct of the present invention can be used as an effective drug for diagnosing, preventing or treating cancer by conjugating fluorescent dyes, cytotoxic agents or radioactive isotopes thereto.

BRIEF DESCRIPTION OF DRAWINGS

FIG. 11a shows an experimental design schedule using mouse. FIG. 11b shows an ex vivo photograph of tumors and organs excised from mouse. FIG. 11c shows a graph of the result of measuring fluorescence intensity by homogenizing each tumor and organ.

BEST MODE FOR CARRYING OUT THE INVENTION

Figure 1:
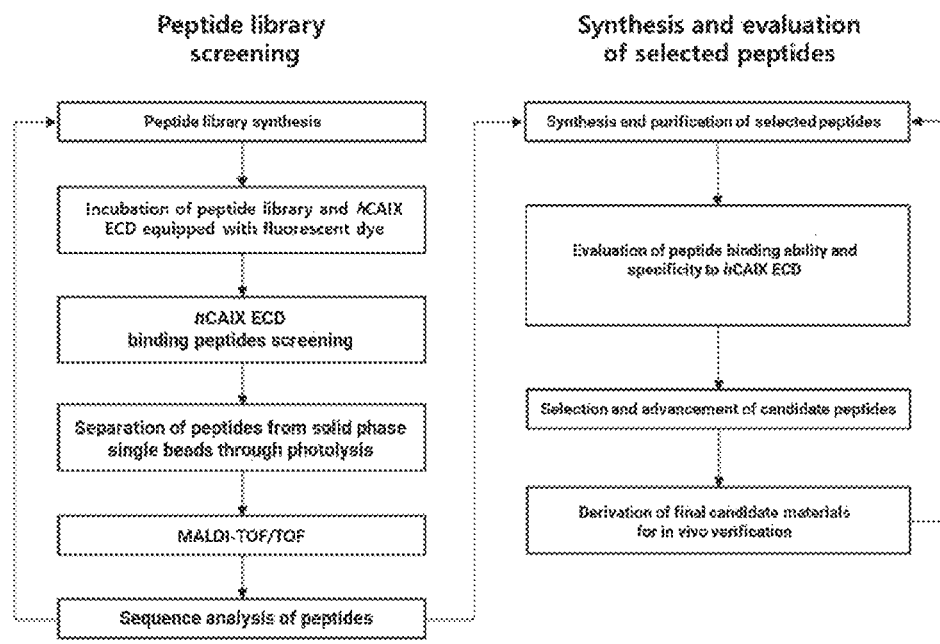
FIG. 1 is a schematic diagram showing a peptide screening process for human carbonic anhydrase IX (hCAIX) protein according to an embodiment of the present invention.

Unless defined otherwise, all technical and scientific terms used herein have the same meaning as commonly understood by one of ordinary skill in the art to which this invention belongs. Any methods and materials similar or equivalent to those described herein can be used in the practice or testing of the present invention.

The present invention is capable of various modifications and applications within the scope of the claims described below and equivalents interpreted therefrom.

The CAIX-Specific Peptide Ligand of the Present Invention

The present invention provides the peptide ligand that specifically binds to CAIX. The CAIX-specific peptide ligand of the present invention may contain the amino acid sequence of any one of SEQ ID Nos: 1 to 44. The peptide ligand may comprise D-amino acids or may consist of D-amino acids only. In addition, the peptide ligand may be substituted with one or more chemical functional groups at the side chain s-amino group of a lysine (Lys) residue among constituent amino acid residues. For example, the chemical functional groups include pentafluorobenzoic acids or diphenolic acids but are not limited thereto. The peptide ligand may also further include one or more chemical modifications at the side chain of a phenylalanine (Phe) residue among the constituent amino acid residues. Such modifications include modification of a phenylalanine residue to a homophenylalanine residue, modification of a phenyl group to a naphthalene group, or substitution of a halo, amino or phenyl substituent from a phenyl group, but are not limited thereto.

The peptide ligand of the present invention may be prepared such that amino acid residues having a specific sequence bind to each other to form the linear or cyclic molecule. The peptide ligand of the present invention can be prepared by a known peptide synthesis method and is not particularly limited. In one embodiment, the peptide ligand of the present invention can be prepared by repeating the peptide synthesis process until a peptide having a desired length and sequence is completed on a solid single bead.

The CAIX-specific peptide ligand of the present invention includes a salt form thereof.

The CAIX-Specific Peptide Construct of the Present Invention

The present invention provides the peptide construct comprising the sulfonamide functional group-containing amino acid residues linked directly or via a spacer to the CAIX-specific peptide ligand. The peptide construct may further comprise one or more functional groups-containing amino acid residues other than sulfonamide functional groups. In the peptide construct of the present invention, the chemical functional groups including sulfonamide functional groups may be introduced through the side chain of amino acid residues. The amino acid residues into which the functional group is introduced is preferably lysine.

The peptide construct of the present invention may comprise one or two sulfonamide functional groups. The introduction of the sulfonamide functional groups may be achieved through a known synthetic reaction and is not particularly limited. In one embodiment of the present invention, the sulfonamide functional groups can be introduced into the peptide construct of the present invention through a click chemistry reaction. Examples of preferred sulfonamide functional groups-containing amino acid residues that can be introduced into the peptide construct of the present invention include the following structures but are not limited thereto.

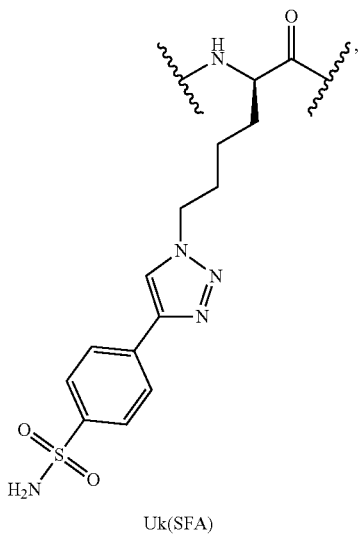

Uk(SFA)

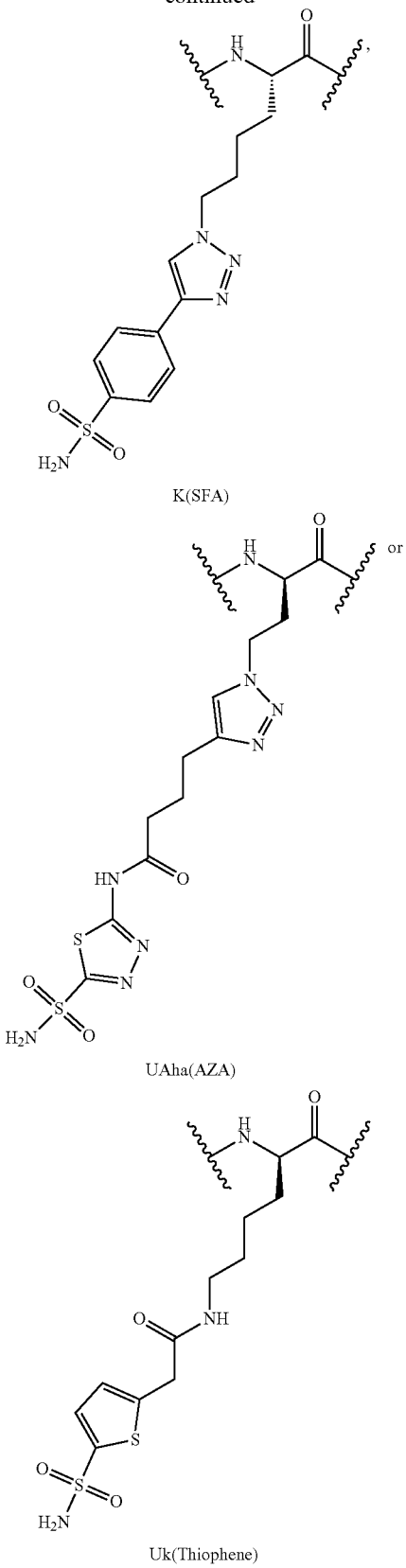

K(SFA)

UAha(AZA)

Uk(Thiophene)

In one embodiment, non-limiting examples of functional groups other than sulfonamide that can be introduced into the peptide construct of the present invention may include chelators, cycloalkanes having 5 to 15 carbon atoms, biotins, glucoheptonic acids, 4-(p-iodophenyl)butyric acids (IB), fluorescent dyes, or cytotoxic agents.

The chelators may be one or more selected from, for example, 1,4,7,10-tetraazacyclododecane-1,4,7,10-tetraacetic acid (DOTA), 1,4,7-triazacyclononane-1,4,7-triacetic acid (NOTA), ethylenediaminetetraacetic acid 2,2',2'',2'''-(ethane-1,2-diyldinitrilo)tetraacetic acid (EDTA), 1,4,7,10,13,16-hexaazacyclooctadecane-N,N',N'',N''',N'''',N'''''-hexaacetic acid (HEHA), 2-[4-nitrobenzyl]-1, 4,7,10,13-pentaazacyclopentadecane-N,N',N'',N''',N''''-pentaacetic acid (PEPA), 1,4,7,10-tetraazacyclododecane-1,4,7,10-tetra (methylene phosphonic acid) (DOTP), (1R,4R,7R, 10R)-α, α',α'',α'''-tetramethyl-1,4,7, 10-tetraazacyclododecane-1,4, 7,10-tetraacetic acid)tetrasodium salt (DOTMA), 2-[bis[2-[bis(carboxymethyl)amino]ethyl]amino]acetic acid (DTPA), and triethylenetetramine (TETA) but is not limited thereto.

The cycloalkanes having 5 to 15 carbon atoms may be one or more selected from, for example, cyclopentane, cyclohexane, cycloheptane, cyclooctane, cyclononane, cyclodecane, adamantane, norbornane, isobornane, and tricyclodecane but not limited thereto.

The peptide construct of the present invention may also be formed such that the chemical functional group (such as sulfonamide functional groups)-containing amino acid residues are linked to the CAIX-specific binding peptide ligand via a spacer. The spacer may be one or more selected from, for example, polyethylene glycol (PEG) linkers, glycine, sarcosine, and peptide linkers consisting of 1 to 5 D-amino acids or L-amino acids but is not limited thereto.

The peptide construct of the present invention may have a cyclic or linear structure. Preferably, the peptide construct of the present invention has the cyclic structure of Formula 1.

[Formula 1]

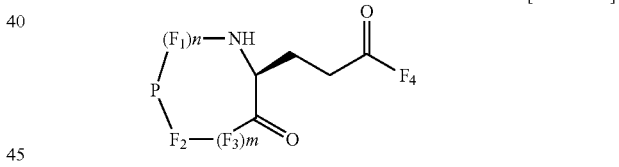

In the above formula,

P, $F_1$, $F_2$, $F_3$, $F_4$, n and m are each as defined above.

Although not bound by a particular theory, since the cyclic structure, such as the cyclic peptide construct of the present invention, has less flexibility than the linear peptide. Thus, it is considered that the cyclic structure has a lower entropy loss during target binding and has higher binding affinity with increased binding specificity to the target.

The peptide construct of the present invention exhibits high selectivity, in that it specifically binds to the CAIX but does not bind to other isoenzymes of the CAIX (e.g., carbonic anhydrase XII).

Conjugate

The CAIX-specific peptide construct of the present invention may form the conjugate by bonding directly or via a linker to fluorescent dyes, cytotoxic agents, or radioactive isotopes. The conjugate can label the CAIX-expressing cancer with fluorescent dyes or radioactive isotopes during targeting the CAIX or effectively deliver drugs such as radioactive isotopes or cytotoxic agents to the cancer, being useful for diagnosis, prevention or treatment of cancer.

In one embodiment, the linker may be one or more selected from 6-maleimidocaproyl (MC), maleimidopropanoyl (MP), valine-citrulline (val-cit), alanine-phenylalanine (ala-phe), p-aminobenzyloxycarbonyl (PAB), N-succinimidyl 4-(2-pyridylthio)pentanoate (SPP), N-succinimidyl 4-(N-maleimidomethyl)cyclohexane-1 carboxylate (SMCC), 4-(2-pyridyldithio)butyric acid-N-hydroxysuccinimide ester (SPDB), and N-succinimidyl (4-iodo-acetyl)aminobenzoate (SIAB) but is not limited thereto.

In one embodiment, non-limiting examples of the fluorescent dye include one or more selected from near-infrared fluorescent dye, fluorescein type, rhodamine type, Alexa Fluor, 4,4-difluoro-4-boro-3a,4a-diaza-S-indacene (BODIPY), Texas Red, dansyl, Lissamine, cyanine (Cy), and phycoerythrin.

In one embodiment, the cytotoxic agent may be one or more selected from toxin, chemotherapeutic agent, drug moiety, antibiotic, and nuclease, but is not limited thereto.

In one embodiment, the radioisotope may be one or more selected from Fluorine-18 (F-18), Carbon-11 (C-11), Carbon-14 (C-14), Techthenium-99m (Tc-99m), Copper-64 (Cu-64), Copper-67 (Cu-67), Dysprosium-168 (Dy-168), Bismuth-213 (Bi-213), Samarium-153 (Sm-153), Strontium-89 (St-89), Strontium-90 (St-90), Erbium-169 (Er-169), Phosphorus-32 (P-32), Palladium-103 (Pd-103), Rhenium-186 (Re-186), Rhenium-188 (Re-188), Oxygen-15 (O-15), Selenium-75 (Se-75), Sodium-24 (Na-24), Strontium-85 (Sr-85), Lutetium-177 (Lu-177), Yttrium-90 (Y-90), Iodine-123 (I-123), Iodine-125 (I-125), Iodine-131 (I-131), Iridium-192 (Ir-192), Iridium-196 (Ir-196), Ytterbium-166 (Yb-166), Indium-111 (In-111), Xenon-133 (Xe-133), Nitrogen-13 (N-13), Calcium-47 (Ca-47), Cobalt-57 (Co-57), Cobalt-60 (Co-60), Chromium-51 (Cr-51), Krypton-81 (Kr-81), Potassium-42 (K-42) 42), Holmium-166 (Ho-166), Gallium-67 (Ga-67), Gallium-68 (Ga-68), Actinium-225 (Ac-225), Zirconium-89 (Zr-89), Lead-212 (Pb-212), and Astatine-211 (At-211).

Therapeutic Administration and Formulation

The present invention provides a pharmaceutical composition for diagnosis, prevention or treatment of cancer comprising the CAIX-specific peptide ligand, the peptide construct or the conjugate. The cancer of the present invention is preferably the solid cancer. More preferably, the cancer of the present invention is the cancer expressing CAIX. For example, the cancer of the present invention may be solid cancer such as liver cancer, lung cancer, colorectal cancer, stomach cancer, breast cancer, colon carcinoma, bone cancer, pancreatic cancer, head and neck cancer, uterine cancer, ovarian cancer, rectal cancer, esophageal cancer, small intestine cancer, perianal cancer, fallopian tube carcinoma, endometrial carcinoma, cervical carcinoma, vaginal carcinoma, vulvar carcinoma, prostate cancer, biliary cancer, bladder cancer, kidney cancer, ureteric cancer, renal cell carcinoma, renal pelvic carcinoma, melanoma, thyroid cancer, astrocytoma and glioblastoma but is not limited to thereto.

A subject to whom the pharmaceutical composition for diagnosis, prevention or treatment of cancer of the present invention is administered may be a mammal at risk of developing cancer, which is diagnosed with cancer, or that is treated for cancer. The mammal may be a human or a non-human mammal.

The pharmaceutical composition for diagnosis, prevention, or treatment of cancer according to the present invention can be formulated and used according to conventional methods in the form of an oral formulation, such as powder, granule, tablet, capsule, suspension, emulsion, syrup and aerosol, external preparation, suppository, and sterile injection solution, respectively. For formulation, suitable carriers, excipients or diluents commonly used in the preparation of pharmaceutical compositions may be included.

Examples of the carriers, excipients, or diluents may be various compounds or mixtures including lactose, dextrose, sucrose, sorbitol, mannitol, xylitol, erythritol, maltitol, starch, gum acacia, alginate, gelatin, calcium phosphate, calcium silicate, cellulose, methyl cellulose, and microcrystalline cellulose, polyvinyl pyrrolidone, water, methylhydroxybenzoate, propylhydroxybenzoate, talc, magnesium stearate and mineral oil, and the like.

Formulation of the pharmaceutical composition may be prepared using diluents or excipients such as fillers, weighting agents, binders, wetting agents, disintegrants, and surfactants commonly used in the pharmaceutical industry.

The preferred dosage of the pharmaceutical composition for preventing or treating cancer according to the present invention varies depending on the patient's condition, body weight, disease severity, drug form, administration route and duration, which can be appropriately selected by those skilled in the art. However, for desirable effects, it can be administered at 0.0001 to 2,000 mg/kg per day, preferably 0.001 to 2,000 mg/kg. The administration may be done once a day or divided into several times. However, the scope of the present invention is not limited by the dosage.

The pharmaceutical composition for preventing or treating cancer according to the present invention can be administered to mammals such as rats, mice, livestock, and humans through various routes. The method of administration may be, for example, oral, rectal or intravenous, intramuscular, subcutaneous, intrauterine intrathecal or intracerebroventricular injection.

The present invention also provides the method for treating cancer, comprising administering the CAIX-specific peptide construct or the conjugate of the present invention to a subject in need of such treatment.

The CAIX-specific peptide construct and the conjugate of the present invention can be also used for diagnosing cancer by targeting and imaging cancer or can be used for predicting or observing the treatment prognosis of the subject after cancer treatment by administering to a subject who has undergone cancer treatment.

Hereinafter, the present invention will be described in more detail through embodiments. These embodiments are only intended to more specifically illustrate the present invention and are not provided to intend to limit the legitimate scope of the present invention. It will be apparent to those skilled in the art that various modifications are possible within the scope of the present invention.

EMBODIMENTS

Embodiment 1. Peptide Screening that Binds to Human Carbonic Anhydrase IX

A peptide library was synthesized to obtain peptides specifically binding to the extracellular domain (ECD) of human carbonic anhydrase IX (hCAIX). The peptides were selected by screening the synthesized peptide library, and the binding ability and specificity to hCAIX ECD of the selected peptides were evaluated.

FIG. 1 shows a schematic diagram showing the peptide screening process for hCAIX ECD.

1-1. Synthesis of Bead-Introduced Peptide Library

For the synthesis of the peptide library, a random combinatorial one-bead-one-compound (OBOC) library was synthesized using TentaGel beads. TentaGel® S—NH$_2$ resin (Cat #NSD30902) was purchased from Rapp Polymere GmbH (Germany).

The peptide library was synthesized through repetitive split and mix processes on TentaGel® S—NH$_2$ beads (polyethylene glycol-grafted polystyrene beads) with an automatic synthesizer (Apex 396, AAPPTEC) using 18 D-type amino acids excluding cysteine and methionine for each residue position. In particular, in the case of Fmoc (fluorenylmethyloxycarbonyl)-D-isoleucine-OH and Fmoc-D-glutamine-OH, 10 mol % of Fmoc-glycine-OH were added to distinguish isotope residues during amino acid sequence analysis of peptide. TentaGel was swelled in NMP (N-Methylpyrrolidone) solvent, and a linker capable of photocleavage was attached to TentaGel, and the peptide library was synthesized using an automatic synthesizer. In order to introduce the Fmoc-ANP linker (3-(Fmoc-amino)-3-(2-nitrophenyl)propanoic acid, Cat #LSP308, AAPPTEC), the loading ratio was adjusted to 1/4 by adding N-acetylglycine (3 equivalents, Cat #A16300, Sigma-Aldrich), and the reaction was conducted with TBTU (3 equivalents, Cat #12806, Sigma-Aldrich) and DIPEA (7.5 equivalents, Cat #8.00894, Sigma-Aldrich). The solid phase beads were washed with NMP, reacted with a piperidine/NMP (1:4) solution to remove the Fmoc protecting group, and then washed sequentially using NMP, DCM (dichloromethane), and NMP. Thereafter, the linker was produced by linking Fmoc-Arg(pbf)-OH (3 equivalents, Cat #36404, GL Biochem) and Fmoc-PEG1-OH (3 equivalents, Cat #246201, ChemPep) and synthesizing them in the same manner. For the peptide library synthesis, the linker-equipped beads were divided into equal amounts in 18 wells of an automatic synthesizer RV (reaction vessel). When one cycle of coupling and removal of the Fmoc protecting group was completed, the solid phase beads were collected in a collector vessel (CV) and mixed and divided into 18 RV wells in the same amount to perform coupling and removal of the Fmoc protecting group. The split and mixing process was repeated until the desired peptide length was achieved.

1-2. Synthesis of Peptide Library with Sulfonamide Functional Group Introduced

Figure 2:
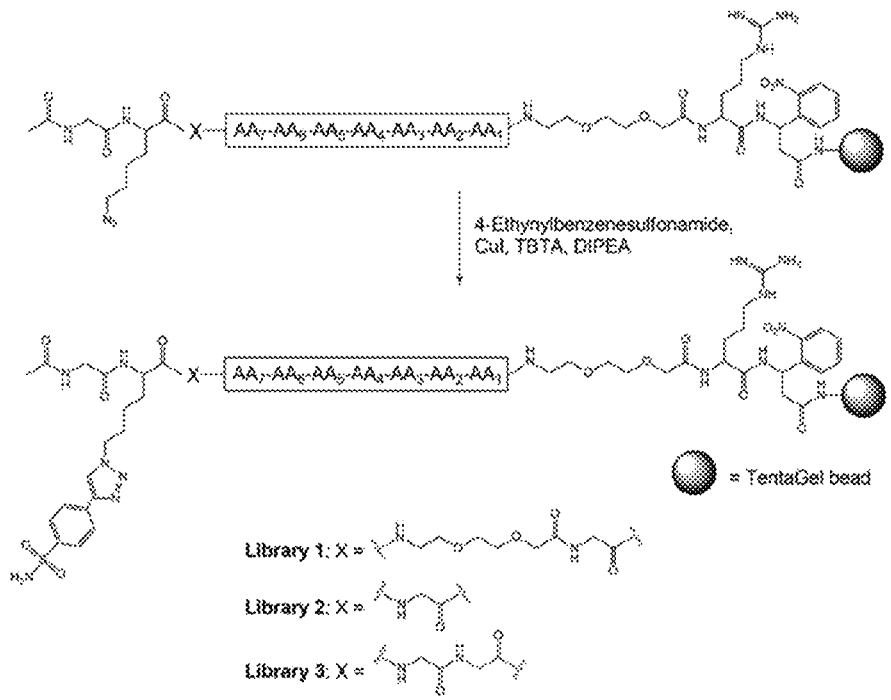
FIG. 2 shows a click reaction for introducing the sulfonamide functional group into a peptide library according to an embodiment of the present invention and a library structure used for hCAIX screening.

After an azido substituent was introduced into the peptide synthesized in Embodiment 1-1, the 18 beads of RV were collected in one tube, and a click reaction with 4-ethynylbenzenesulfonamide was carried out (FIG. 2). Specifically, under an argon (Ar) atmosphere, 1 equivalent of beads equipped with the peptide library, 4-ethynylbenzenesulfonamide (3 equivalents), CuI (1 equivalent), tris (benzyltriazolylmethyl)amine (TBTA, 3 equivalents, Cat #T2993, TCI Co.) and DIPEA (10 equivalents) were mixed in NMP solvent, and then the reaction was conducted at room temperature for 12 hours. After completion of the reaction, the beads were washed with NMP and 0.1M sodium diethyldithio carbamate (Sigma-Aldrich, Cat #D3506)/NMP solution, removing copper impurities. To remove the protective group of the amino acid residues, the beads were reacted in trifluoroacetic acid (95%, TFA, Cat #299537, Sigma-Aldrich), ultra-pure distilled water (2.5%), and triisopropylsilane (2.5%, TIS, Cat #233781, Sigma-Aldrich) for 2 hours, washed with DCM, dried in a vacuum, and stored under 4° C. without light.

FIG. 2 shows the click reaction for introduction of sulfonamide functional groups into the peptide library and an embodiment of the library structure used for hCAIX screening.

Figure 3:
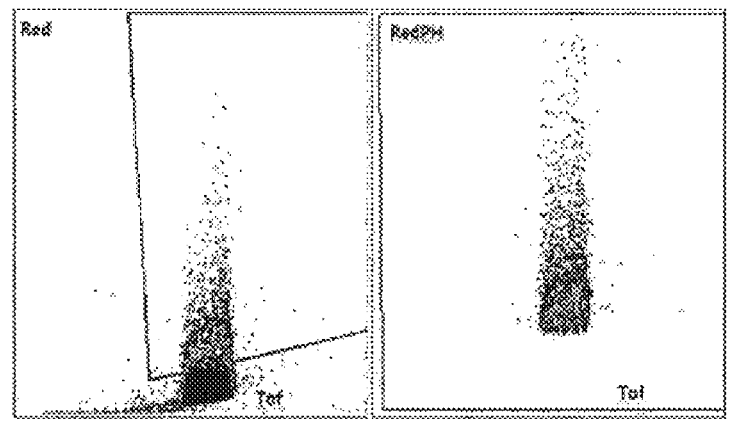
FIG. 3 shows screening results of positive beads binding to hCAIX using COPAS according to an embodiment of the present invention.

Embodiment 2. Selection of Peptides that Bind to Human CAIX 2-1. Peptide Library Primary Screening After transferring 50 mg of beads introduced with the peptide library synthesized in Embodiment 1 to 4 mL Extract-Clean Filter Columns (Cat #211104, S*PURE, Singapore), 2 mL of pH 7.4 phosphate buffer (PBS) was added. The beads were swollen by sonication with an ultrasonic cleaner (Cat #5210R-DTH, BRANSON, USA). After replacing PBS with 2 mL blocking solution [10% FBS, 0.1% Tween20 (Cat #69295-1601, Junsei, Japan) in pH7.4 PBS], the mixture was incubated at room temperature in a 3600 shaker (Cat #M04-238-157, SCILOGEX, USA). A 60 nM solution of hCAIX ECD (ACROBiosystems, Cat #CA9-H5226) equipped with fluorescent dyes was added, further incubation was performed, and the solution was removed. After the beads were transferred to a conical tube, they were diluted with 45 mL of PBST buffer containing 0.1% of Tween20 and then subdivided. The PBST buffer solution containing 0.1% Tween20 was added to each of the subdivided solutions to further dilute the solution, and screening was performed after mounting in a sample vessel of COPAS. Screening was performed with Excitation 640 nm, Emission 680/30 BP, and about 5,000 beads with high fluorescence intensity were selected under the conditions of Enrichment mode, PMT 690, and Gain 3.0. The above process was repeated 5 times, and a total of 25,000 positive beads (i.e., beads equipped with peptides binding to hCAIX ECD) to be used for the secondary screening was selected (FIG. 3).

2-2. Peptide Library Secondary Screening

The hCAIX ECD equipped with fluorescent dyes was removed from about 25,000 positive beads obtained through the first screening in Embodiment 2-1. Thereafter, 1 mL of the blocking solution was added to the beads, incubation was performed using the 3600 shaker, and the solution was removed. A 250 nM solution of hCAIX ECD equipped with fluorescent dyes was added thereto, further incubation was performed, and the solution was removed. After transferring the beads to a conical tube, the beads were diluted with 45 mL of PBST buffer solution containing 0.1% of Tween20, and then subdivided. Each subdivided solution was further diluted by adding the PBST solution containing 0.1% Tween20, and the solution was mounted in a COPAS sample vessel, and the secondary screening was conducted over two stages under Excitation 640 nm and Emission 680/30 BP conditions. In the first step, about 1,000 beads with high fluorescence intensity were selected under conditions of Enrichment mode, PMT 630, and Gain 3.0. The 1,000 beads obtained were diluted with ultra-pure distilled water, and then the second COPAS screening was performed using a 96-well plate under the conditions of Pure mode, PMT 620, and Gain 3.0.

2-3. Split and Analysis of Peptides Obtained by Secondary Screening

The peptides were separated from the solid-state single beads obtained through the secondary screening of the Embodiment 2-2 through a photolysis reaction. Specifically, under an argon (Ar) atmosphere, a 96-well plate containing the beads was sealed, and a photolysis reaction was conducted for 10 minutes under conditions of a wavelength of 365 nm and an irradiation of 9,000 μJ/cm$^2$ using a UVP crosslinker (Cat #849-30101-2, Analytikjena, Germany). After opening the 96-well plate, the beads were concentrated at room temperature using an acid benchtop concentrator (Cat #7310042, LABCONCO, USA).

Figure 4A:
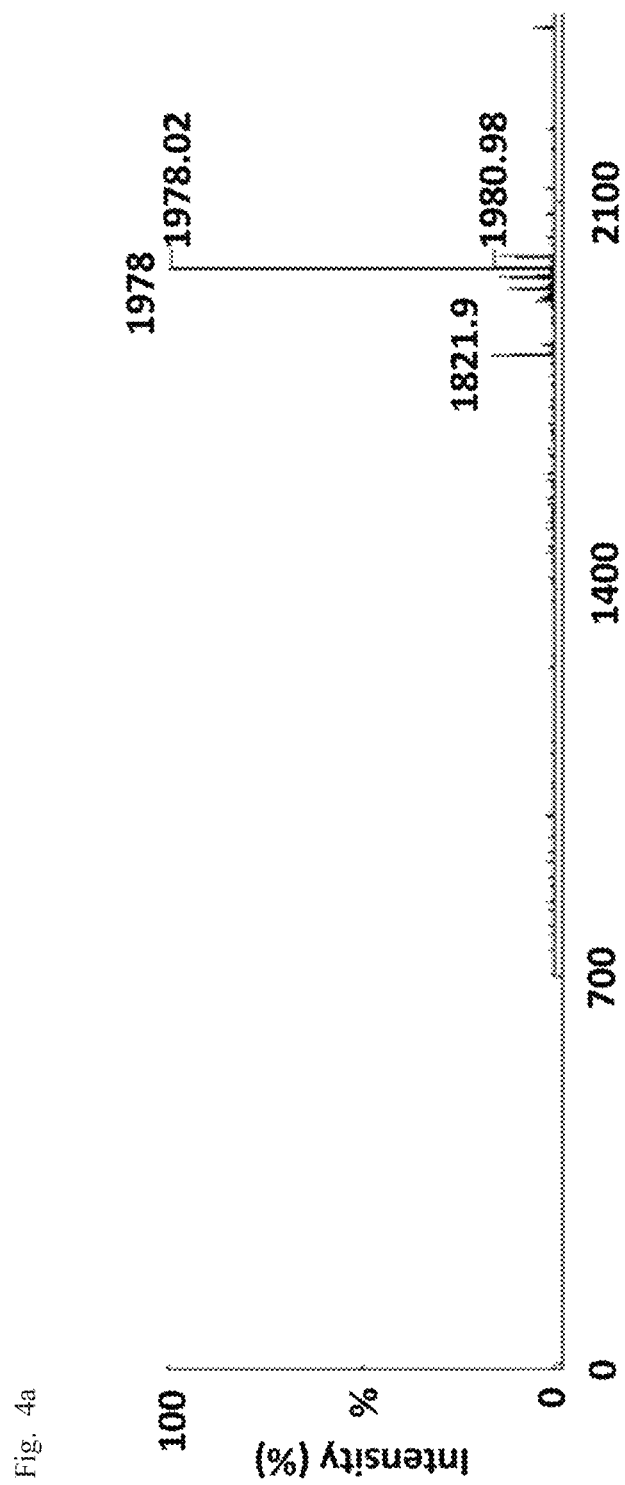
FIG. 4a shows the mass spectrometry results of a hCAIX extracellular domain (ECD) binding peptide according to an embodiment of the present invention.
Figure 4B:
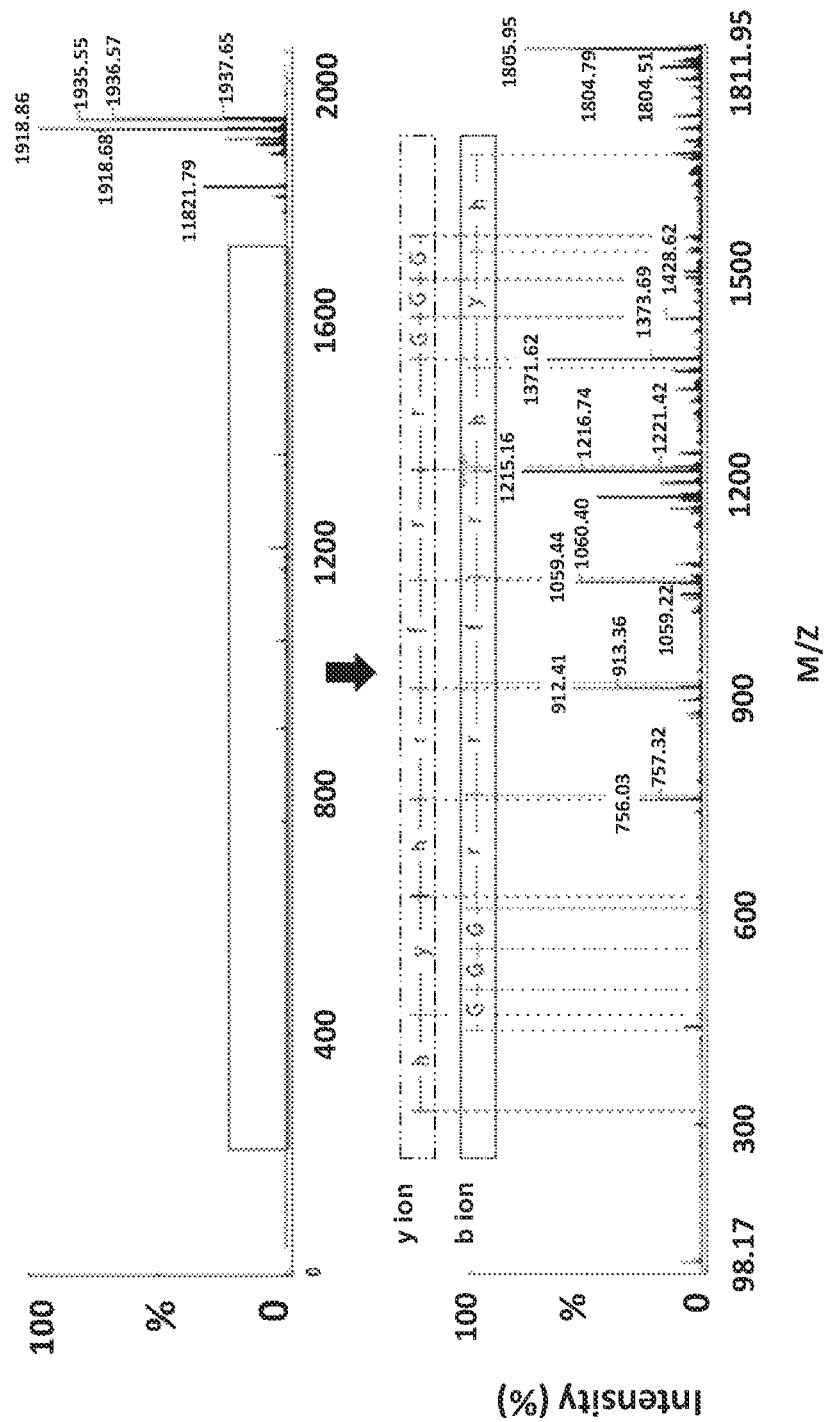
FIG. 4b shows the results of MS/MS sequence analysis of the hCAIX ECD binding peptide according to an embodiment of the present invention.

Then, the molecular weight and amino acid sequence of the peptides were analyzed based on MS and MS/MS obtained using an Enhanced ultrafleXtreme MALDI-TOF/TOF mass spectrometer (Bruker, USA). Examples of each analysis result are shown in FIG. 4a (mass spectrometry result) and FIG. 4b (MS/MS sequencing result), respectively.

2-4. Peptide Library Tertiary Screening for Selection of Candidate Peptides

About 50 peptides were selected from 250 to 300 peptides having amino acid sequences obtained in Example 2-3, and a peptide library was synthesized using the Apex396 automatic synthesizer in the same way as in Embodiment 1 on the TentaGel beads equipped with the photolysis linker (0.08 mmole/g, 10 mg for each peptide). Thereafter, the protecting groups of amino acid residues were removed using a mixed solution of TFA (95%)/ultra-pure distilled water (2.5%)/TIS (2.5%).

Then, for the 3rd COPAS screening to derive the final peptide candidate, the TentaGel beads equipped with 50 different peptides were taken at 1 mg each (50 mg in total), were collected in 4 mL Extract-Clean Filter Columns, and mixed. 2 mL of PBS was added and the beads were swollen by sonication. Thereafter, COPAS screening was performed in the same manner as in the secondary peptide library screening while the final concentration of hCAIX ECD equipped with fluorescent dyes was maintained at 250 nM. This process was repeated three times to ensure reproducibility of the results. As a result of MS and MS/MS data analysis, peptides were ranked in order of positive hit number, and candidates were selected based on peptides that were in the top positions.

Embodiment 3. Synthesis and Purification of Peptide Construct Comprising Selected Peptides 3-1. Synthesis of Biotin Linker A solid-state biotin linker was synthesized using an automated ultrasonic peptide synthesizer (Liberty Blue™ automated microwave peptide synthesizer, CEM Corporation). Specifically, Rink Amide-ChemMatrix®Resin (0.45 mmole/g) swollen in NMP was treated with a mixed solution of piperidine/NMP (v/v=1:4, 0.1M OxymaPure) to remove the Fmoc protecting group, and then washed with NMP. Then, after coupling by treating Fmoc-Lys(mtt)-OH (5 equivalents), Oxyma Pure (5 equivalents), and diisopropylcarbodiimide (DIC, Cat #D0254, TCI) (10 equivalents) in the NMP solvents, the Fmoc protecting group was removed. A Fmoc-PEG1-OH (5 equivalents) was used and linked by repeating the same process as above twice. The 4-methyltrityl protecting group (Mtt) was removed by treating a mixed solution of 1.5% TFA/2.5% TIS/96% DCM to the resin that is recovered from the ultrasonic peptide synthesizer. In order to introduce a biotin, the resin was reacted with a biotin-NHS (3 equivalents) and a DIPEA (10 equivalents) at room temperature for 1 hour in an NMP solvent, washed sequentially with NMP and DCM, and vacuum dried. An exemplary reaction formula for the synthesis of a biotin linker is shown below.

[Reaction Formula 1]

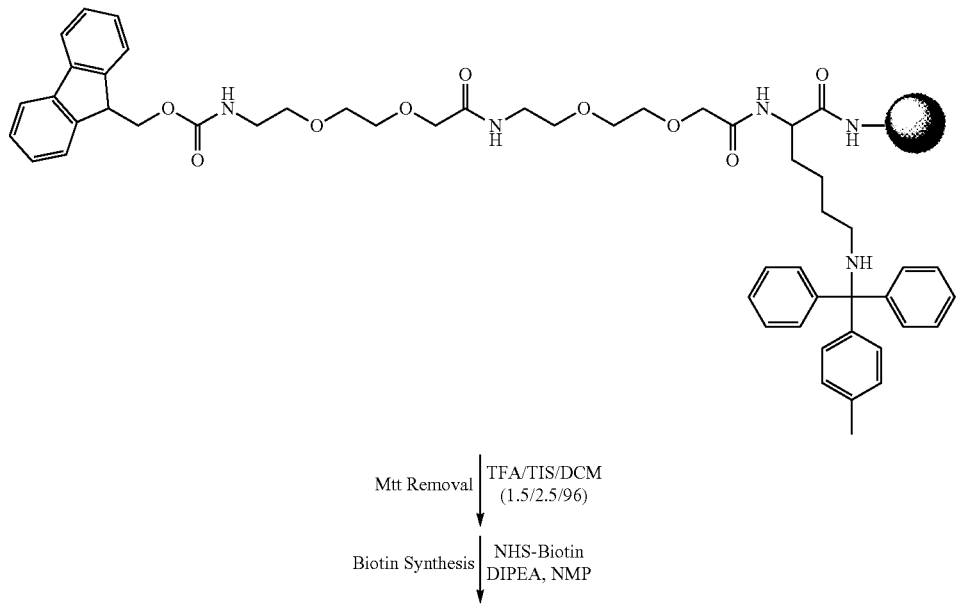

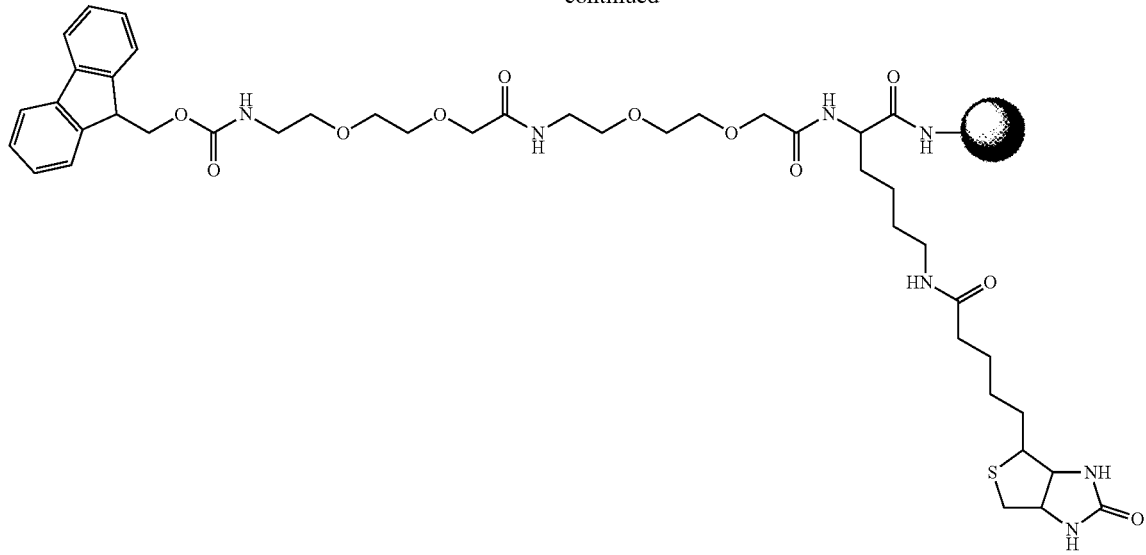

3-2. Synthesis of Selected Peptides

A peptide having the selected amino acid sequence was synthesized using the biotin linker synthesized in Embodiment 3-1 above. First, the Fmoc protecting group was removed from the beads to which the biotin linker was introduced with a piperidine/NMP (v/v=1:4) mixed solution, and then the beads were washed with NMP, DCM, and NMP sequentially. The beads were reacted with Fmoc-protected amino acid (3 equivalents), TBTU (3 equivalents), and DIPEA (7 equivalents) at room temperature, and then washed with NMP. The above process was repeated until the desired sequence of peptides was obtained. In particular, in order to synthesize the peptide having the cyclic structure, Fmoc-E(OAll)-OH was first introduced into the biotin linker, and then the peptide bonding reaction (cyclization) was performed.

3-3. Synthesis and Purification of the Peptides Construct of the Linear Structure The linear peptide constructs were prepared by introducing functional groups of sulfonamide, adamantane, cyclooctane, 1,4,7,10-tetraazacyclododecane-1,4,7,10-tetraacetic acid (DOTA) or a biotin functional group to the peptides synthesized in Embodiment 3-2.

The sulfonamide functional group was introduced to the peptide comprising an azido substituent by the click reaction descried in Embodiment 1-2 above.

Introduction of adamantane, cyclooctane or DOTA functional groups was conducted by removing Mtt or 1-(4,4-dimethyl-2,6-dioxocyclohex-1-ylidene)ethyl (Dde) protecting groups from the beads equipped with a peptide comprising a lysine protected by Mtt or Dde substituent. The Mtt protecting group was removed by treating with a mixed solution of 1.5% TFA/2.5% TIS/96% DCM, and the Dde protecting group was removed by mixing and reacting Pd(PPh$_3$)$_4$ (1 equivalent) and 1,3-dimethylbarbituric acid (30 equivalents) in a DCM solvent under an argon (Ar) atmosphere. Thereafter, the introduction was conducted by reacting the beads with 1-adamantanecarboxylic acid (Cat #106399-25G, Sigma-Aldrich), cyclooctanecarboxylic acid (Cat #EN300-85433, Enamine) or DOTA-tris(tert-butyl ester) (2 equivalents), and TBTU (2 equivalents) and DIPEA (5 equivalents) at room temperature in NMP solvent.

The biotin functional group was introduced by reacting biotin-NHS (3 equivalents) and DIPEA (10 equivalents) at room temperature in NMP solvent.

After completion of the reaction, the beads were sequentially washed with NMP and DCM, and dried under vacuum. An example of a reaction formula for introducing an adamantane functional group into the selected peptide is shown below.

[Reaction Formula 2]
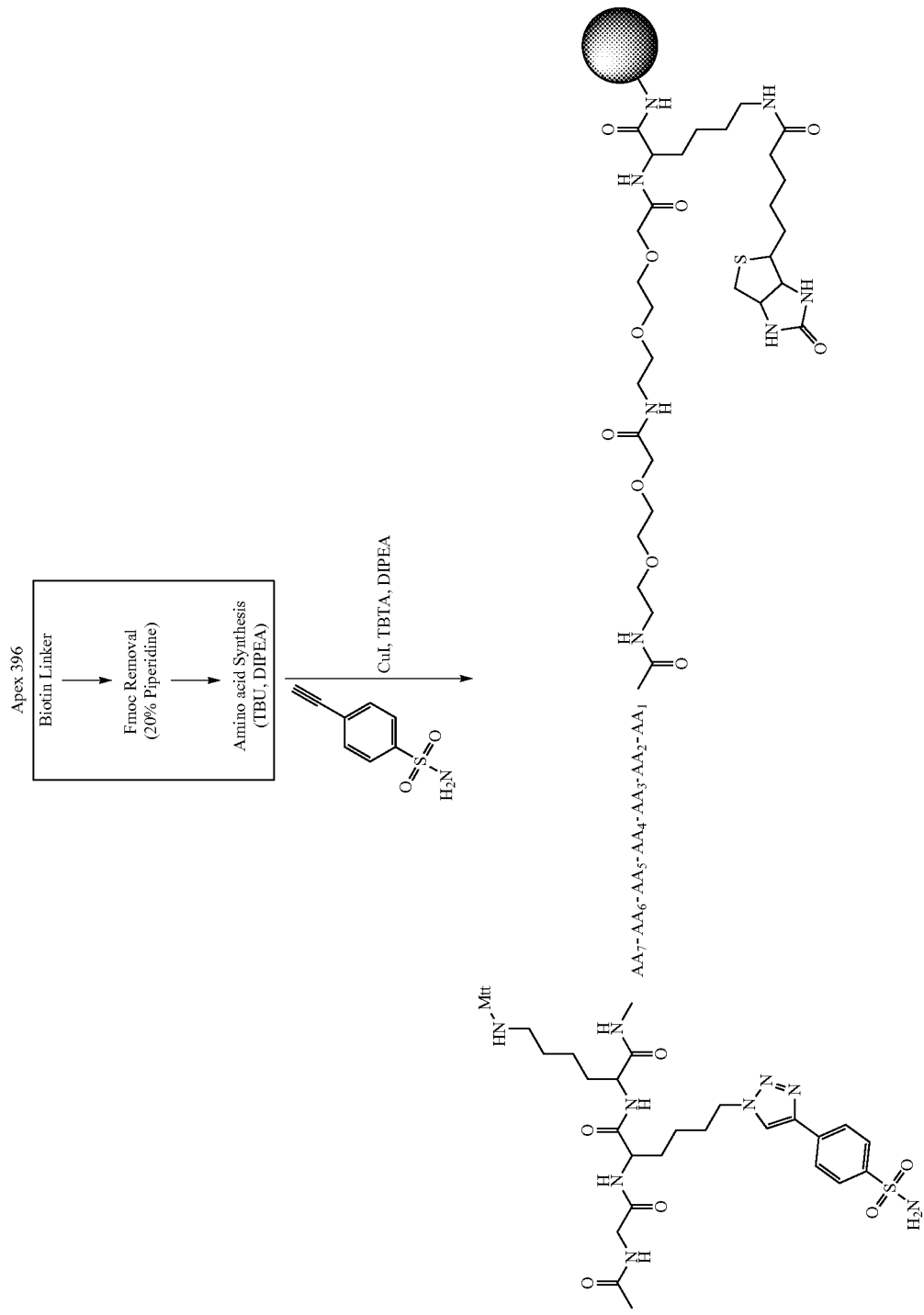

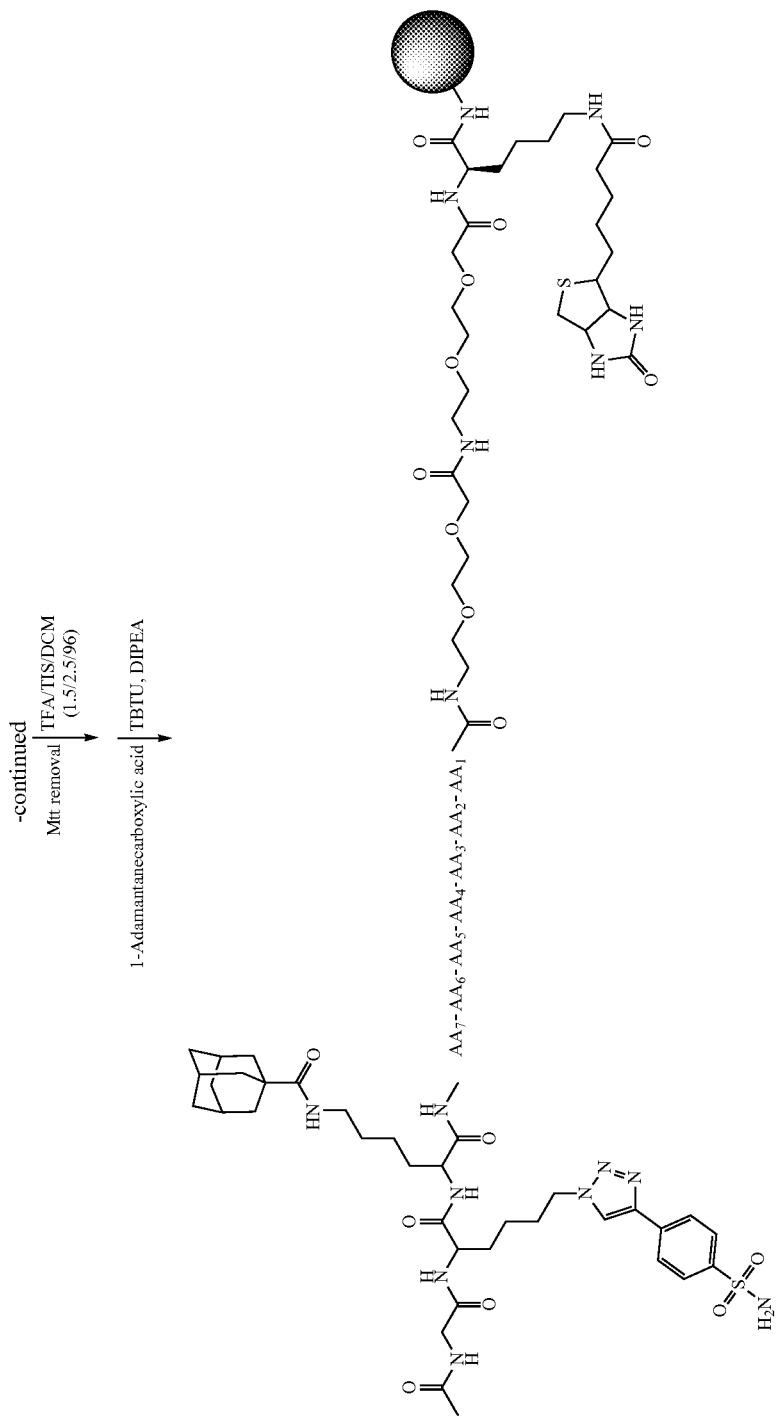

3-4. Synthesis and Purification of Peptide Constructs with Cyclic Structure

The peptide constructs with cyclic structure were formed through a cyclization reaction creating a covalent bond between a carbonyl group of glutamic acid bonded to a C-terminus of an amino acid and an amide group of a N-terminus of an amino acid in the peptides into which glutamic acid was introduced as synthesized in Embodiment 3-2 above.

First, a reaction to remove an allyl protecting group of glutamic acid from the peptide on solid beads was performed. $Pd(PPh_3)_4$ (0.5 equivalent) and $PhSiH_3$ (20 equivalents) were mixed in a DCM solvent under an argon (Ar) atmosphere and were reacted at room temperature.

The beads were washed sequentially with NMP, 0.1 M sodium diethyldithiocarbamate/NMP solution, removing Pd impurities. After removing the Fmoc protecting group with a piperidine/NMP (v/v=1:4) mixed solution, the beads were washed sequentially using NMP, DCM, and NMP. The cyclization reaction was carried out at room temperature with PyAOP (3 equivalents, Cat #36813, GL Biochem) and DIPEA (10 equivalents). After the reaction was completed, the beads were sequentially washed with NMP and DCM, and then vacuum dried.

An example of a cyclization reaction formula for the synthesis of cyclic peptides is shown below.

[Reaction Formula 3]
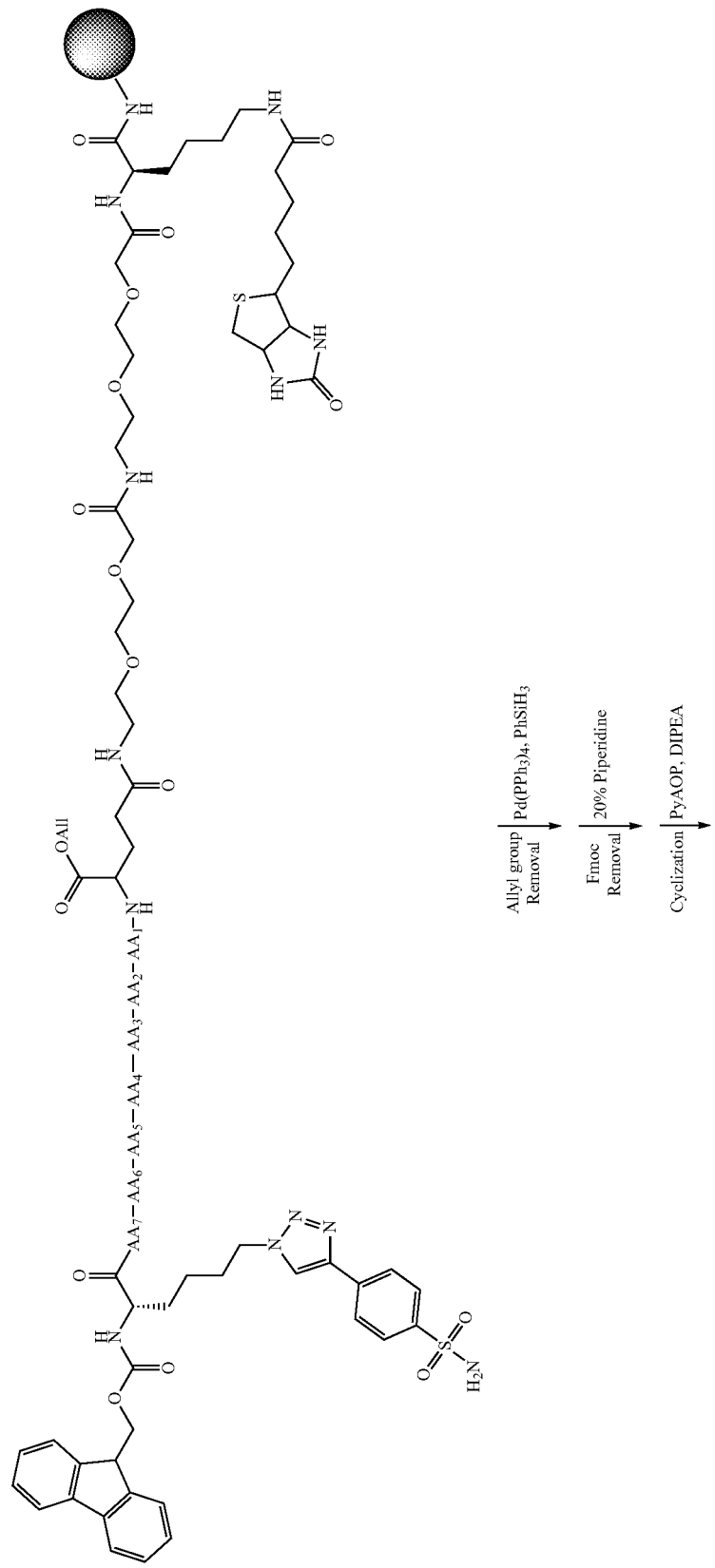

-continued
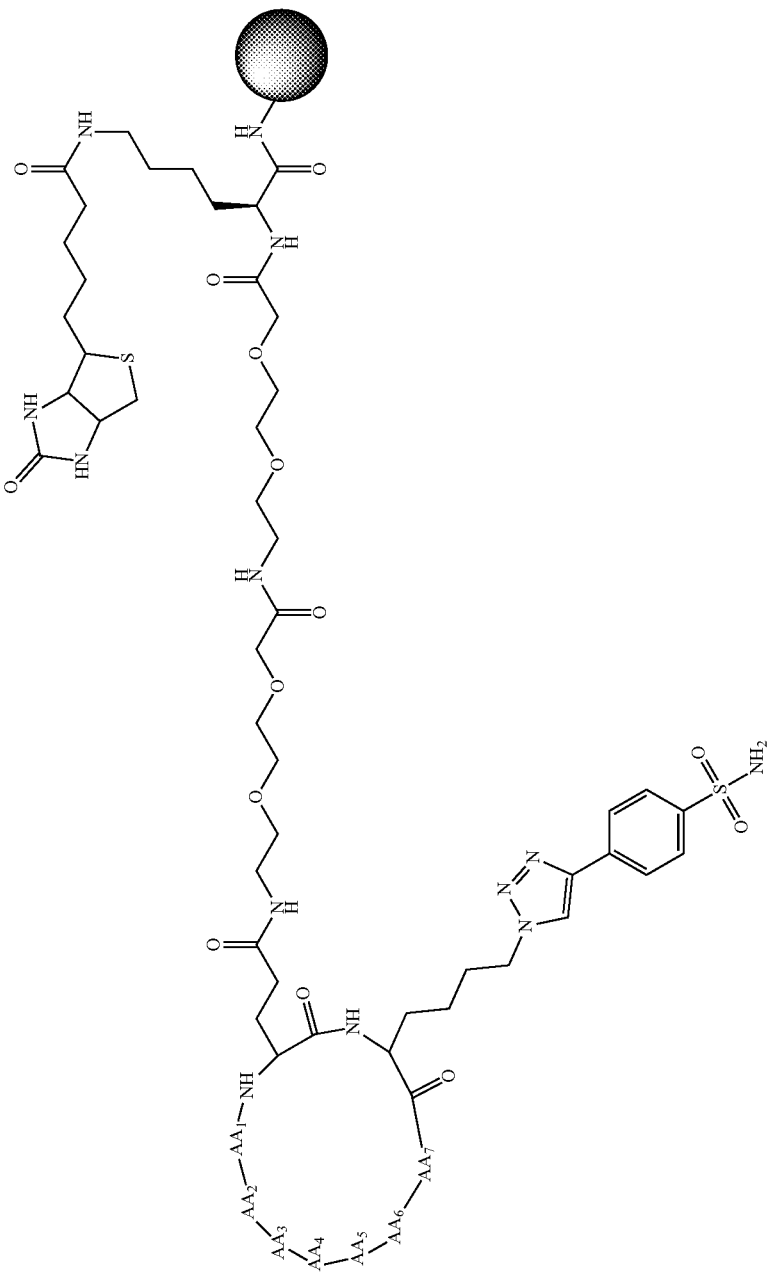

3-5. Split and Purification of the Obtained the Linear or Cyclic Peptide Constructs The beads equipped with the dried linear or cyclic peptides obtained in Embodiments 3-3 and 3-4 were treated with a mixed solution of 95% TFA/2.5% TIS/2.5% H2O. The beads were removed using a filter, the TFA mixed solution containing the peptides was collected in a conical tube, and most of the mixed solution was removed by blowing with nitrogen gas. Subsequently, diethyl ether was added to precipitate the peptides, and then the mixture was placed in a centrifuge and rotated. Thereafter, the upper layer of diethyl ether and a small amount of the remaining TFA mixed solution were removed, and the remaining solid-state peptide was vacuum dried.

After dissolving the peptides cleaved from the solid phase beads in an ACN/H$_2$O (1:1) mixed solution, insoluble foreign substances were removed using a filter (45 μm syringe filter, Cat #DISMIC-3HP, Advantec, Japan). Purification was performed on a 1260 Infinity II LC system (Agilent) under the following conditions: (1) stationary phase is a Kromasil 100-5-C18 column (21.2×250 mm, 5 μm), (2) mobile phase solvent is a mixture of 0.1% TFA-added tertiary distilled water and ACN, (3) flow rate is 15 mL/min, (4) detection wavelengths are 214 and 254 nm. The purity and molecular weight of the purified peptides were measured using LC-MS (1260 infinity II, Infinity Lab LC/MSD, Agilent) and the data were analyzed using MNOVA (v.14.2.0, Mestrelab research, Spain).

An Agilent Poroshell 120 EC-C18 column (4.6×50 mm, 2.7 μm) was used as the stationary phase, and the column temperature was maintained at 40° C. In addition, a mixture of 0.1% TFA-added tertiary distilled water and ACN was used as the mobile phase solvent, and the wavelengths were 214 and 254 nm, and the flow rate was maintained at 1 mL/min. The purified peptide solution was used in powder form after the solvent was removed using a lyophilizer.

As a result, unique linear or cyclic peptide constructs comprising peptides specifically binding to human CAIX and having 1 or 2 sulfonamide functional groups were obtained, which are represented by the following Chemical Formulas 3 to 8.

[Linear peptide constructs of Chemical Formula 3]

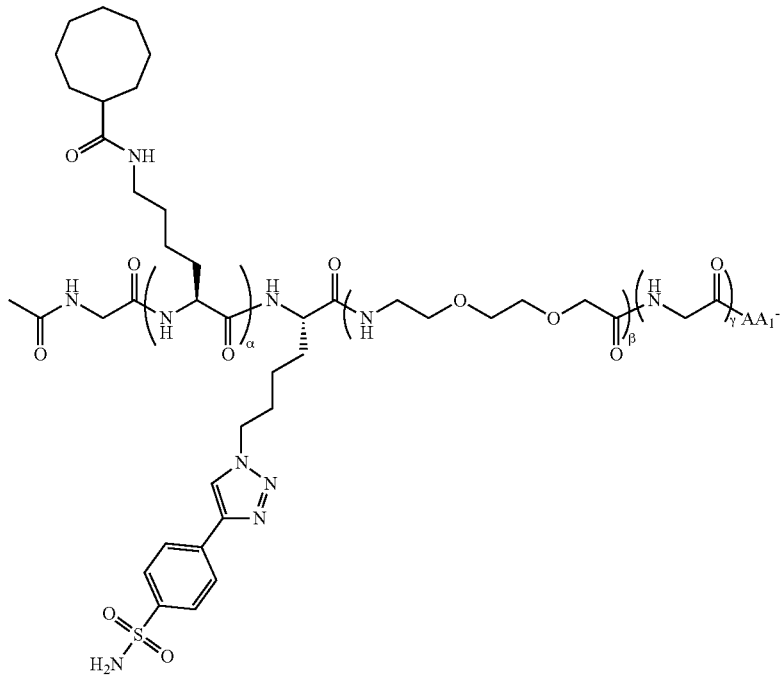

-continued
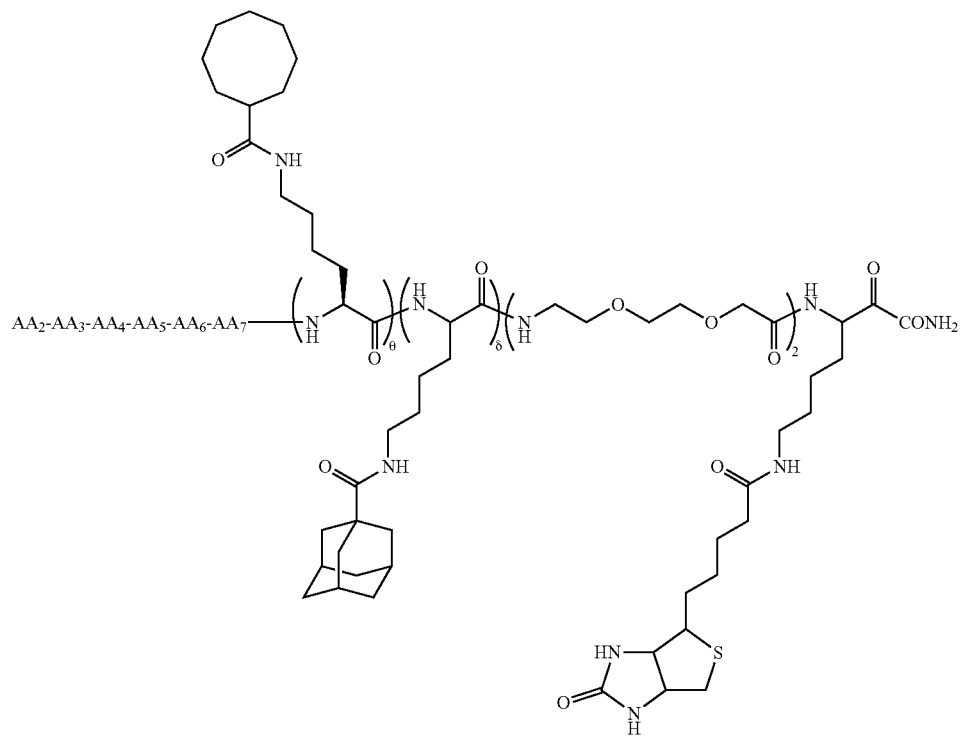
| No. | α | β | γ | AA₁ | AA₂ | AA₃ | AA₄ | AA₅ | AA₆ | AA₇ | θ | δ |
|---|---|---|---|---|---|---|---|---|---|---|---|---|
| 1  | 0 | 1 | 1 | r | a | h | k | h | y | h | 0 | 0 |
| 2  | 0 | 1 | 1 | h | r | k | h | d | d | n | 0 | 0 |
| 3  | 0 | 1 | 1 | a | y | y | r | k | k | w | 0 | 0 |
| 4  | 0 | 1 | 1 | r | r | l | l | f | s | G | 0 | 0 |
| 5  | 0 | 0 | 1 | r | r | f | h | f | t | h | 0 | 0 |
| 6  | 0 | 0 | 1 | a | y | y | r | k | k | w | 0 | 0 |
| 7  | 0 | 0 | 1 | r | r | l | l | f | s | G | 0 | 0 |
| 8  | 0 | 0 | 1 | r | r | f | h | f | t | h | 0 | 0 |
| 9  | 0 | 0 | 1 | f | h | s | r | r | d | v | 0 | 0 |
| 10 | 0 | 0 | 1 | v | l | r | n | k | s | d | 0 | 0 |
| 11 | 0 | 0 | 1 | r | s | r | h | f | h | y | 0 | 0 |
| 12 | 0 | 0 | 1 | f | h | r | i | k | h | l | 0 | 0 |
| 13 | 0 | 0 | 1 | r | i | t | a | i | n | y | 0 | 0 |
| 14 | 0 | 0 | 2 | y | h | k | h | i | r | q | 0 | 0 |
| 15 | 0 | 0 | 3 | h | f | v | k | k | f | r | 0 | 0 |
| 16 | 0 | 0 | 3 | f | f | k | r | k | h | e | 0 | 0 |
| 17 | 0 | 0 | 3 | h | G | h | l | f | k | r | 0 | 0 |
| 18 | 0 | 0 | 3 | r | f | h | h | f | r | n | 0 | 0 |
| 19 | 0 | 0 | 3 | r | l | s | k | f | h | s | 0 | 0 |
| 20 | 0 | 0 | 3 | y | e | t | f | r | t | r | 0 | 0 |
| 21 | 0 | 0 | 0 | r | r | f | r | h | y | h | 0 | 0 |
| 22 | 0 | 0 | 0 | r | r | f | r | h | y | h | 1 | 0 |
| 23 | 1 | 0 | 0 | r | r | f | r | h | y | h | 0 | 0 |
| 24 | 0 | 0 | 0 | r | r | f | r | h | y | h | 0 | 1 |

[Linear peptide constructs of Chemical Formula 4]

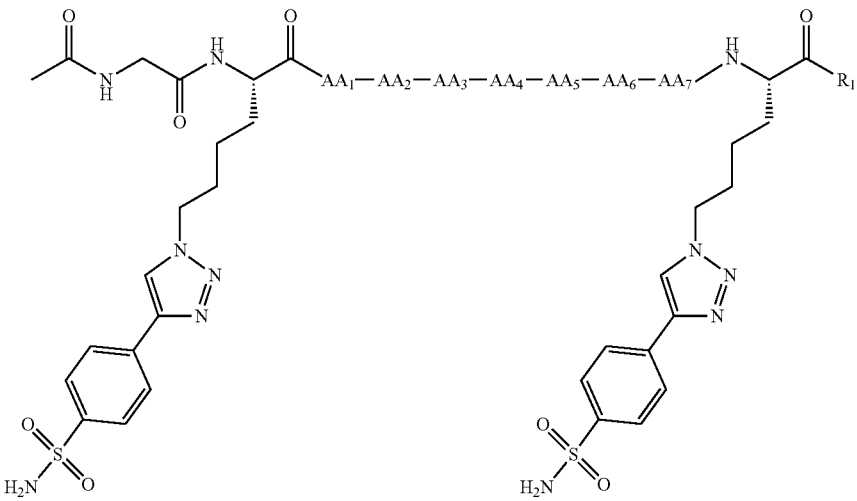

| No. | AA₁ | AA₂ | AA₃ | AA₄ | AA₅ | AA₆ | AA₇ | R₁ |
|---|---|---|---|---|---|---|---|---|
| 25 | r | r | f | r | h | y | h | (PEG1)₂-K(biotin)-NH₂ |
| 26 | r | r | f | r | h | y | h | Uk(DOTA)-(PEG1)₂-K(biotin)-NH₂ |
| 27 | r | r | U(1-Nal) | r | h | Uk(PhF₅) | h | Uk(DOTA)-(PEG1)₂-K(biotin)-NH₂ |

[Linear peptide constructs of Chemical Formula 5]

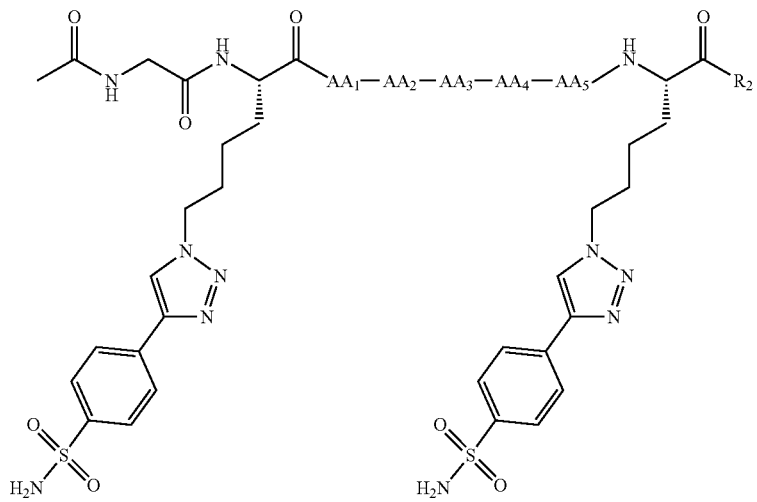

| No. | AA₁ | AA₂ | AA₃ | AA₄ | AA₅ | R₂ |
|---|---|---|---|---|---|---|
| 28 | r | r | f | r | y | (PEG1)₂-K(biotin)-NH₂ |
| 29 | r | r | f | r | y | Uk(DOTA)-(PEG1)₂-K(biotin)-NH₂ |
| 30 | r | r | U(1-Nal) | r | y | (PEG1)₂-K(biotin)-NH₂ |
| 31 | r | r | f | r | Uk(biphenol) | (PEG1)₂-K(biotin)-NH₂ |

-continued

| | | | | | | |
|---|---|---|---|---|---|---|
| 32 | r | r | U(1-Nal) | r | Uk(PhF$_5$) | Uk(DOTA)-(PEG1)$_2$-K(biotin)-NH$_2$ |
| 33 | e | r | U(1-Nal) | r | Uk(PhF$_5$) | Uk(DOTA)-(PEG1)$_2$-K(biotin)-NH$_2$ |
| 34 | r | l | U(1-Nal) | e | Uk(PhF$_5$) | Uk(DOTA)-(PEG1)$_2$-K(biotin)-NH$_2$ |

[Cyclic peptide constructs of Chemical Formula 6]

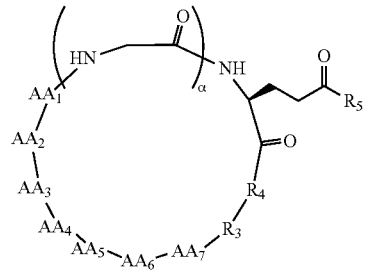

| No. | R$_4$ | R$_3$ | α | AA$_7$ | AA$_6$ | AA$_5$ | AA$_4$ | AA$_3$ | AA$_2$ | AA$_1$ | R$_5$ |
|---|---|---|---|---|---|---|---|---|---|---|---|
| 35 | | K(SFA) | 1 | r | r | f | h | f | t | h | NH$_2$ |
| 36 | | K(SFA) | 1 | r | r | f | h | f | t | h | (PEG1)$_2$-K(biotin)-NH$_2$ |
| 37 | K(cyclooctane) | K(SFA) | 1 | r | r | f | h | f | t | h | (PEG1)$_2$-K(biotin)-NH$_2$ |
| 38 | | K(SFA) | 0 | r | r | f | r | h | y | h | (PEG1)$_2$-K(biotin)-NH$_2$ |
| 39 | K(Admantane) | K(SFA) | 0 | r | r | f | r | h | y | h | (PEG1)$_2$-K(biotin)-NH$_2$ |
| 40 | K(cyclooctane) | K(SFA) | 0 | r | r | f | r | h | y | h | (PEG1)$_2$-K(biotin)-NH$_2$ |
| 41 | | Uk(SFA) | 0 | h | y | h | r | f | r | r | (PEG1)$_2$-K(biotin)-NH$_2$ |
| 42 | Uk(cyclooctane) | Uk(SFA) | 0 | h | y | h | r | f | r | r | (PEG1)$_2$-K(biotin)-NH$_2$ |
| 43 | | Uk(SFA) | 0 | h | y | h | r | f | r | r | (Sar)$_6$-K(AF488)-NH$_2$ |
| 44 | Uk(cyclooctane) | Uk(SFA) | 0 | h | y | h | r | f | r | r | (Sar)$_6$-K(AF488)-NH$_2$ |
| 45 | Uk(Admantane) | Uk(SFA) | 0 | h | y | h | r | f | r | r | (PEG1)$_2$-K(AF488)-NH$_2$ |
| 46 | Uk(Admantane) | Uk(SFA) | 0 | h | y | h | r | f | r | r | (PEG1)$_2$-K(biotin)-NH$_2$ |
| 47 | Uk(Admantane) | Uk(SFA) | 0 | h | y | h | r | f | r | r | K(DOTA)-(PEG1)$_2$-K(biotin)-NH$_2$ |
| 48 | Uk(Admantane) | Uk(SFA) | 0 | h | y | h | r | f | r | r | (PEG1)$_2$-K(DOTA)-NH$_2$ |
| 49 | Uk(Admantane) | Uk(SFA) | 0 | h | y | h | r | f | r | r | (Sar)$_6$-K(AF488)-NH$_2$ |
| 50 | Uk(Admantane) | Uk(SFA) | 0 | h | y | h | r | f | r | r | K(AF488)-NH$_2$ |
| 51 | Uk(Admantane) | UAha(AZA) | 0 | h | y | h | r | f | r | r | (PEG1)$_2$-K(biotin)-NH$_2$ |
| 52 | G | UAha(AZA) | 0 | h | y | h | r | f | r | r | (PEG1)$_2$-K(biotin)-NH$_2$ |
| 53 | Uk(Admantane) | Uk(Thiophene) | 0 | h | y | h | r | f | r | r | (PEG1)$_2$-K(biotin)-NH$_2$ |
| 54 | G | Uk(Thiophene) | 0 | h | y | h | r | f | r | r | (PEG1)$_2$-K(biotin)-NH$_2$ |
| 55 | K(Admantane) | K(SFA) | 0 | h | U(Phe(F$_5$)) | h | r | f | r | r | (PEG1)$_2$-K(biotin)-NH$_2$ |
| 56 | K(Admantane) | K(SFA) | 0 | h | U(Phe(4-NH$_2$)) | h | r | f | r | r | (PEG1)$_2$-K(biotin)-NH$_2$ |
| 57 | K(Admantane) | K(SFA) | 0 | h | U(1-Nal) | h | r | f | r | r | (PEG1)$_2$-K(biotin)-NH$_2$ |
| 58 | K(Admantane) | K(SFA) | 0 | h | U(BiP(4,4-)) | h | r | f | r | r | (PEG1)$_2$-K(biotin)-NH$_2$ |
| 59 | Uk(Admantane) | Uk(SFA) | 0 | h | y | h | r | U(Phe(F$_5$)) | r | r | (PEG1)$_2$-K(biotin)-NH$_2$ |
| 60 | Uk(Admantane) | Uk(SFA) | 0 | h | y | h | r | U(Phe(4-NH$_2$)) | r | r | (PEG1)$_2$-K(biotin)-NH$_2$ |
| 61 | Uk(Admantane) | Uk(SFA) | 0 | h | y | h | r | U(1-Nal) | r | r | (PEG1)$_2$-K(biotin)-NH$_2$ |
| 62 | Uk(Admantane) | Uk(SFA) | 0 | h | y | h | r | U(BiP(4,4-)) | r | r | (PEG1)$_2$-K(biotin)-NH$_2$ |

[Cyclic peptide constructs of Chemical Formula 7]

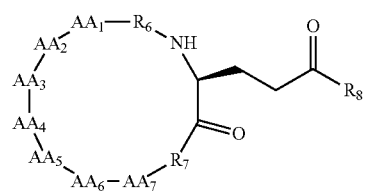

| No. | R$_7$ | AA$_7$ | AA$_6$ | AA$_5$ | AA$_4$ | AA$_3$ | AA$_2$ | AA$_1$ | R$_6$ | R$_8$ |
|---|---|---|---|---|---|---|---|---|---|---|
| 63 | K(SFA) | r | r | f | r | h | y | h | K(SFA) | UK(DOTA)-(PEG1)$_2$-K(biotin)-NH$_2$ |
| 64 | Uk(SFA) | h | y | h | r | f | r | r | Uk(SFA) | (PEG1)$_2$-K(biotin)-NH$_2$ |
| 65 | Uk(SFA) | h | y | h | r | f | r | r | Uk(SFA) | UK(DOTA)-(PEG1)$_2$-K(biotin)-NH$_2$ |

[Cyclic peptide constructs of Chemical Formula 8]

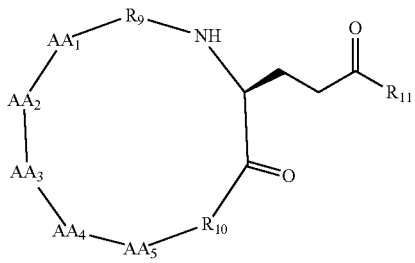

| No. | R10 | AA5 | AA4 | AA3 | AA2 | AA1 | R9 | R11 |
|---|---|---|---|---|---|---|---|---|
| 66 | K(SFA) | r | r | f | r | y | K(SFA) | UK(DOTA)-(PEG1)$_2$-K(biotin)-NH$_2$ |
| 67 | K(SFA) | r | r | U(homo-f) | r | y | K(SFA) | UK(DOTA)-(PEG1)$_2$-K(biotin)-NH$_2$ |
| 68 | K(SFA) | r | r | U(1-Nal) | r | Uk(PhF$_5$) | K(SFA) | UK(DOTA)-(PEG1)$_2$-K(biotin)-NH$_2$ |
| 69 | K(SFA) | r | r | U(1-Nal) | e | Uk(PhF$_5$) | K(SFA) | UK(DOTA)-(PEG1)$_2$-K(biotin)-NH$_2$ |
| 70 | K(SFA) | e | r | U(1-Nal) | e | Uk(PhF$_5$) | K(SFA) | UK(DOTA)-(PEG1)$_2$-K(biotin)-NH$_2$ |
| 71 | Uk(SFA) | y | r | f | r | r | Uk(SFA) | UK(DOTA)-(PEG1)$_2$-K(biotin)-NH$_2$ |
| 72 | Uk(SFA) | y | r | f | r | r | Uk(SFA) | Uk(6OH)-Uk(DOTA)-(PEG1)$_2$-K(biotin)-NH$_2$ |
| 73 | UAha(AZA) | y | r | f | r | r | UAha(AZA) | K(DOTA)-(PEG1)$_2$-K(biotin)-NH$_2$ |
| 74 | Uk(SFA) | y | R | f | r | r | Uk(SFA) | UK(DOTA)-(PEG1)$_2$-K(biotin)-NH$_2$ |
| 75 | uOrn(SFA) | y | R | f | r | r | UOrn(SFA) | UK(DOTA)-(PEG1)$_2$-K(biotin)-NH$_2$ |
| 76 | UAha(SFA) | y | R | f | r | r | UAha(SFA) | UK(DOTA)-(PEG1)$_2$-K(biotin)-NH$_2$ |
| 77 | UAza(SFA) | y | R | f | r | r | UAza(SFA) | UK(DOTA)-(PEG1)$_2$-K(biotin)-NH$_2$ |
| 78 | Uk(SFA) | y | R | f | r | r | UAha(SFA) | UK(DOTA)-(PEG1)$_2$-K(biotin)-NH$_2$ |
| 79 | UAha(SFA) | y | R | f | r | r | Uk(SFA) | UK(DOTA)-(PEG1)$_2$-K(biotin)-NH$_2$ |
| 80 | Uk(SFA) | y | R | f | r | r | Uk(SFA) | se-k(DOTA)-ee-Pra(AF488)-NH2 |
| 81 | UAha(SFA) | y | R | f | r | r | UAha(SFA) | se-k(DOTA)-ee-Pra(AF438)-NH2 |
| 82 | Uk(SFA) | y | R | f | r | r | UAha(SFA) | se-k(DOTA)-ee-Pra(AF488)-NH2 |
| 83 | Uk(SFA) | y | R | f | r | r | Uk(SFA) | sdrds-Uk(DOTA)-(PEG1)$_2$-K(biotin)-NH$_2$ |
| 84 | Uk(SFA) | y | R | f | r | r | Uk(SFA) | sdrd-Uk(6OH)-Uk(DOTA)-(PEG1)$_2$-K(biotin)-NH$_2$ |
| 85 | Uk(SFA) | y | R | f | r | r | Uk(SFA) | sd-Uk(6OH)-d-NH$_2$ |
| 86 | Uk(SFA) | y | R | f | r | r | Uk(SFA) | sd-Uk(6OH)-d-Valine-Citrulline-PABC-MMAE |
| 87 | Uk(SFA) | y | e | f | r | r | Uk(SFA) | UK(DOTA)-(PEG1)$_2$-K(biotin)-NH$_2$ |
| 88 | Uk(SFA) | y | r | f | e | r | Uk(SFA) | UK(DOTA)-(PEG1)$_2$-K(biotin)-NH$_2$ |
| 89 | Uk(SFA) | y | r | f | r | e | Uk(SFA) | UK(DOTA)-(PEG1)$_2$-K(biotin)-NH$_2$ |
| 90 | Uk(SFA) | Uk(PhF$_5$) | r | U(1-Nal) | r | r | Uk(SFA) | UK(DOTA)-(PEG1)$_2$-K(biotin)-NH$_2$ |
| 91 | Uk(SFA) | y | r | U(1-Nal) | r | r | Uk(SFA) | UK(DOTA)-(PEG1)$_2$-K(biotin)-NH$_2$ |
| 92 | Uk(SFA) | Uk(PhF$_5$) | r | f | r | r | Uk(SFA) | UK(DOTA)-(PEG1)$_2$-K(biotin)-NH$_2$ |
| 93 | Uk(SFA) | U(Phe(4-NH$_2$)) | r | U(1-Nal) | r | r | Uk(SFA) | UK(DOTA)-(PEG1)$_2$-K(biotin)-NH$_2$ |

| 94 | Uk(SFA) | y | R | f | r | r | Uk(SFA) | VPTLQ-Uk(AF488)-NH$_2$ |
| 95 | Uk(SFA) | y | R | f | r | r | Uk(SFA) | sd-Uk(DOTA)-dds-Uk(IB)-Uk(6OH)-NH$_2$ |
In the Formulas 3 to 8, AA1 to AA7 represent amino acid residues, lowercase letters represent D-amino acids, uppercase letters represent L-amino acids, respectively, and U means modified or unnatural D-amino acids, which have the following structures as defined herein.
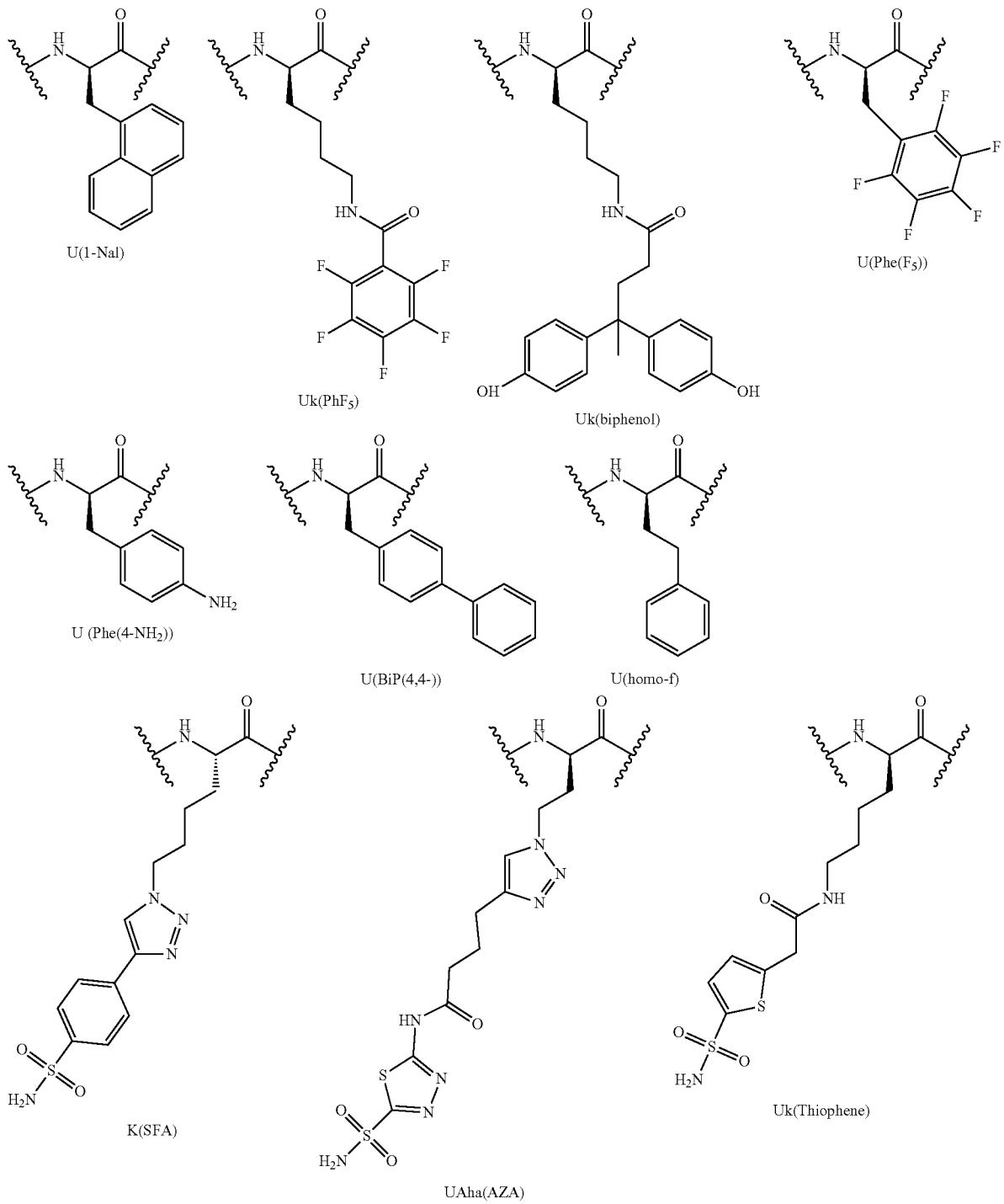

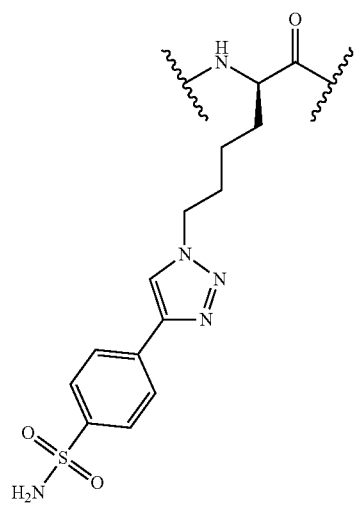
Uk(SFA)
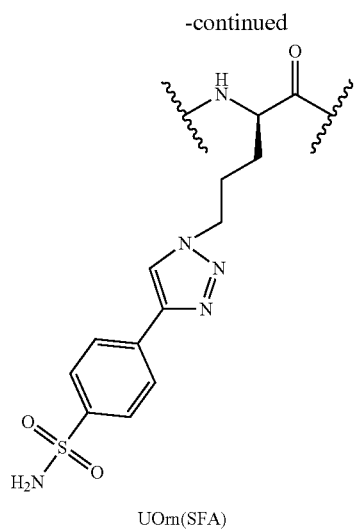
UOrn(SFA)
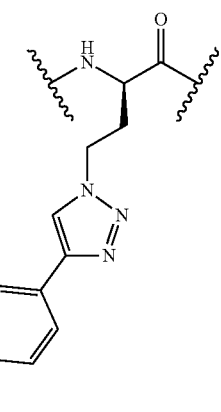
UAha(SFA)
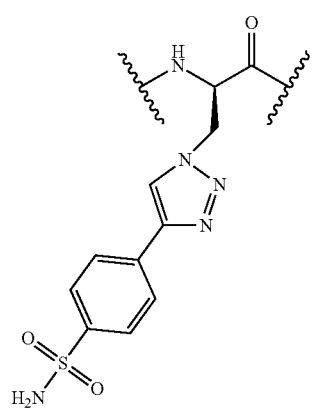
UAza(SFA)
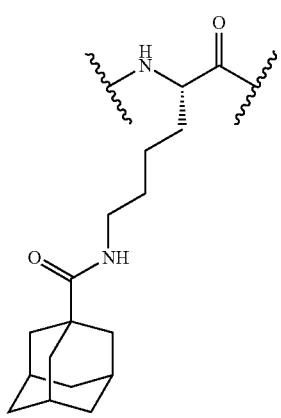
Uk(Adamatane)
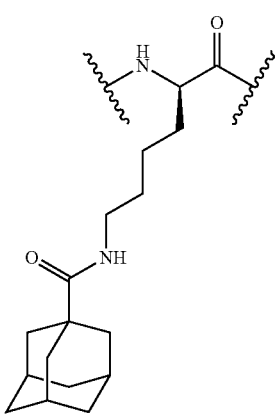
K(Adamantane)
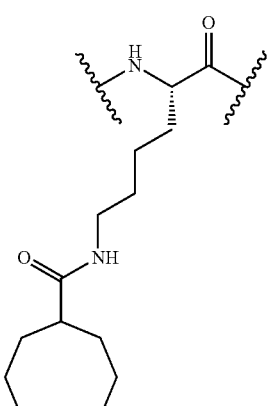
Uk(Cyclooctane)
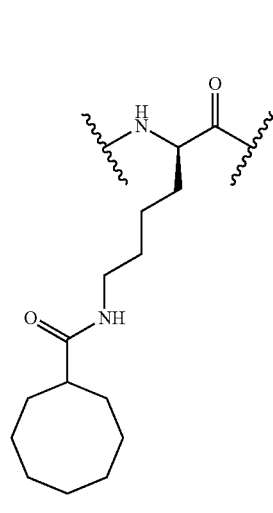
K(Cyclooctane)
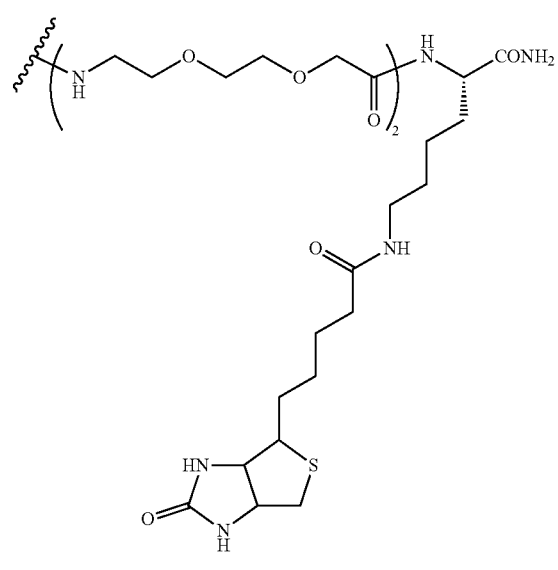
(PEG1)$_2$-K(biotin)-NH$_2$ -continued
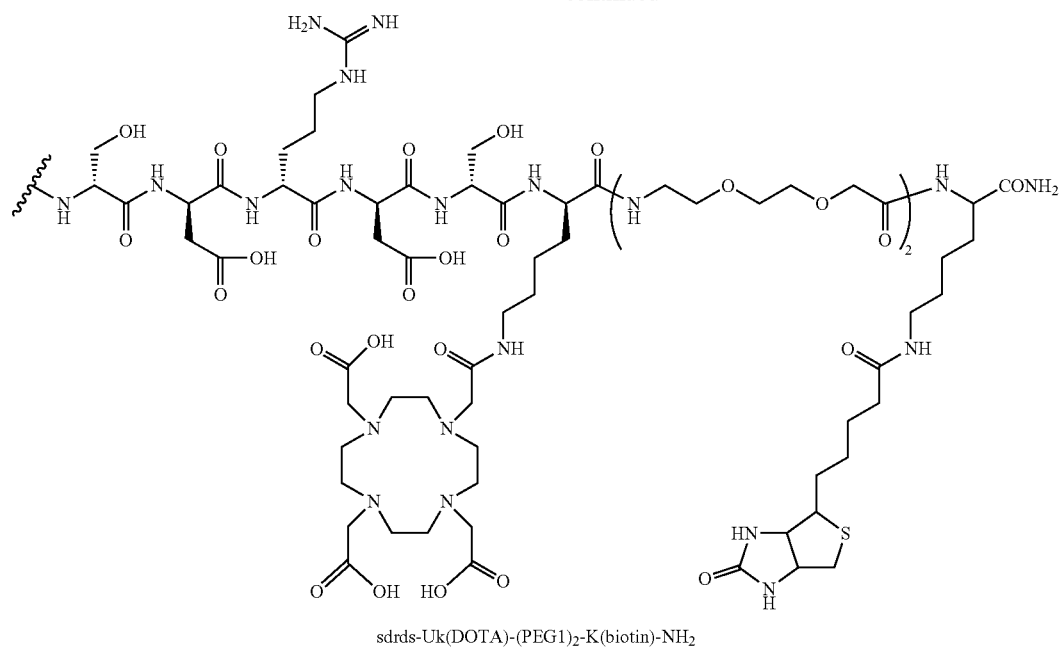
sdrds-Uk(DOTA)-(PEG1)₂-K(biotin)-NH₂
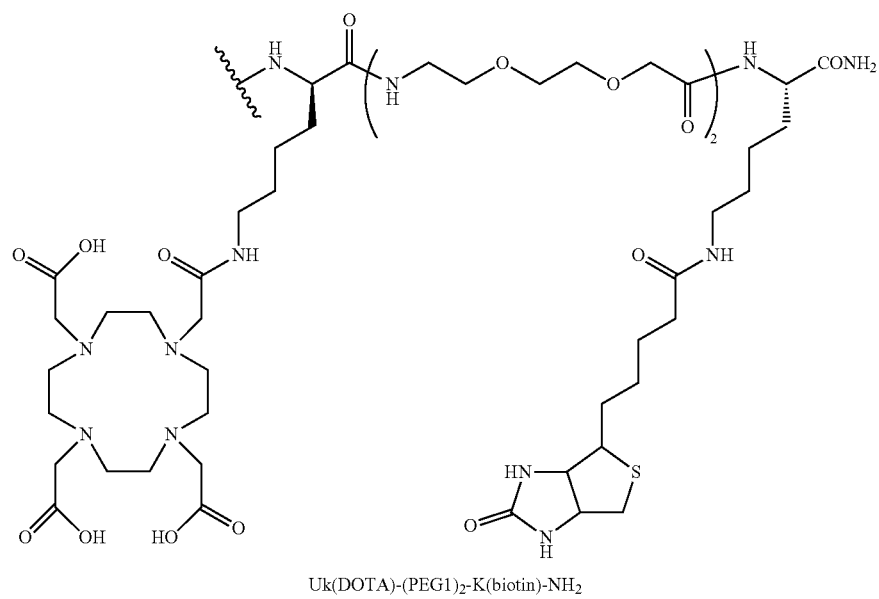
Uk(DOTA)-(PEG1)₂-K(biotin)-NH₂

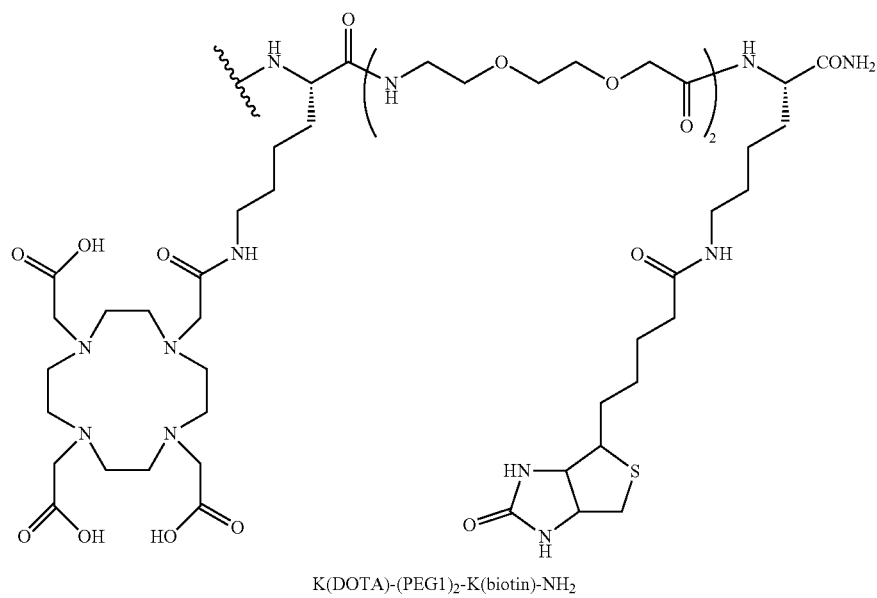
K(DOTA)-(PEG1)$_2$-K(biotin)-NH$_2$
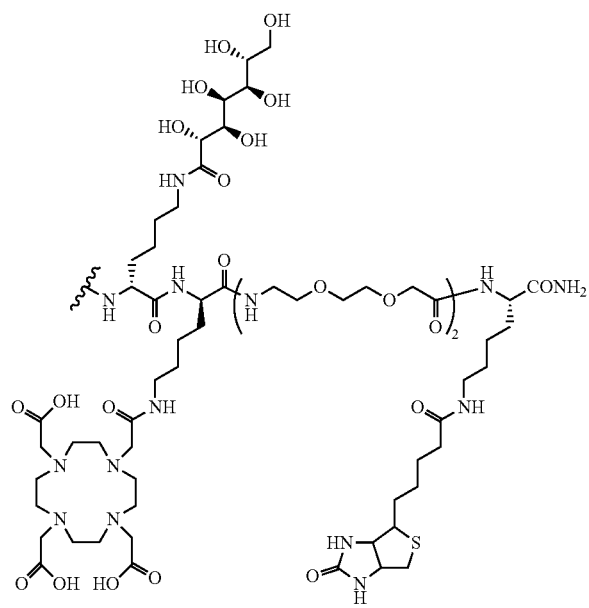
Uk(6OH)-Uk(DOTA)-(PEG1)$_2$-K(biotin)-NH$_2$

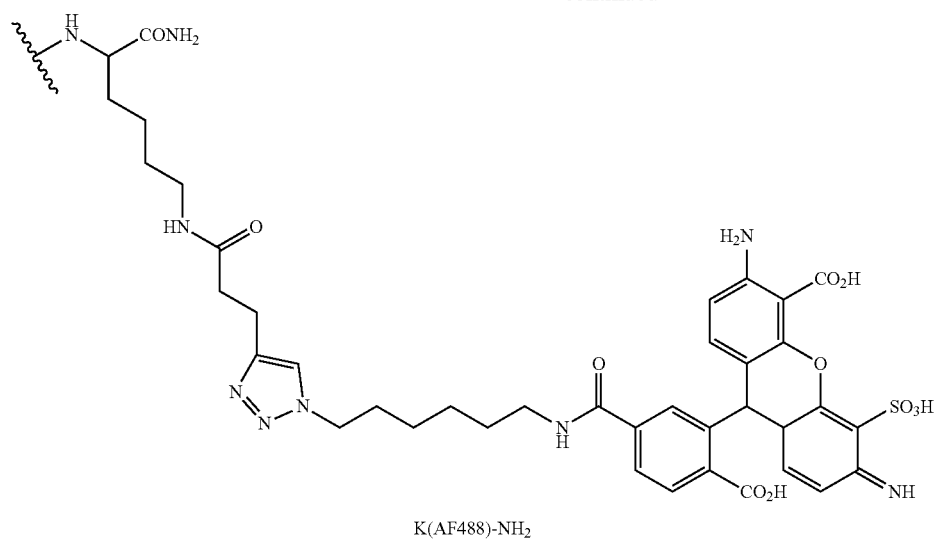
K(AF488)-NH₂
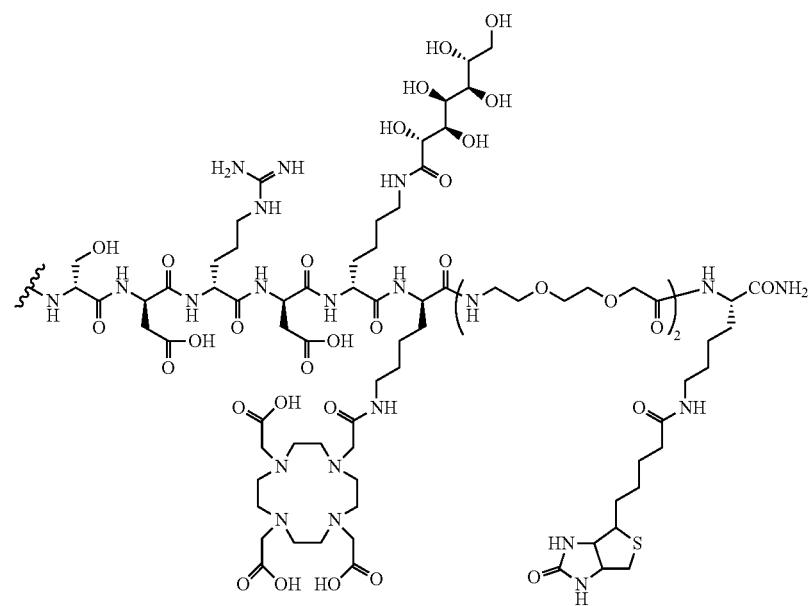
sdrd-Uk(60H)-Uk(DOTA)-(PEG1)₂-K(biotin)-NH₂

-continued
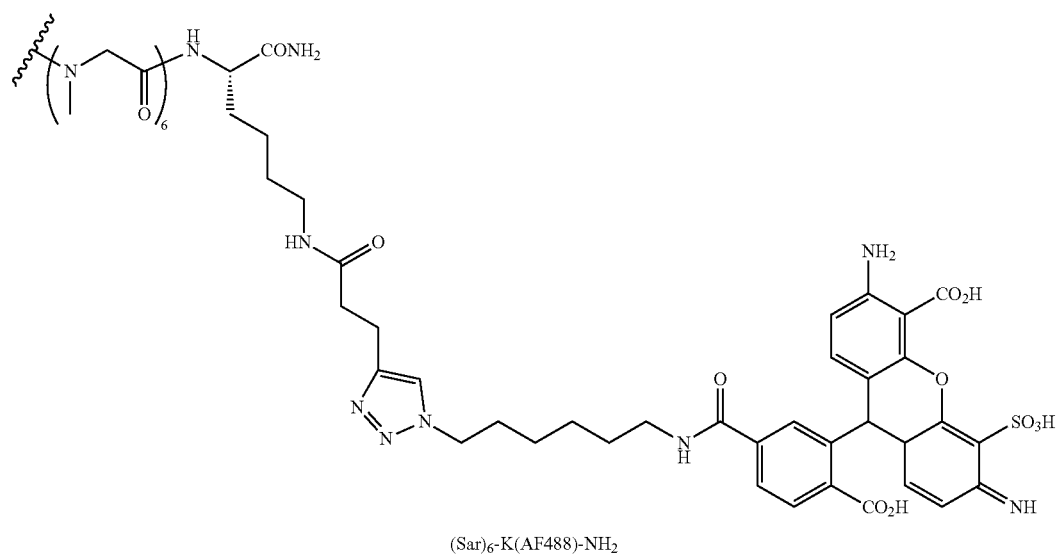
(Sar)₆-K(AF488)-NH₂
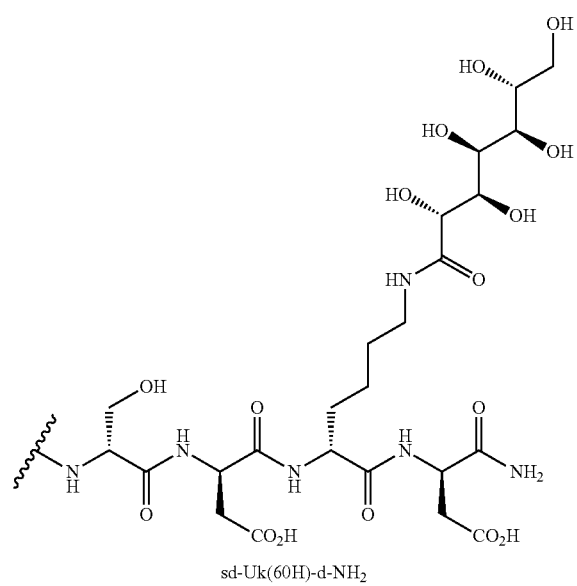
sd-Uk(6OH)-d-NH₂
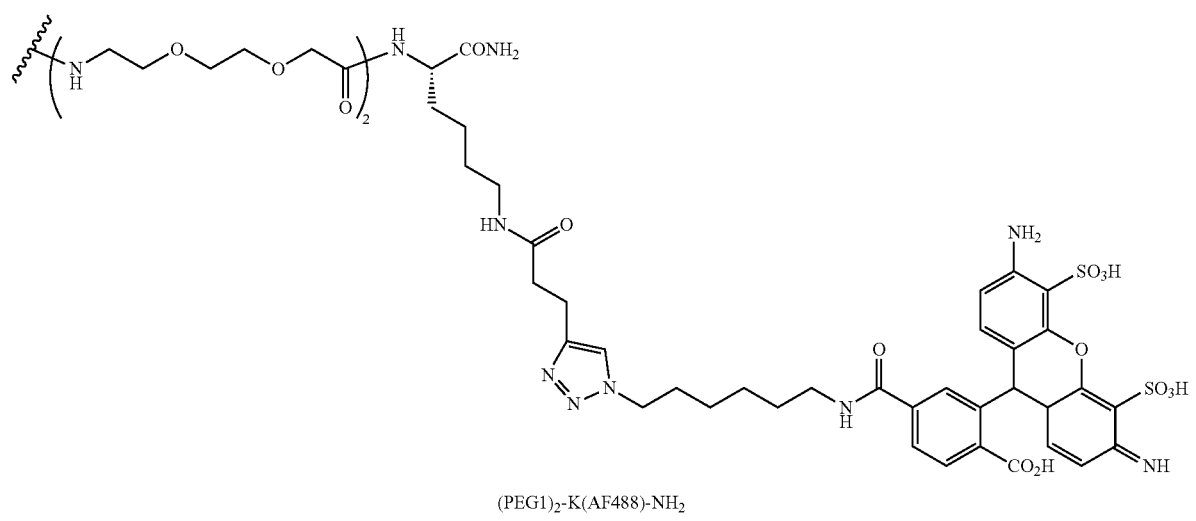
(PEG1)₂-K(AF488)-NH₂

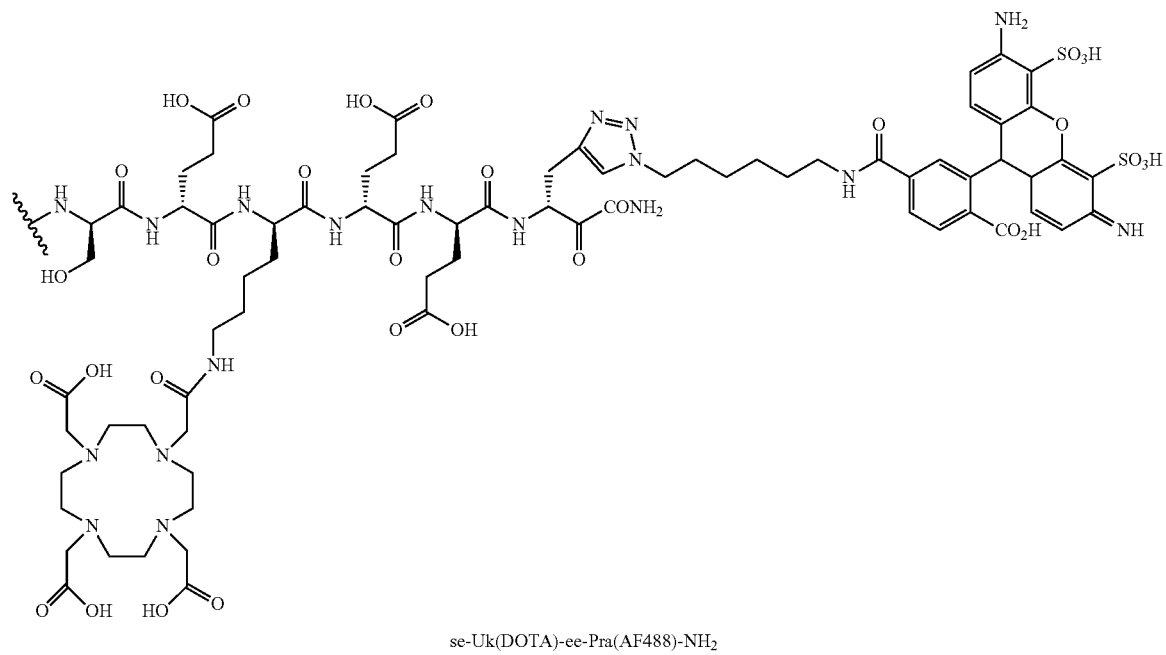
se-Uk(DOTA)-ee-Pra(AF488)-NH₂
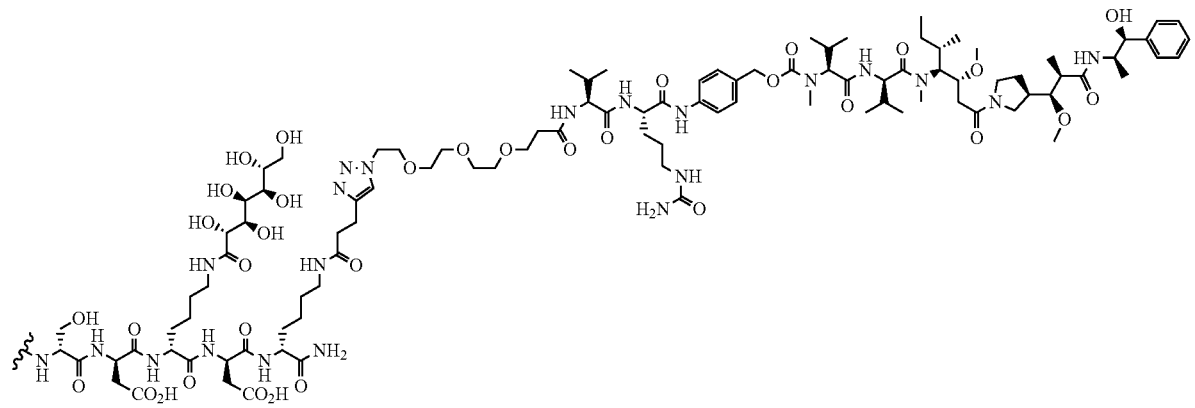
sd-Uk(60H)-d-Valine-Citrulline-PABC-MMAE
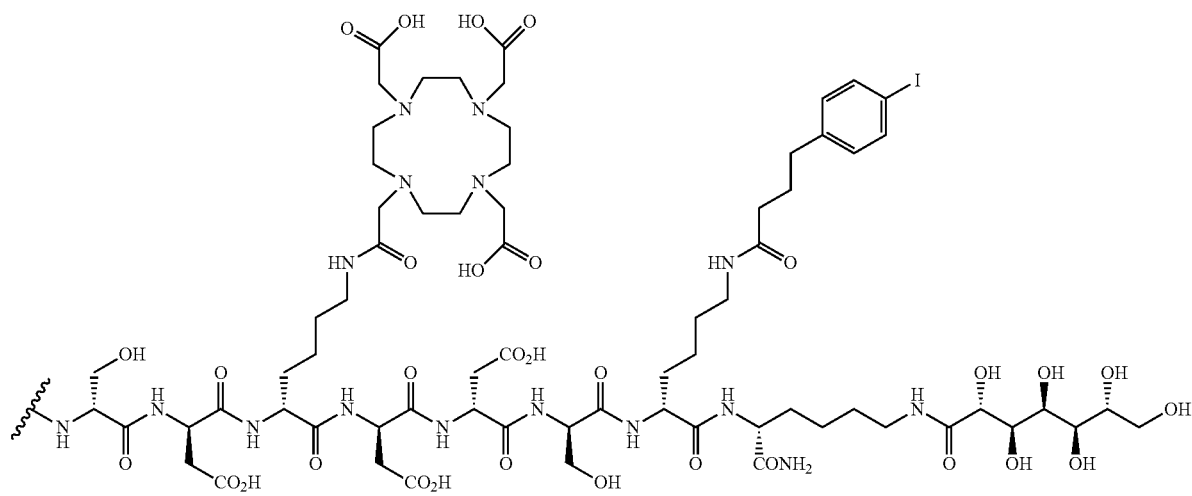
sd-Uk(DOTA)-dds-Uk(IB)-Uk(60H)-NH₂

Embodiment 4. Stability Evaluation of Peptide Constructs

Stability tests in the serum and plasma were conducted on the peptide constructs obtained in Embodiment 3. A solution of the peptide structure diluted to a final concentration of 50 μm in 1 mL of 100% pure human serum (Cat #S1, Merk) or plasma (Cat #70039.1, STEMCELL Technologies) [or 100% pure mouse serum (Sigma, Cat #S7273) or plasma (Rockland, Cat #D508-06-0050)] was divided into 100 μL. Then, while stored at 37° C., analysis was performed once a day for 7 days using the LC-MS (1260 Infinity II, Infinity Lab LC/MSD, Aglient) equipped with the Agilent Poroshell 120 EC-C18 column (4.6×50 mm, 2.7 μm). Before injecting the sample into the LC, 100 μL of ACN was added to the serum or plasma solution containing the peptides, then put into the centrifuge and spun to settle the precipitate, and only 10 μL of the supernatant was used for analysis.

Figure 5A:
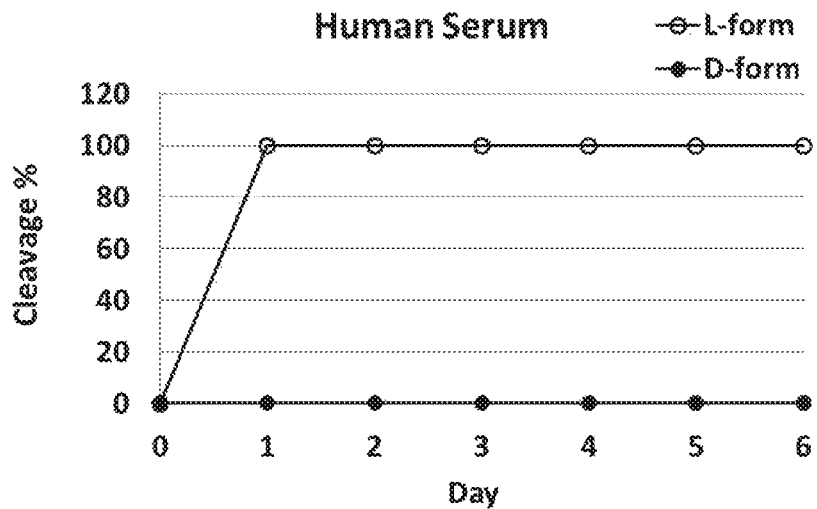
FIG. 5a shows graphs displaying the results of stability tests of the peptide construct (No. 35) according to an embodiment of the present invention in serumF.
Figure 5A:
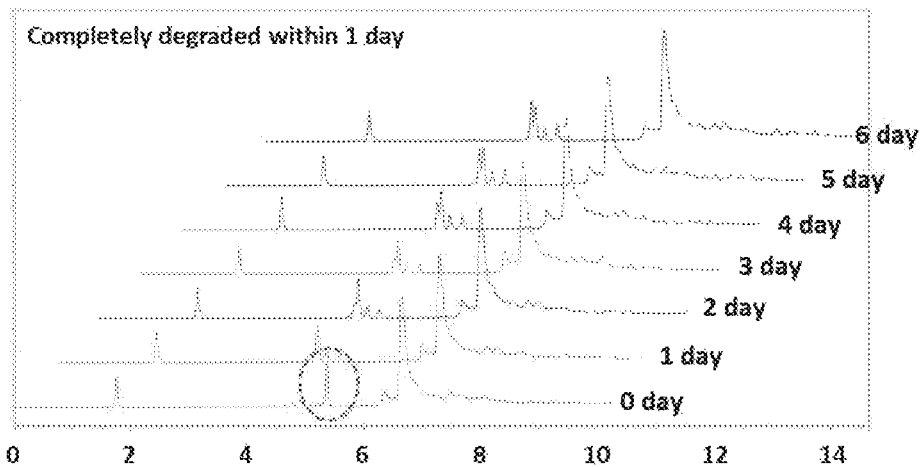
Figure 5A:
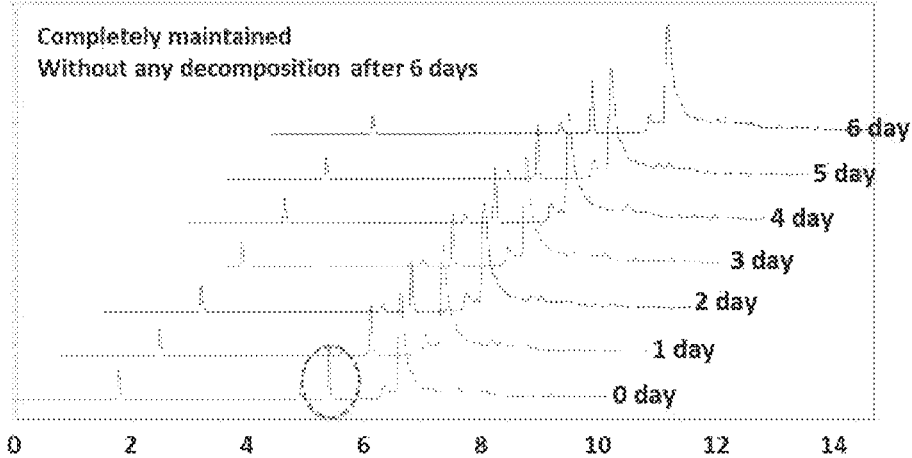
Figure 5B:
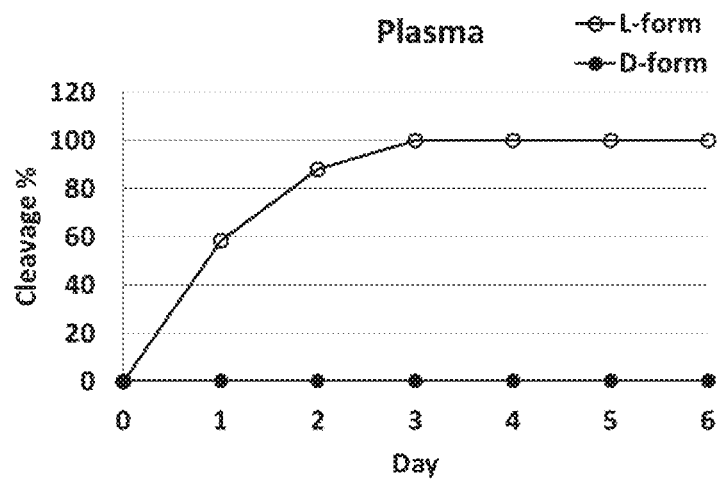
FIG. 5b shows graphs showing the results of stability tests of the peptide construct (No. 35) according to an embodiment of the present invention in plasma.
Figure 5B:
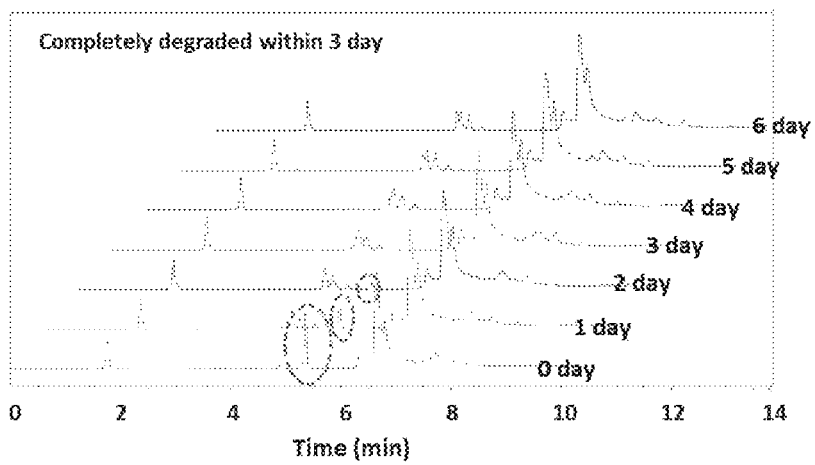
Figure 5B:
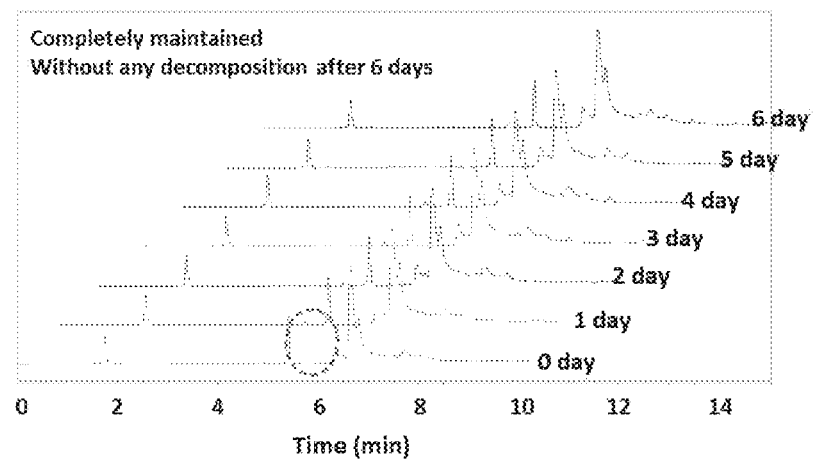

FIGS. 5a and 5b, and FIGS. 6a and 6b show the results of stability tests in serum and plasma of peptide construct Nos. 35 and 48, respectively. The peptide construct No. 35 containing D-amino acids was not degraded at all and was completely maintained even after 6 days in serum and plasma. However, when all amino acid residues of the peptide construct No. 35 were changed to L-form, it was confirmed that the peptide construct was completely degraded within 1 day in serum and within 3 days in plasma (FIGS. 5a and 5b).

Figure 6A:
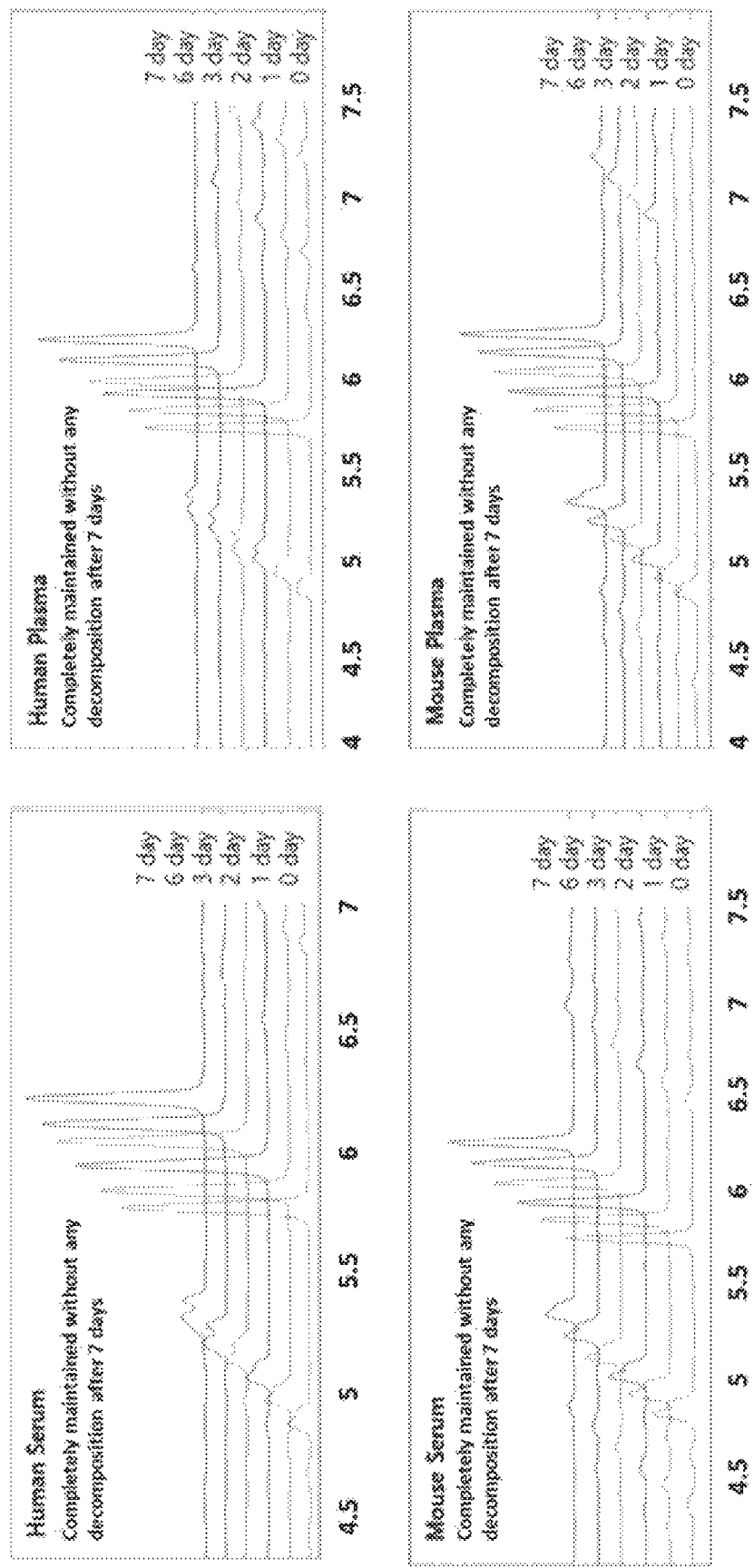
FIG. 6a shows graphs showing the results of stability tests of the peptide construct (No. 48) according to an embodiment of the present invention in serum.
Figure 6B:
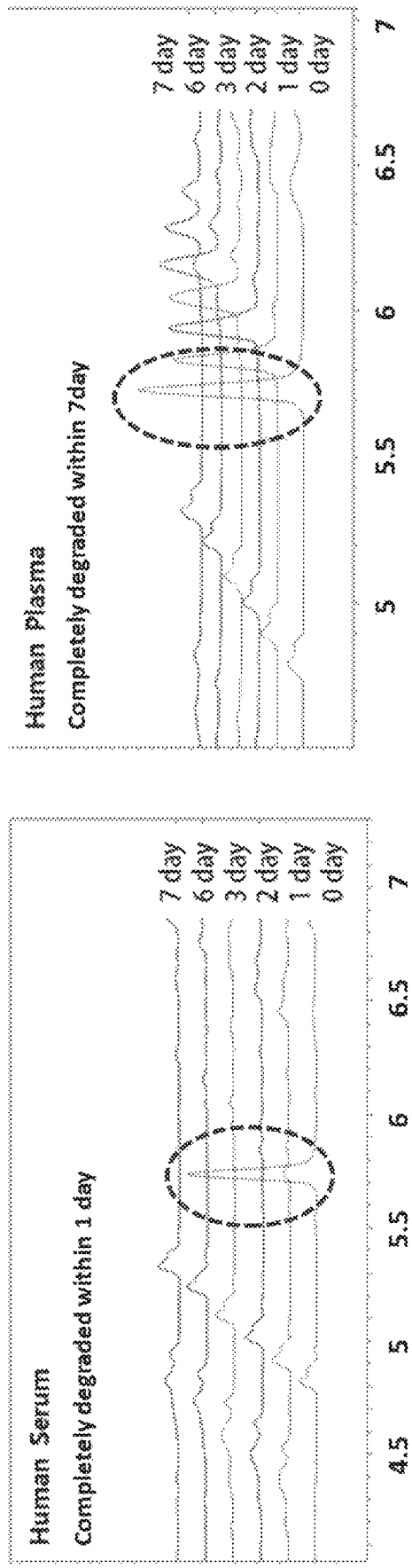
FIG. 6b shows graphs showing the results of stability tests of the peptide construct (No. 48) according to an embodiment of the present invention in plasma.
Figure 7A:
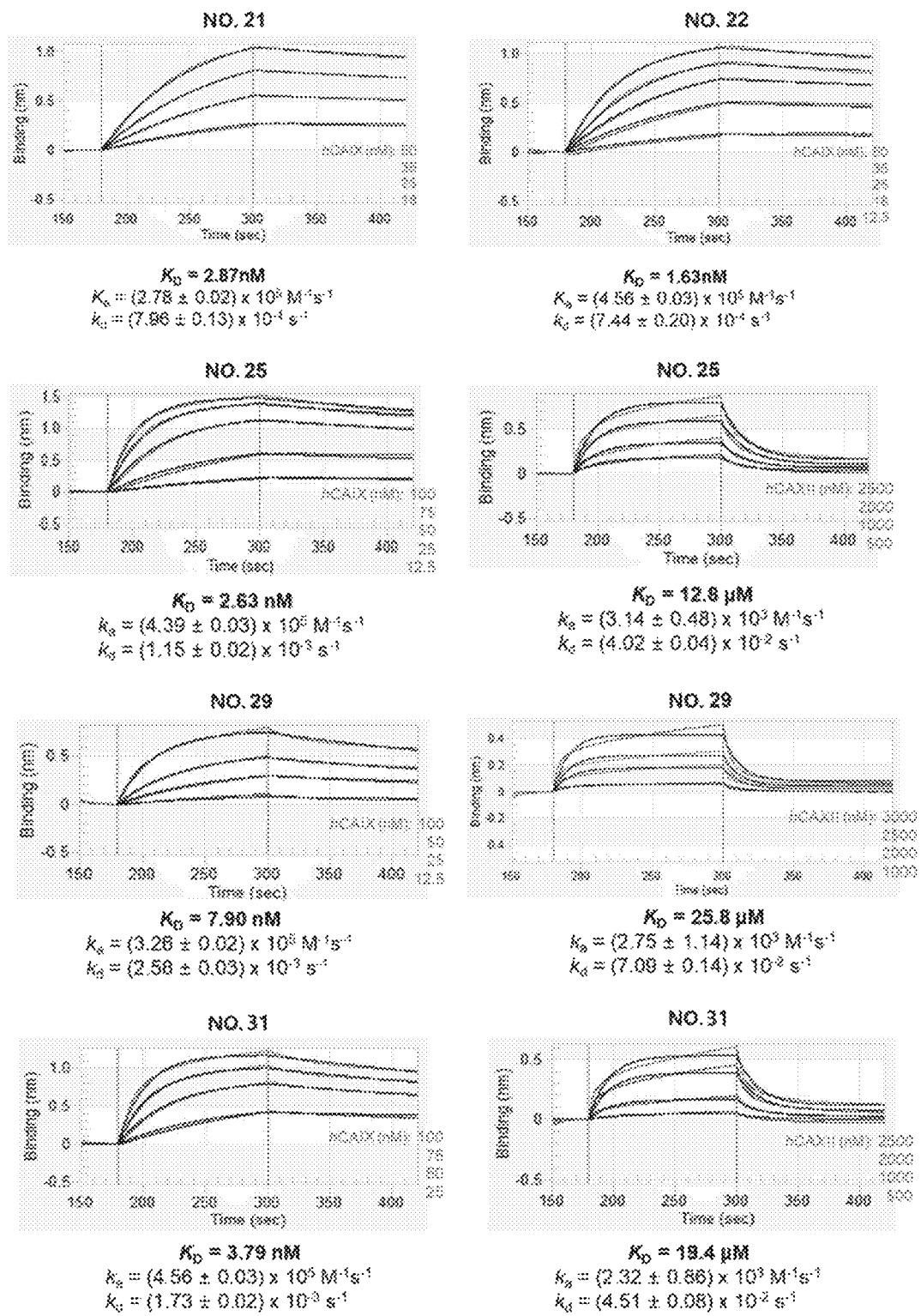
FIG. 7a to FIG. 7d show graphs of results obtained by analyzing the binding affinity and binding kinetics of the peptide construct according to an embodiment of the present invention to hCAIX ECD and human carbonic anhydrase XII (hCAXII) ECD.
Figure 7B:
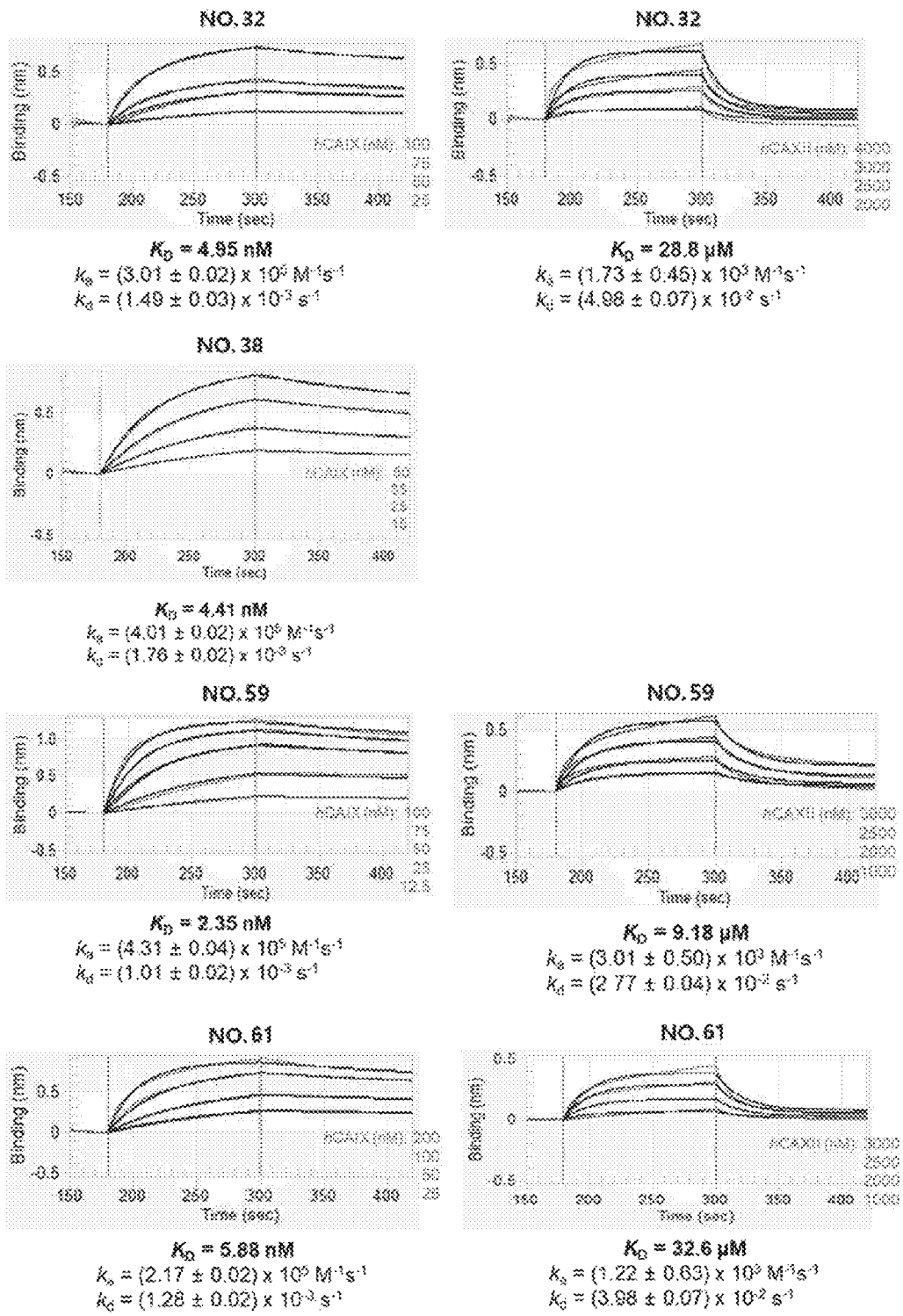
Figure 7C:
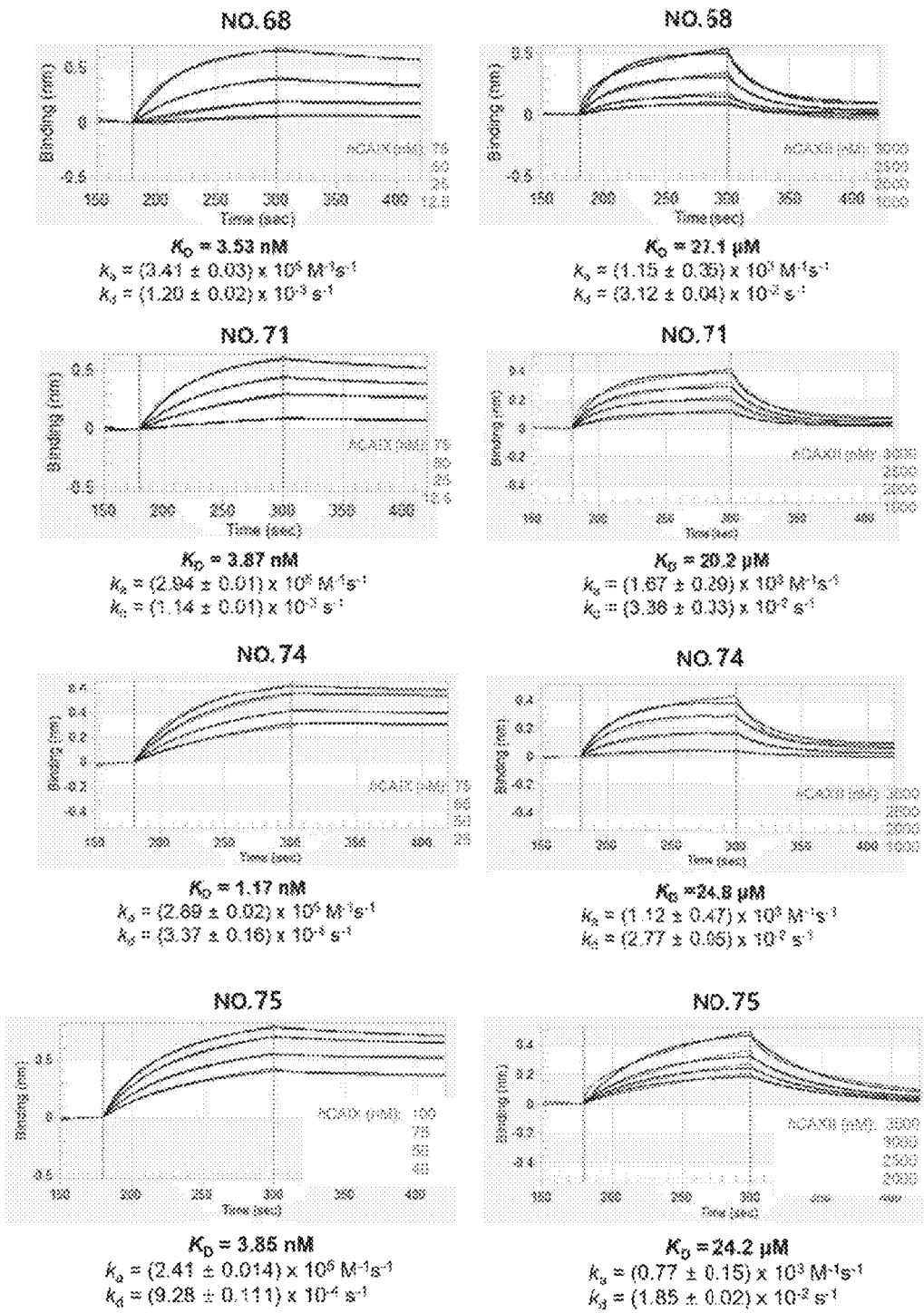
Figure 7D:
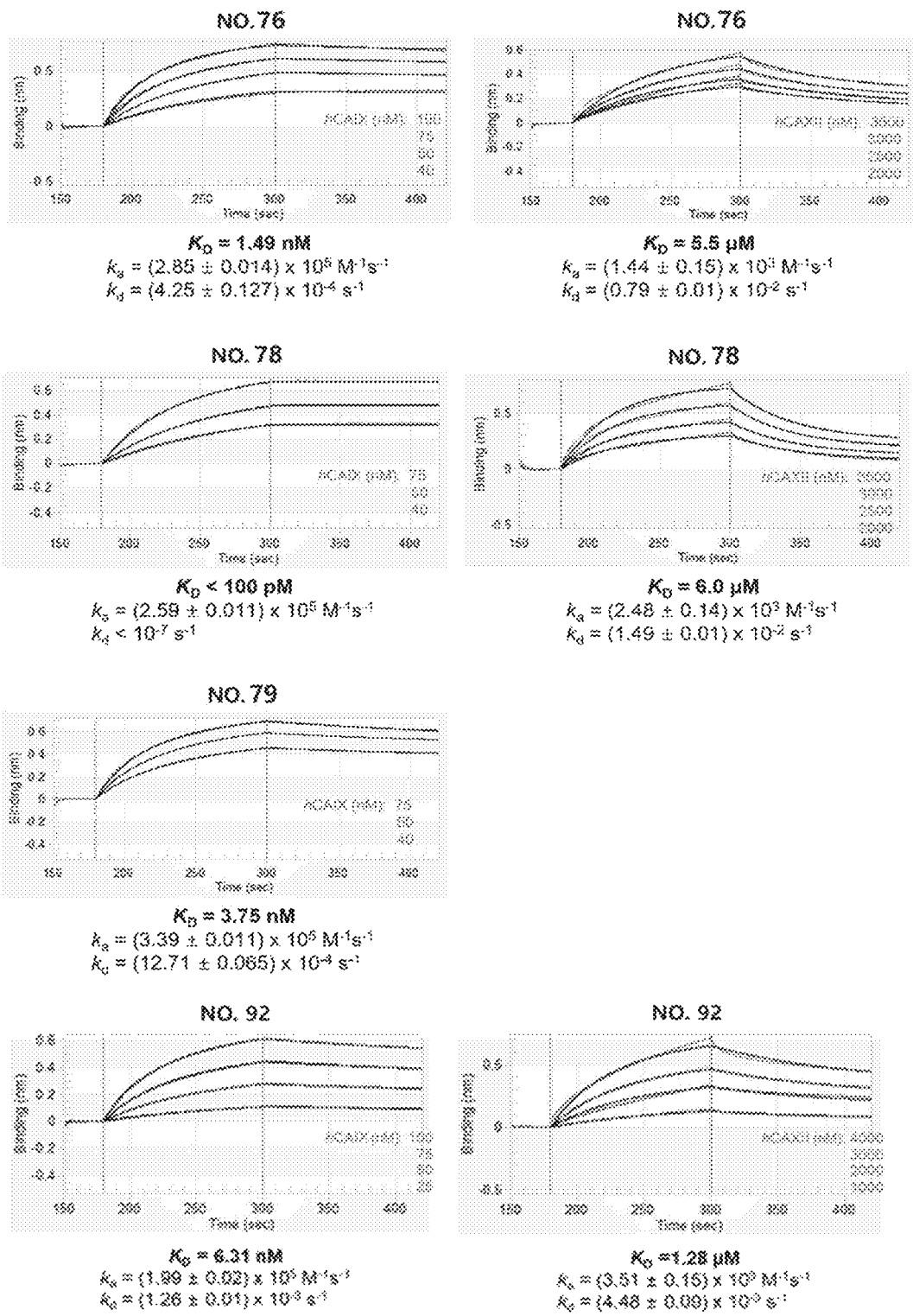
Figure 8A:
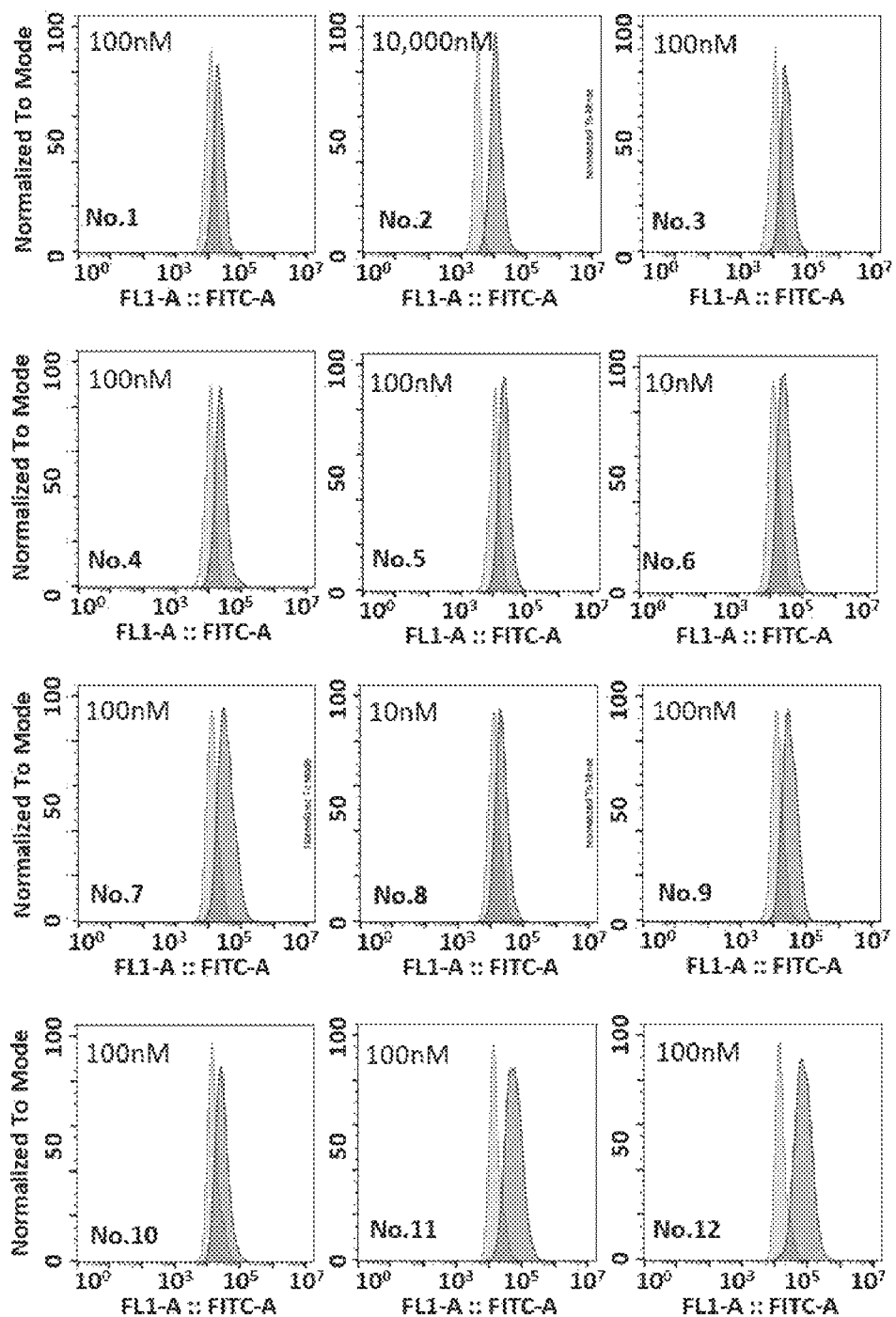
FIG. 8a to FIG. 8d show graphs of fluorescence-activated cell sorting (FACS) analysis results using the SK-RC-52 cell lines of the peptide construct according to an embodiment of the present invention.
Figure 8A:
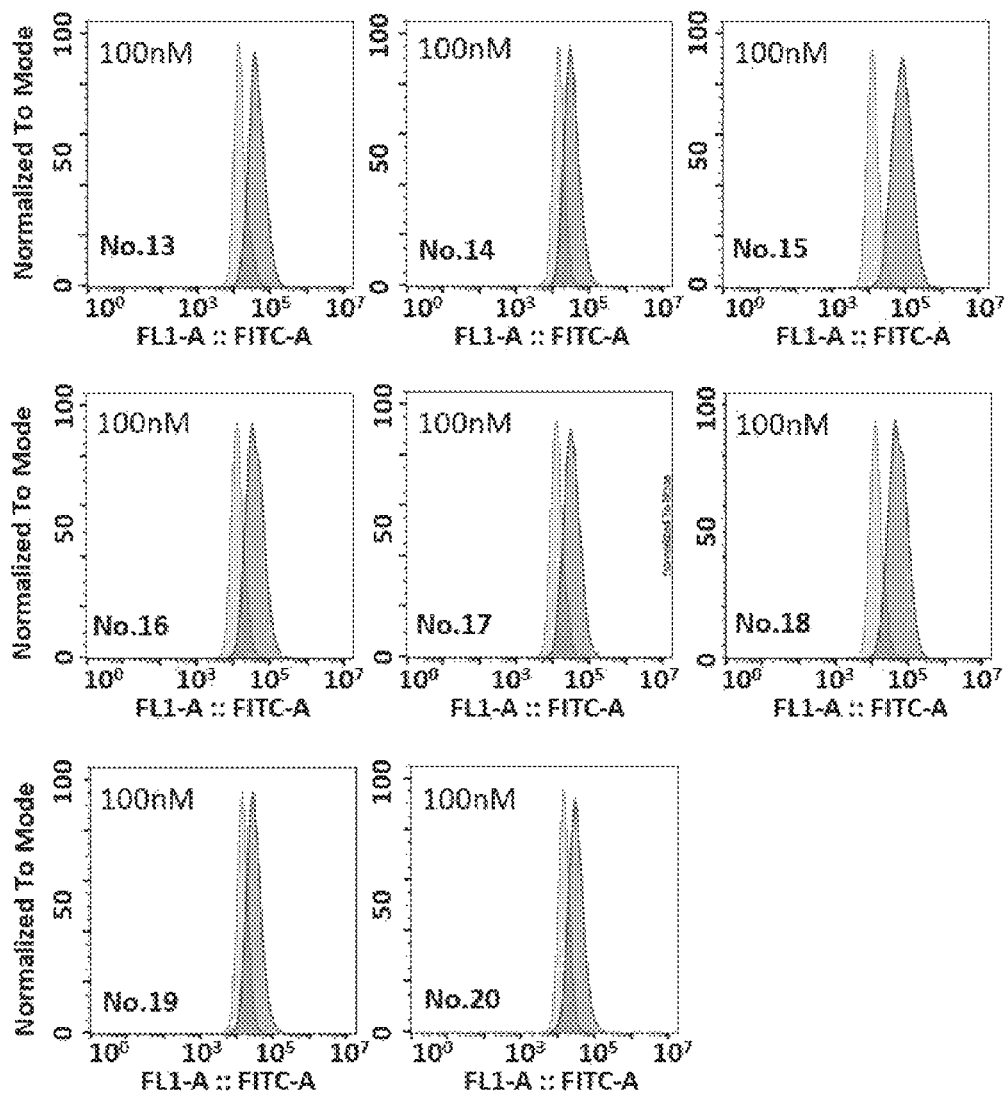
Figure 8B:
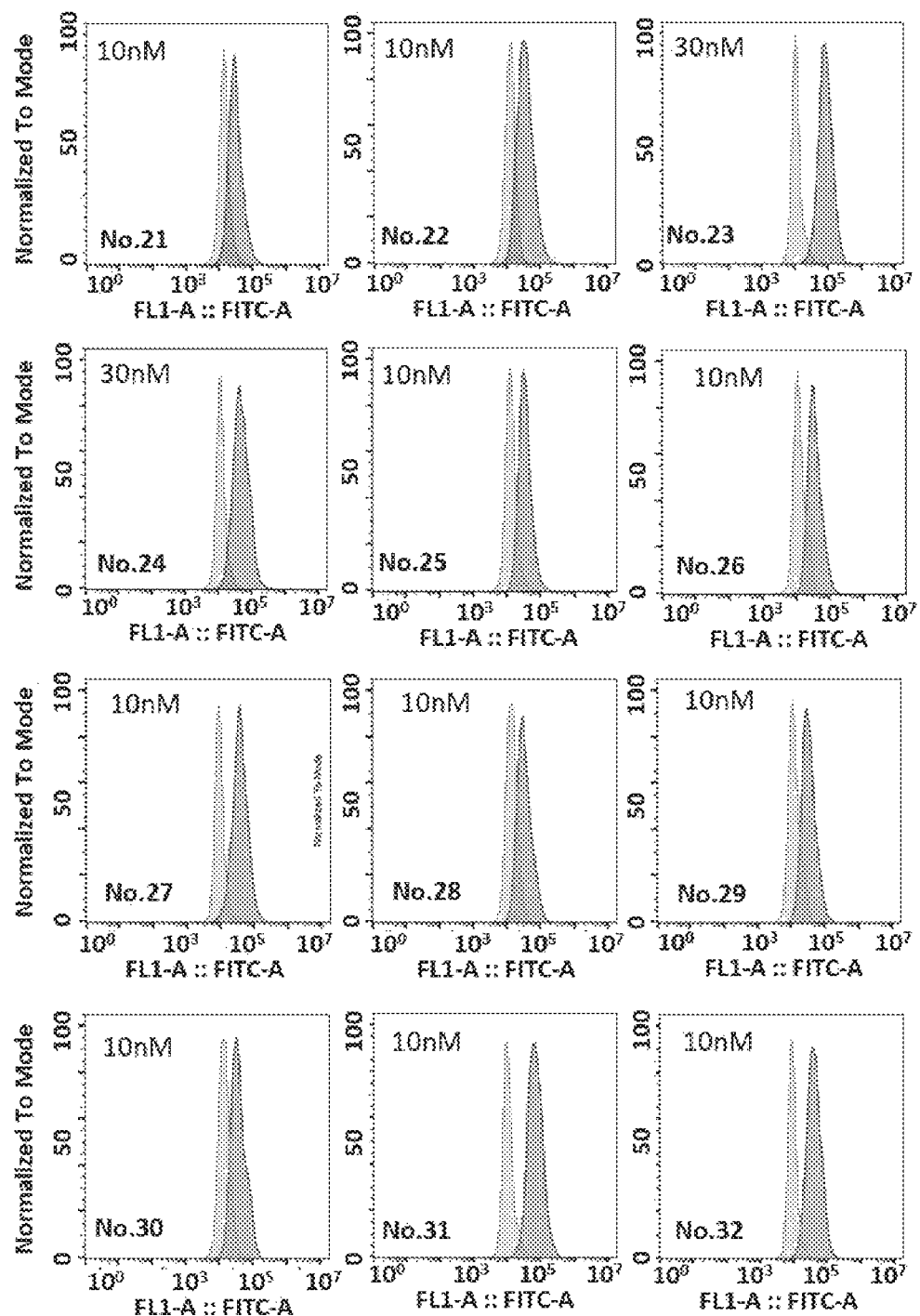
Figure 8B:
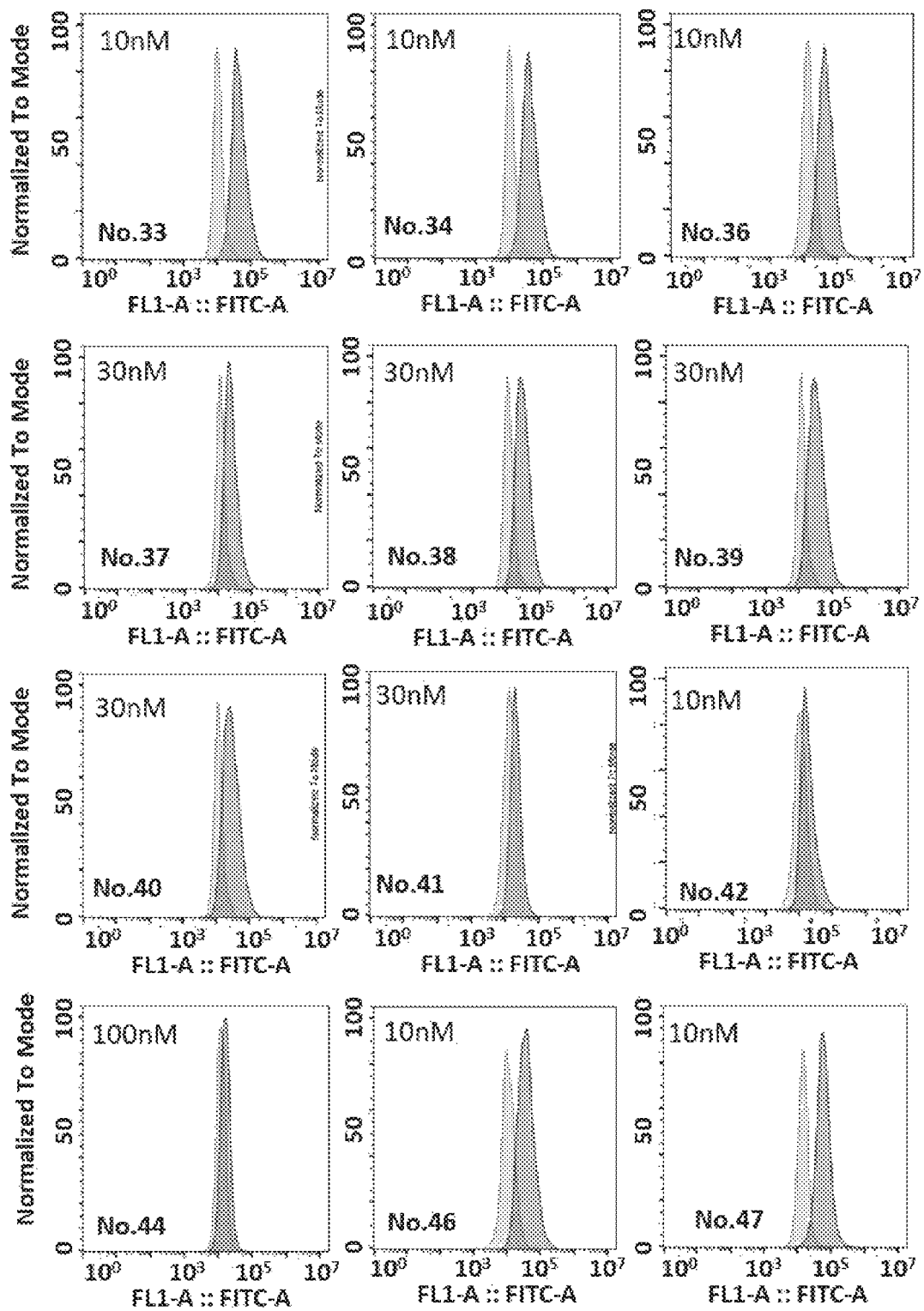
Figure 8B:
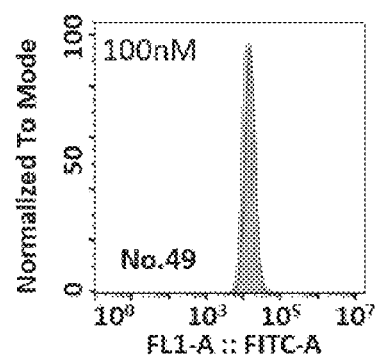
Figure 8C:
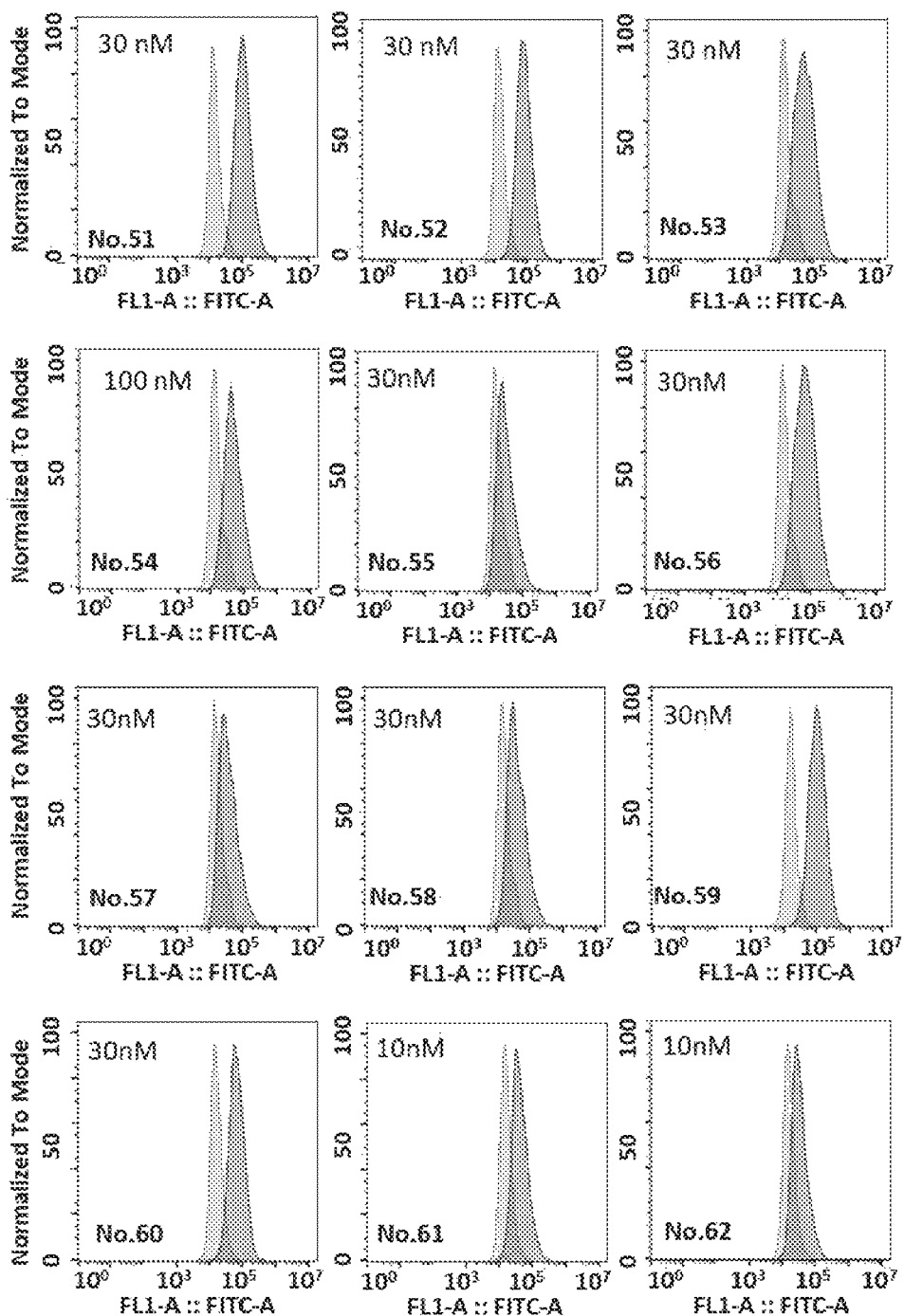
Figure 8C:
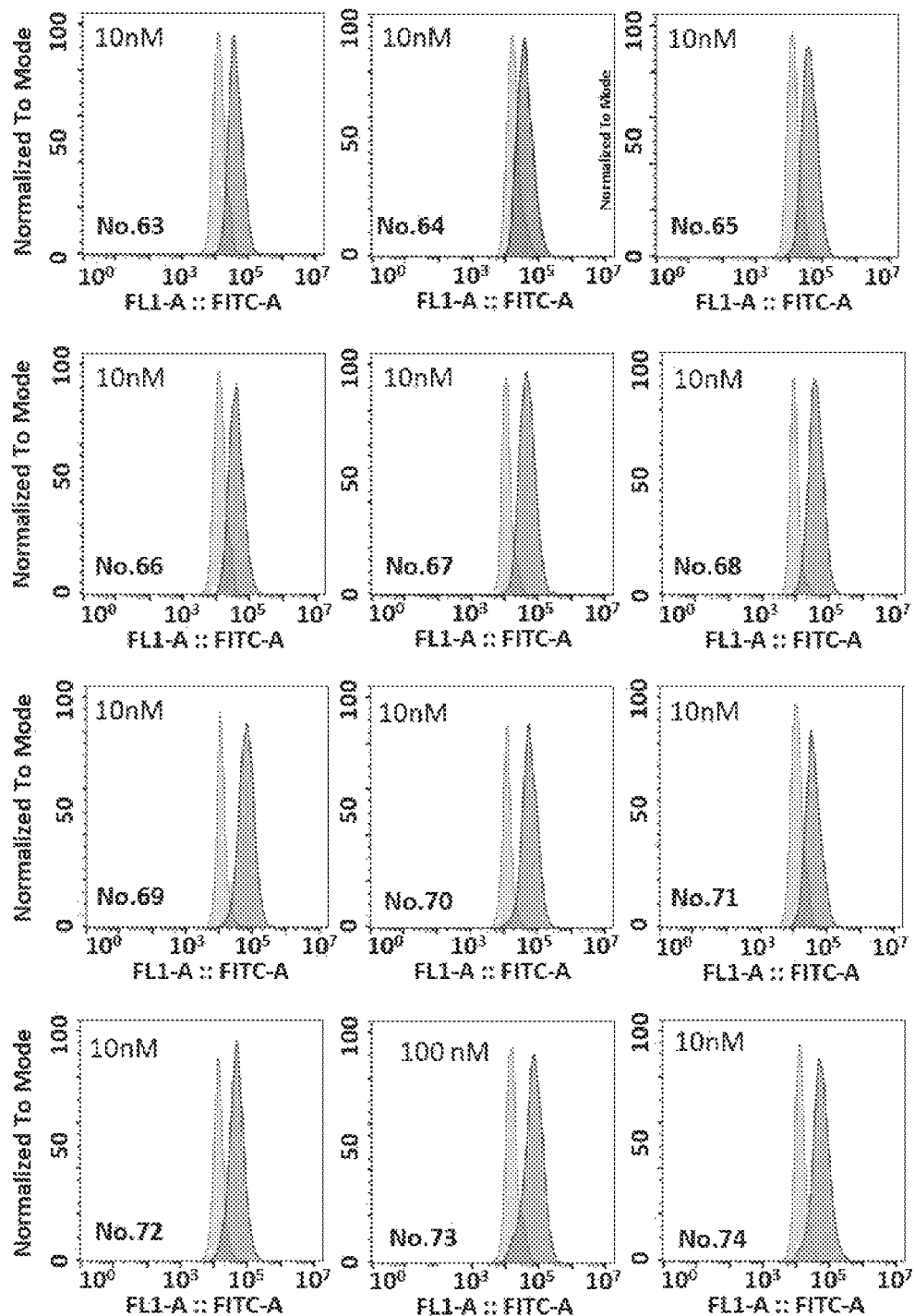
Figure 8D:
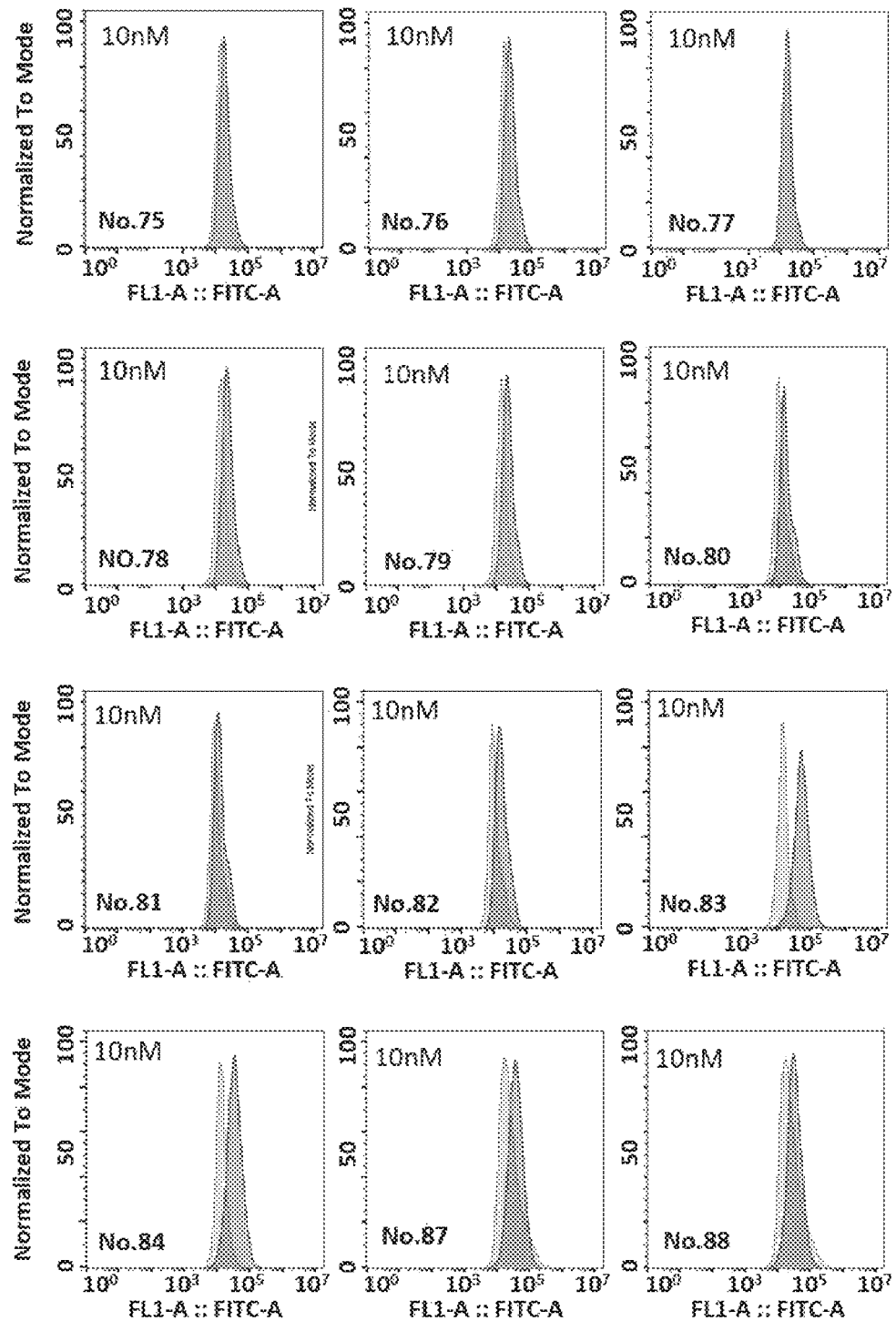
Figure 8D:
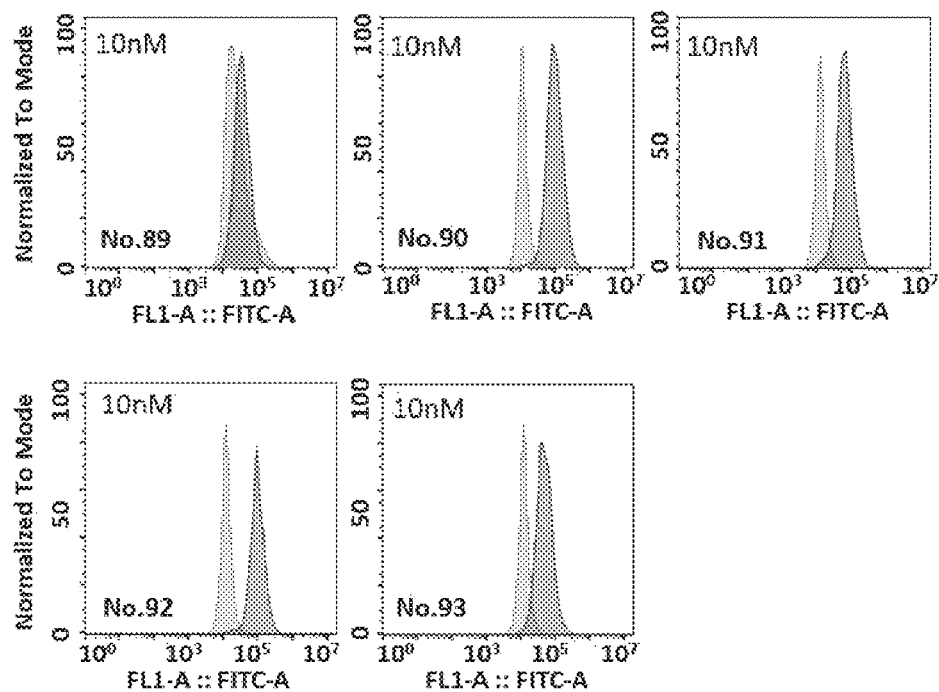
Figure 8E:
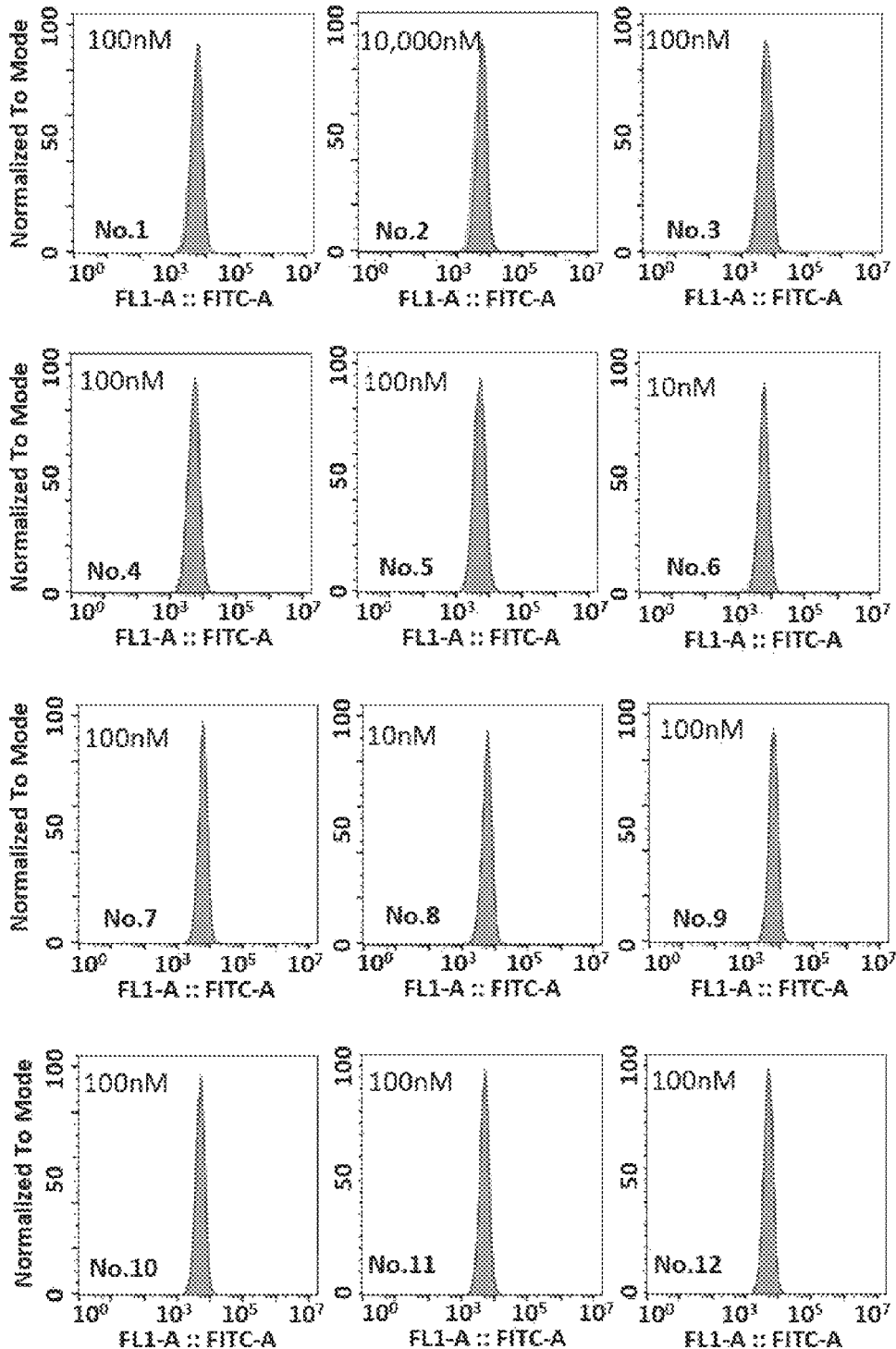
FIG. 8e to FIG. 8h show graphs of FACS analysis results using the A549 cell lines of the peptide construct according to an embodiment of the present invention.
Figure 8E:
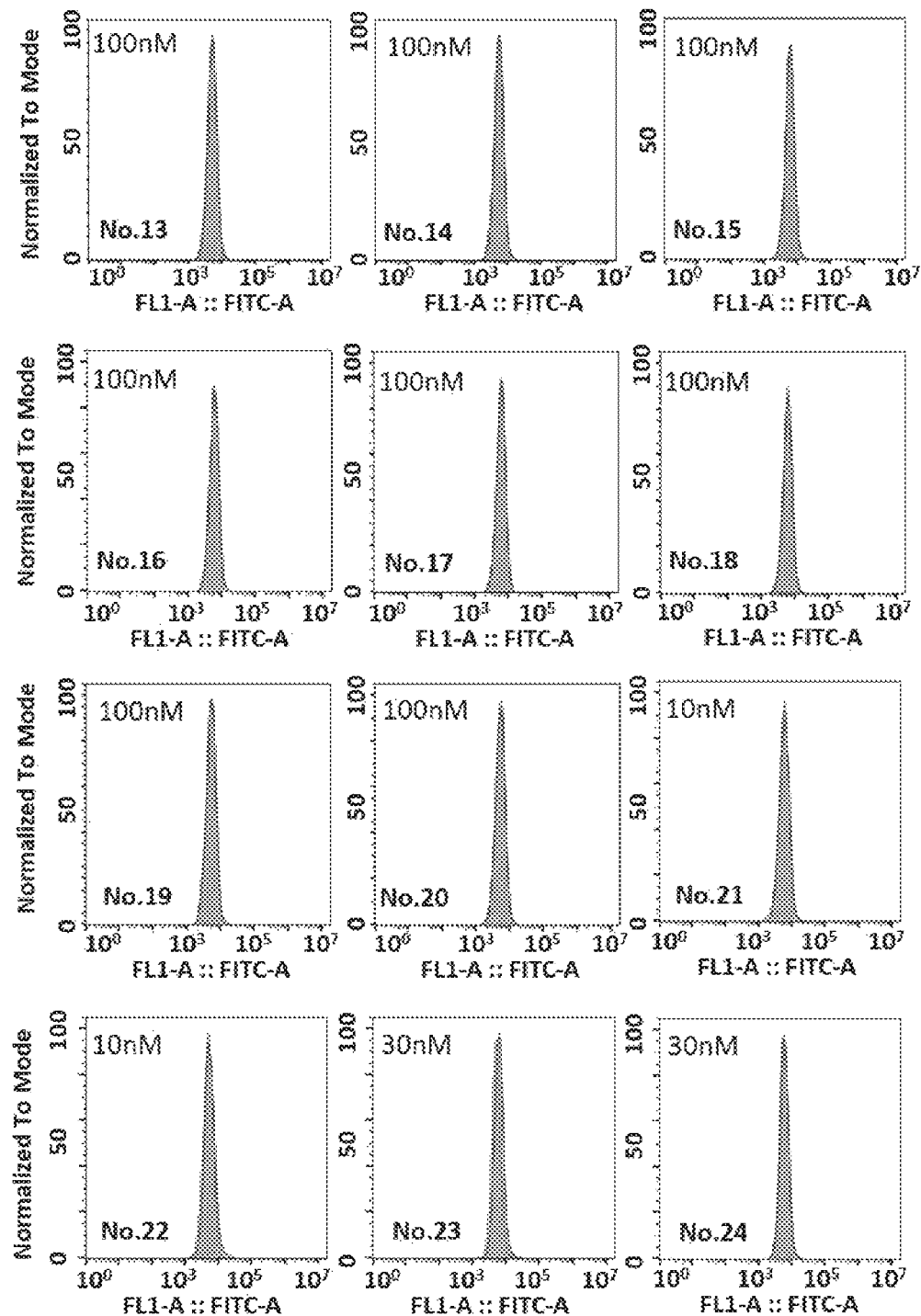
Figure 8E:
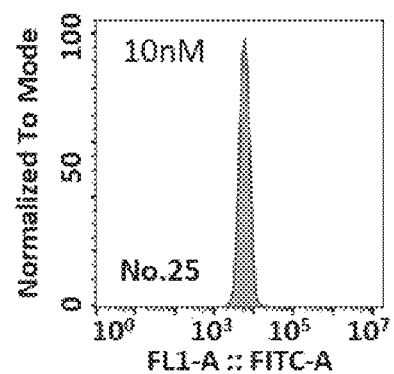
Figure 8F:
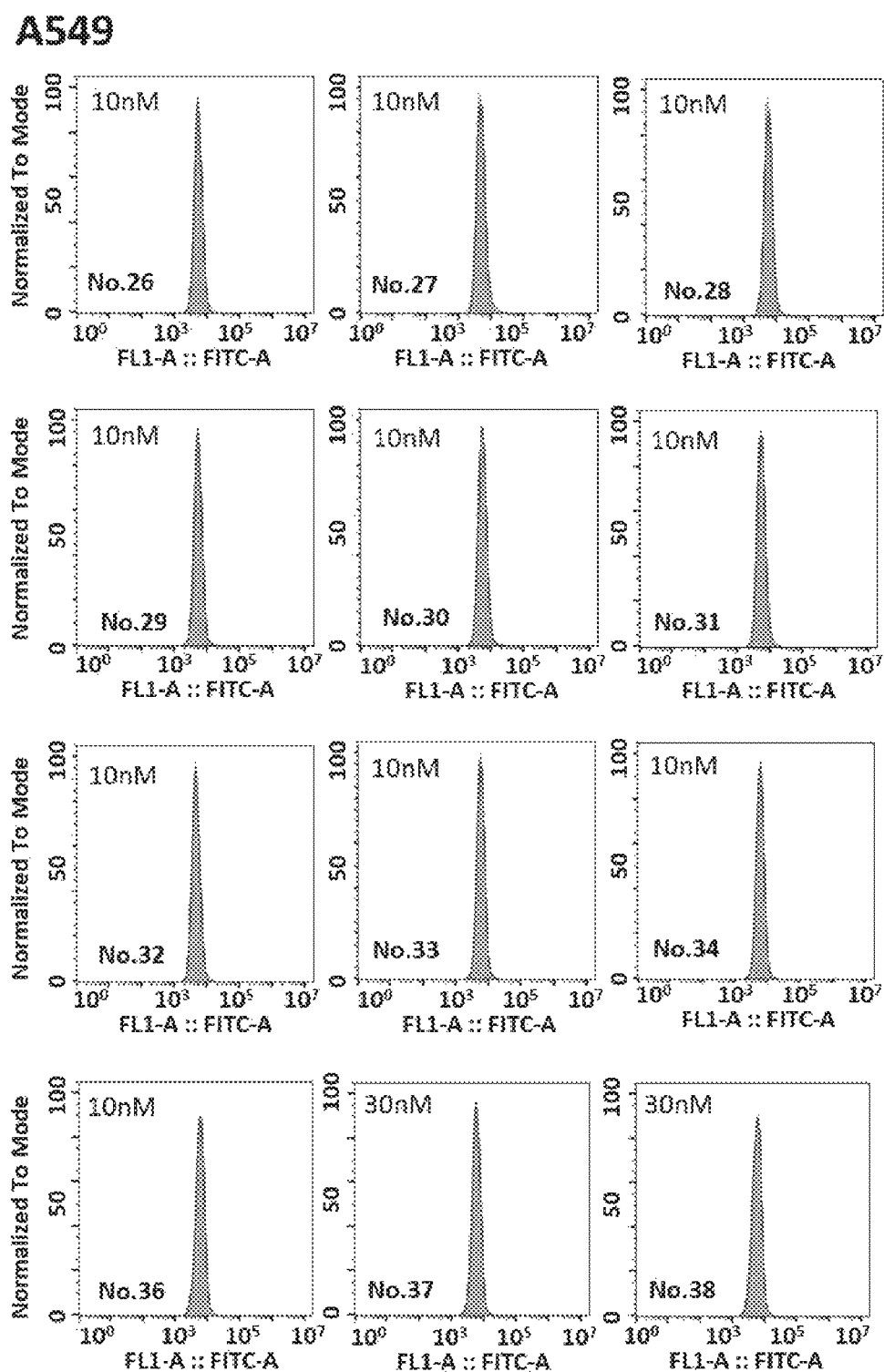
Figure 8F:
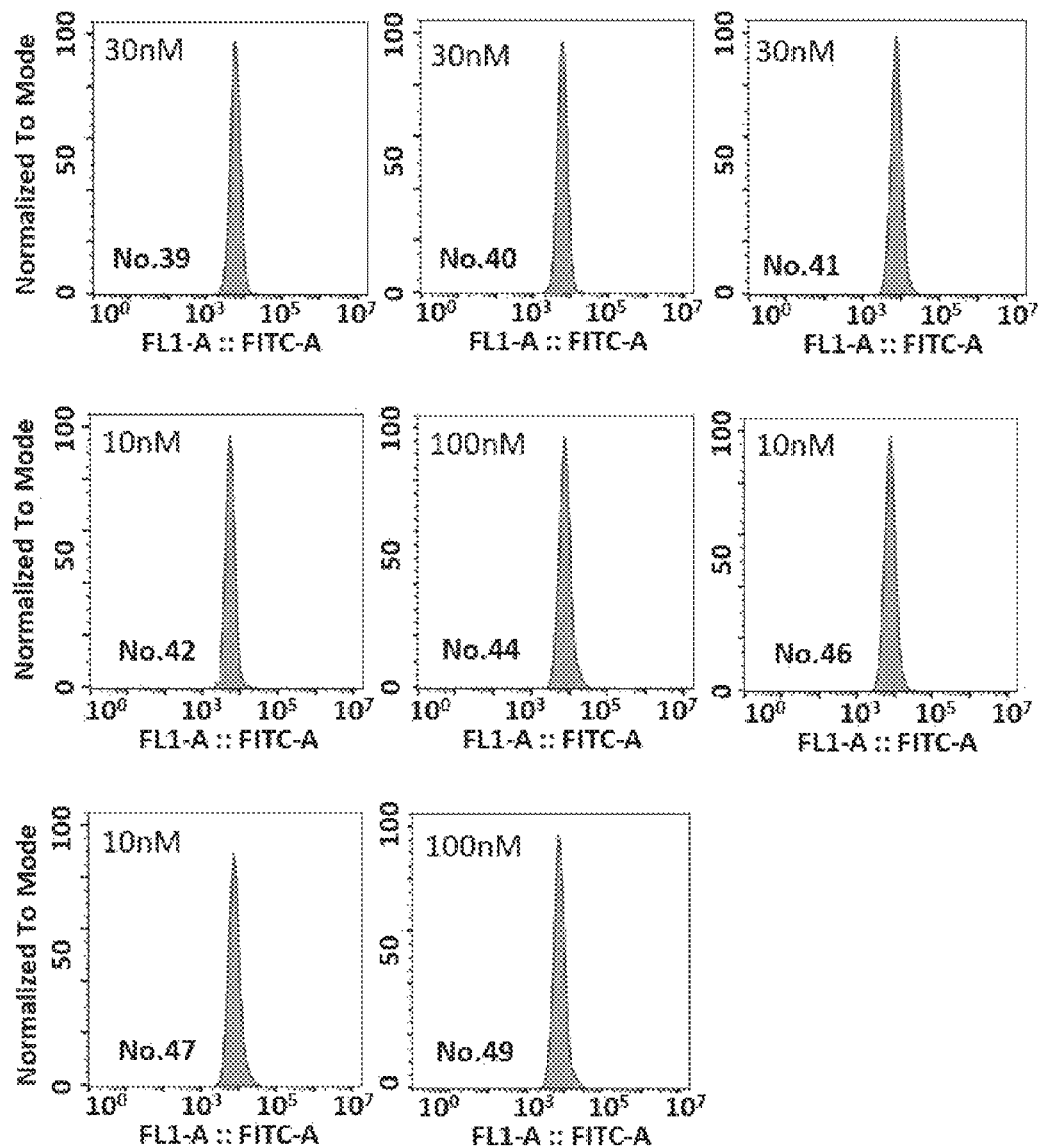
Figure 8G:
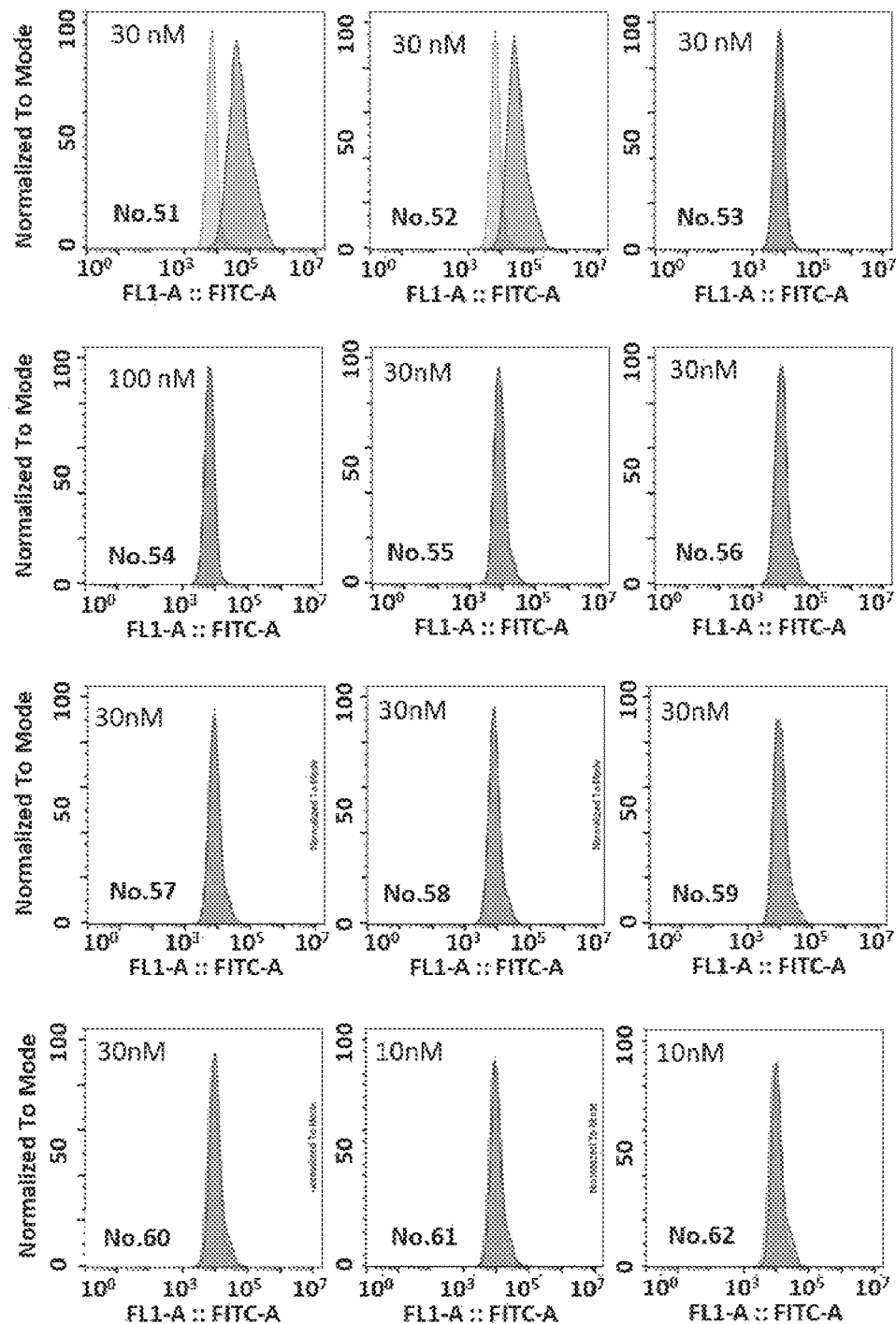
Figure 8G:
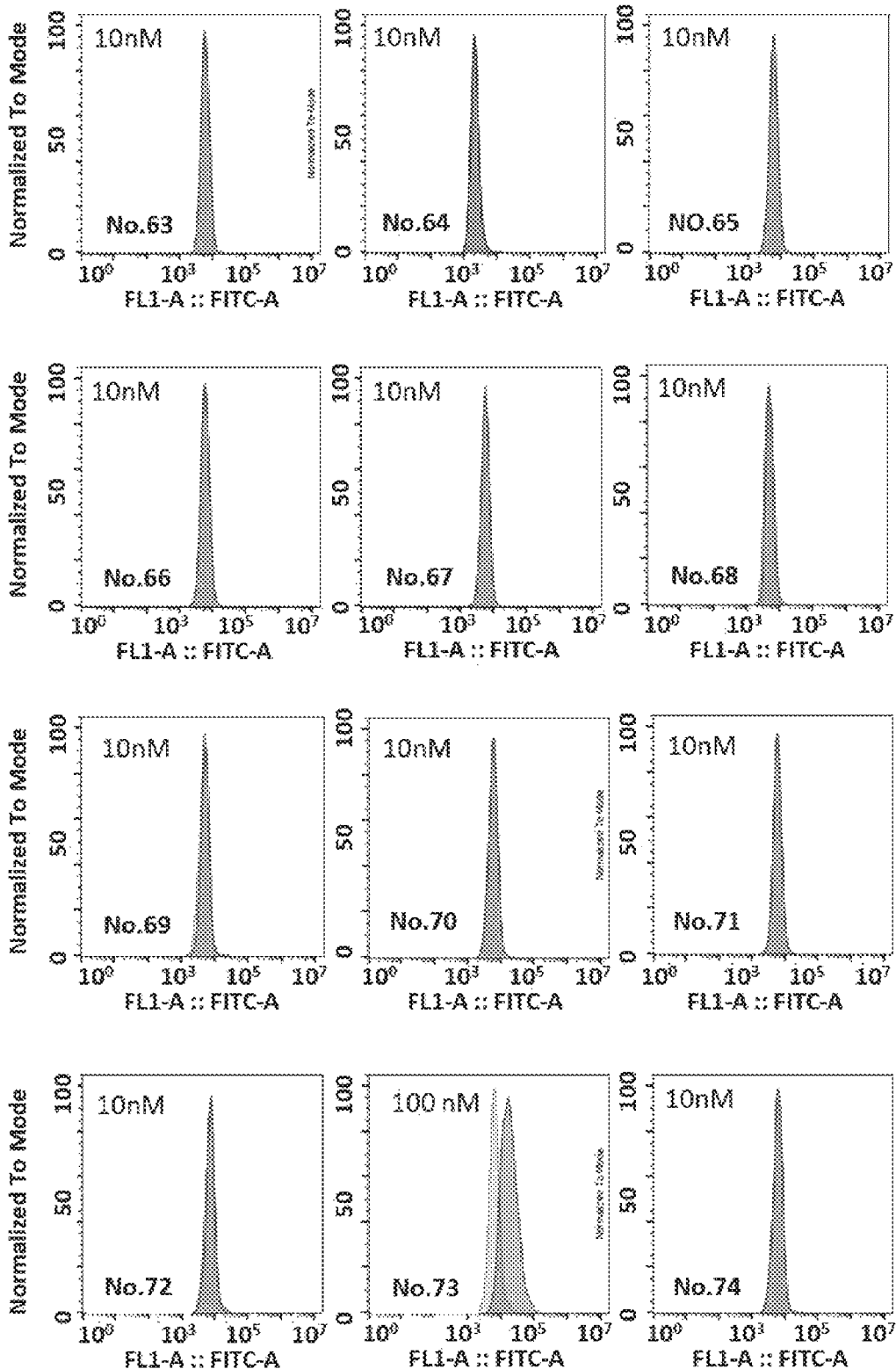
Figure 8H:
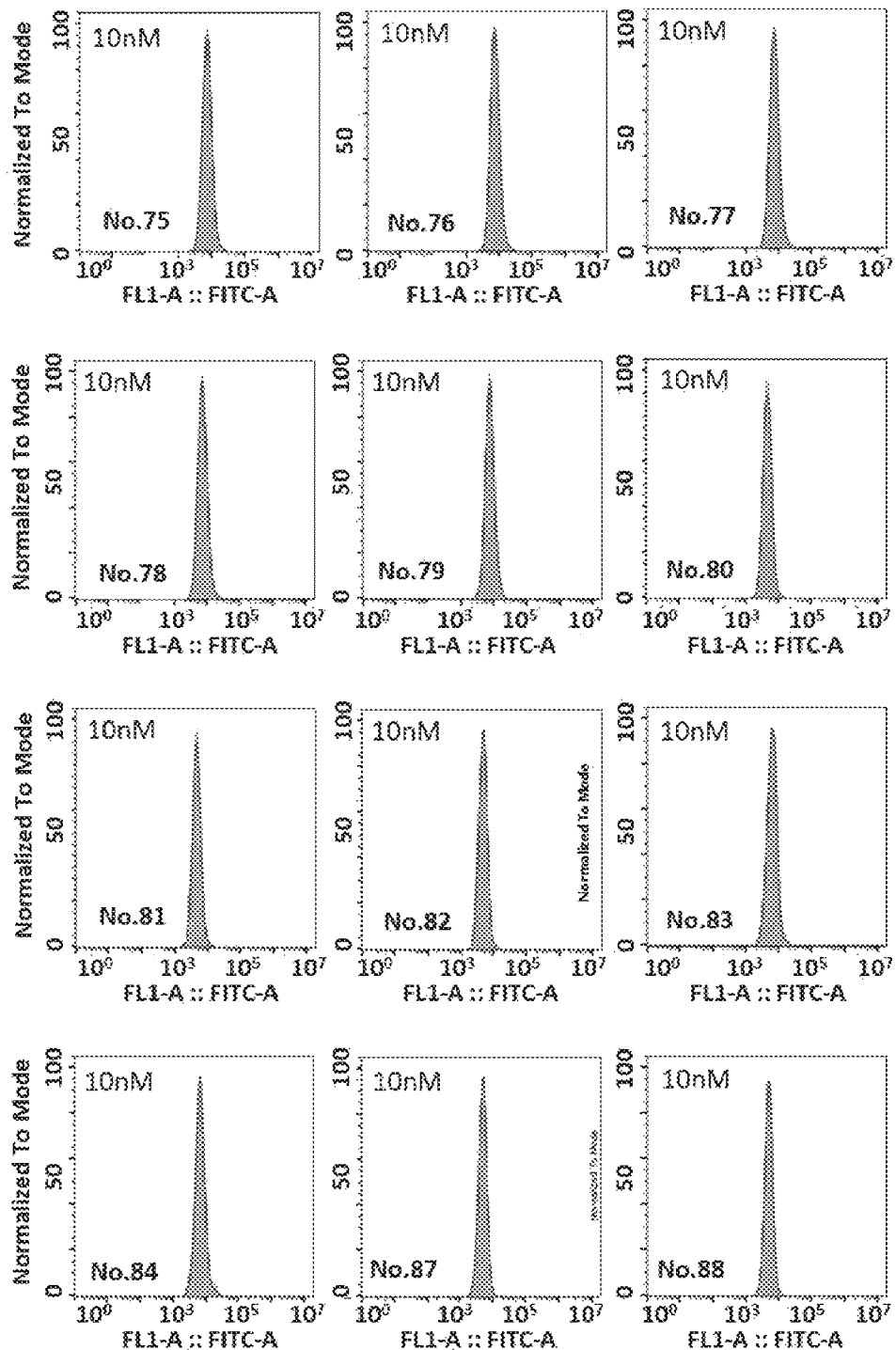
Figure 8H:
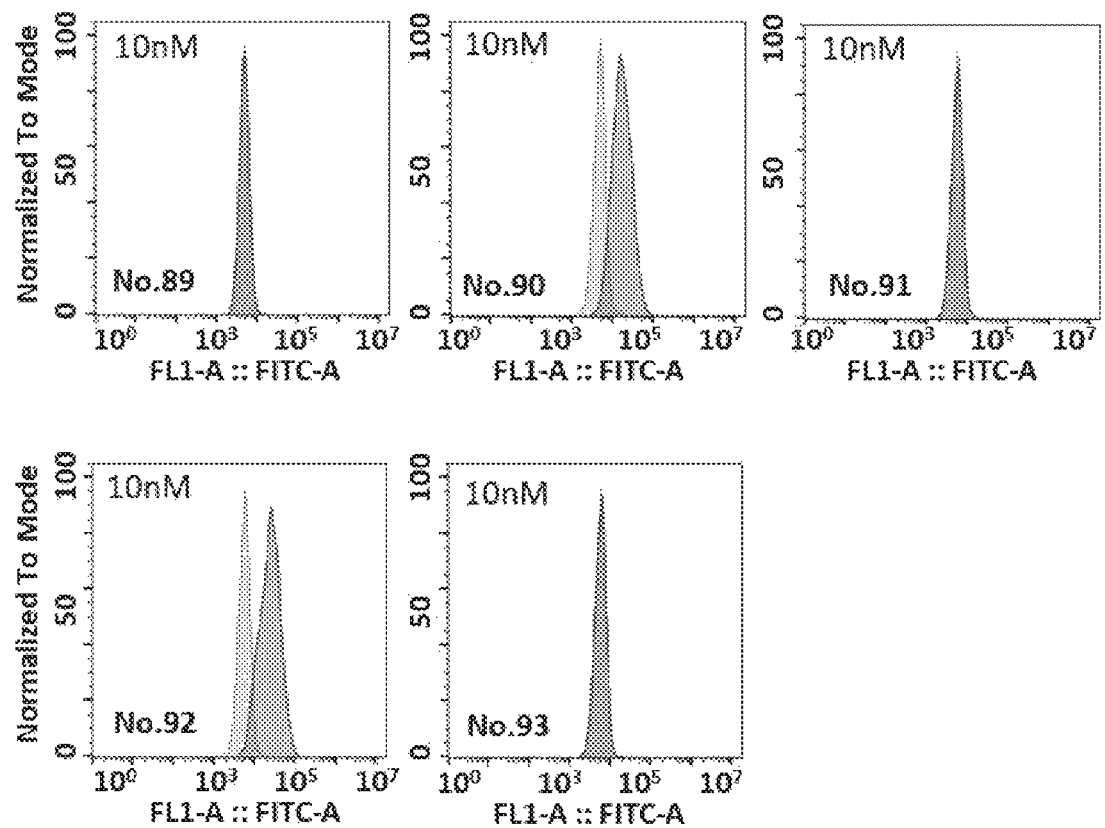

Similarly, the peptide construct No. 48 containing D-amino acids was also shown to be completely maintained without decomposition at all even after 7 days in human or mouse serum and plasma. But when all amino acid residues of the peptide construct No. 48 were changed to L-form, the results were obtained that the peptide construct was completely degraded in serum within 1 day, and most of the peptide construct was degraded in plasma within 7 days (FIGS. 6a and 6b).

Embodiment 5. Biological Characteristics Confirmation of the Peptide Constructs 5-1. Binding Affinity and Binding Kinetics Analysis for hCAIX ECD The binding affinity and binding kinetics for hCAIX ECD of the peptide construct was analyzed. To confirm the specific binding selectivity to hCAIX ECD, the binding kinetics characteristics of the peptide construct were also analyzed for the extracellular domain of human carbonic anhydrase XII (hCAXII), another isoform of carbonic anhydrase.

The binding affinity was measured using a BLItz® system (Cat #45-5000, FortéBio, USA) based on Bio-Layer Interferometry (BLI) technology and the advanced kinetics module of BLItz Pro ver 1.3 software. A streptavidin biosensor (Cat #18-5019, Sartorius, France) was used for all measurements. In addition, 0 nM of a protein concentration was used as a reference for non-specific binding and background correction. First, 10× Octet kinetics buffer (Cat #18-1105, Sartorius) was converted to 1× using DPBS (Biowest, Cat #L0615) and was used as a buffer solution for analysis. After dispensing 200 μL/well of the analytical buffer solution into in 96-well, black, flat-bottom polypylene (Cat #655209, Greiner Bio-One, Austria), and hydration was performed for 10 minutes while the streptavidine biosensor was immersed. And after mounting the biosensor on the equipment, it was loaded for 120 seconds at rpm 2200 at a concentration of 1 μM to attach the peptide. Subsequently, association and dissociation of proteins were performed at rpm 2200 for 120 seconds for each concentration. For kinetic data, a $K_D$ value was calculated as the ratio of kd to ka using the global fitting function. In addition, kinetic parameters were obtained by baseline correction and fitting 1:1 binding model.

The results are shown in FIGS. 7a to 7d. The peptide constructs showed significantly higher selectivity for hCAIX ECD compared to hCAXII ECD.

5-2. Binding Specificity Analysis to Target Cells

In order to confirm that the peptide construct specifically binds to CAIX-expressing target cells, in vitro cell binding properties were analyzed. SK-RC-52, CAIX-expressing human renal cancer cell lines, was purchased from Memorial Sloan Kettering Cancer Center (MSK, USA). A549, CAXII-expressing human lung cancer cell lines, was purchased from Korea Cell Line Bank (Cat #10185, KCLB, Korea).

Fluorescence Activated Cell Sorting (FACS) Analysis

The peptide construct to be used for analysis was dissolved in DMSO to make a 1 mM solution, and then diluted to a desired concentration (10000, 100, 30, 10, 5 nM) using a DMEM mixture (buffer solution for FACS) containing 1% FBS.

$5 \times 10^5$ cells of the A549 cell line and $1 \sim 1.5 \times 10^6$ cells of the SK-RC-52 cell line were seeded 2 to 3 days before FACS analysis was performed. On the day of the experiment, the culture solution was removed from the T75 flask in which the A549 or SK-RC-52 cell line was cultured at 80% confluency, and the remnant was washed once with 15 mL of PBS. 1 mL of trypsin-EDTA was treated in a Galaxy 170 S $CO_2$ thermostat (37° C., 5% $CO_2$, humid conditions) for 5 minutes, and then the trypsin-EDTA was neutralized with 9 mL of culture solution. The neutralized cell mixture was contained in a 15 mL tube and spun at 1000 RPM for 4 minutes using a VARISPIN 15R centrifuge. The supernatant of the centrifuged cell mixture was removed, and the cell mixture was diluted to a cell count of $5 \times 10^1$ per 100 μL by adding a new culture solution, and then 100 μL each was dispensed into a 96-well round plate (Cat #34096, SPL LIFE SCIENCE). After spinning for 4 minutes at 1000 RPM using the VARISPIN 15R centrifuge, the supernatant was removed from each well. Then, 200 μL of the prepared peptide construct solution was added, and then incubated in the Galaxy 170 S $CO_2$ thermostat under 37° C., 5% $CO_2$ and humid conditions. After 1 hour, the supernatant was removed after spun at 1000 RPM for 4 minutes using the VARISPIN 15R centrifuge, and the solution was washed with 200 μL of buffer solution for FACS. After washing solution being removed after centrifugation (4 minutes at 1000 RPM), the solution was treated with 200 μL of Streptavidin-Alexa fluor 488 (Cat #$S_{11223}$, Invitrogen, USA) diluted to 1 μg/mL concentration in FACS buffer and then was incubated for 1 hour in the Galaxy 170 S C02 thermostat under 37° C., 5% $CO_2$ and humid conditions (Streptavidin-Alexafluor 488 treatment was omitted for the peptide constructs 80, 81, and 82). After the VARISPIN 15R centrifugation (4 minutes at 1000 RPM), the supernatant was removed and washed with 200 μL of buffer solution for FACS. After one additional washing in the same way, 200 μL of buffer solution for FACS was added to each well to mix the same with cells. The mixture was transferred to a 5 mL round bottom test tube (Cat #352235, CORNING, USA) equipped with a cell strainer, and the fluorescence intensity of each cell was measured using BD Accuri C6 Plus (BD Biosciences, Singapore). The measured data was analyzed with FlowJo 10.7.1 (BD biosciences, USA).

The cell mixture after FACS analysis was centrifuged at 1000 RPM for 4 minutes using the VARISPIN 15R centrifuge, and the supernatant was removed. The cell mixture was treated with 200 μL of Hoechst 33342, which is diluted at 1 μg/mL concentration in the buffer solution for FACS, and the nuclear staining for 30 minutes at 4° C. was performed. After centrifugation at 1000 RPM for 4 minutes using the VARISPIN 15R centrifuge, the supernatant was removed and washed with 200 μL of PBS (repeated twice). The cell mixture, to which 200 μL of PBS was added, was transferred to a confocal dish (Cat #100350, SPL LIFE SCIENCE) and fluorescence was observed with an Axio Observer 3 (ZEISS, Germany).

FACS analysis results using the SK-RC-52 cell line are shown in FIGS. 8a to 8d. FACS analysis results using the A549 cell line are shown in FIGS. 8e to 8h. From the FACS analysis results, it was confirmed that the peptide constructs of the present invention bind to target cells expressing CAIX with high affinity and selectivity.

Immunofluorescence Analysis (Colocalization)

$5 \times 10^4$ cells of the A549 cell line and $1 \times 10^5$ cells of the SK-RC-52 cell line were seeded in the confocal dish and cultured for 2 days in the Galaxy 170 S $CO_2$ thermostat (37° C., 5% $CO_2$, humid conditions). Subsequently, each cell line was treated with M75-FITC antibody or peptide construct, which is diluted in 2 mL of the buffer solution for FACS, to a final concentration of 1:200 (dilution ratio from the stock solution) and 1 uM, respectively, and then was incubated in the Galaxy 170 S $CO_2$ thermostat for 1 hour under 37° C., 5% C02 and humid conditions. After the solution was washed twice with 3 mL of buffer solution for FACS, the streptavidin-Texas red and Hoechst 33342, which was diluted in 2 mL of buffer solution for FACS, were added to final concentrations of 1:50 (dilution ratio from the stock solution) and 0.5 ug/mL, respectively, and then the solution was incubated in the Galaxy 170 S $CO_2$ thermostat for 1 hour under 37° C., 5% $CO_2$ and humid conditions. Then, after the solution was washed twice with 3 mL of buffer solution for FACS and once with PBS, fluorescence was observed using the Axio Observer 3.

Figure 9:
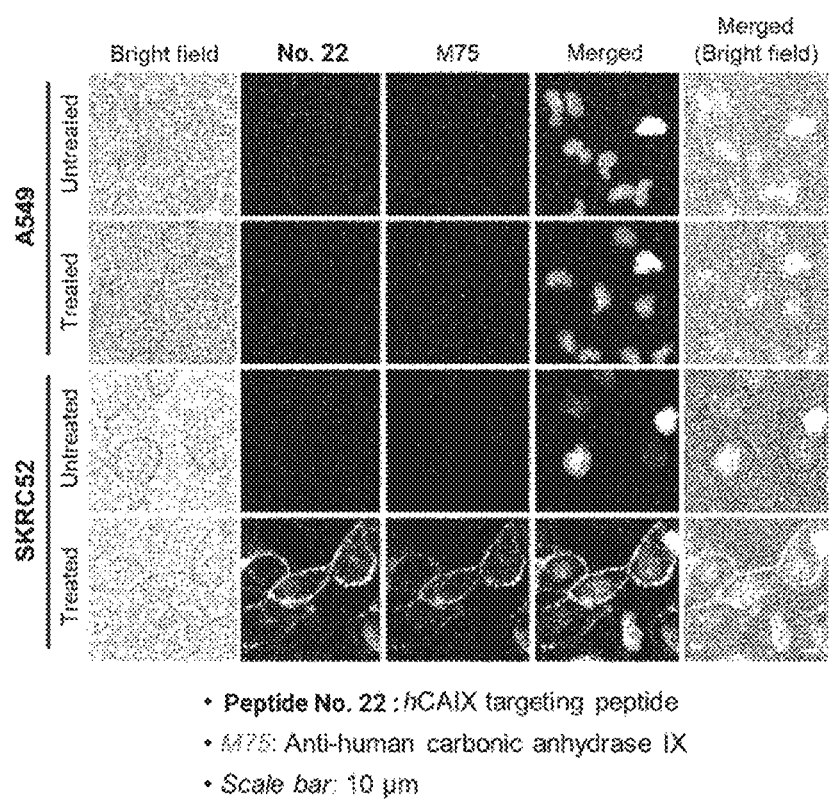
FIG. 9 shows photographs showing the results of immunofluorescence analysis using the SK-RC-52 cell lines of the peptide construct (No. 22) according to an embodiment of the present invention.

FIG. 9 shows the results of immunofluorescence analysis of peptide construct No. 22. It was confirmed that peptide construct No. 22 binds specifically to the SK-RC-52 cell line expressing CAIX like the M75 antibody.

Confocal Microscopy Analysis Imaging $1 \times 10^5$ cells of the SK-RC-52 cell line were seeded in the confocal dish and cultured for 2 days in the Galaxy 170 S $CO_2$ thermostat (37° C., 5% $CO_2$, humid conditions). Subsequently, the cell line was treated with the peptide construct, which was diluted in 2 mL of buffer solution for FACS, to a final concentration of 100 nM, and then the solution was incubated in the Galaxy 170 S $CO_2$ thermostat for 1 hour under 37° C., 5% $CO_2$ and humid conditions. Subsequently, after the solution was washed three times with 3 mL of buffer solution for FACS and then treated with Hoechst 33342, which was diluted in 2 mL of buffer solution for FACS, to a final concentration of 0.5 ug/mL, the solution was reacted in the Galaxy 170 S $CO_2$ thermostat for 15 minutes under 37° C., 5% $CO_2$, humid conditions. Then, after the solution was washed three times with 3 mL of PBS, fluorescence was observed using a Leica SP5 confocal microscope.

Figure 10:
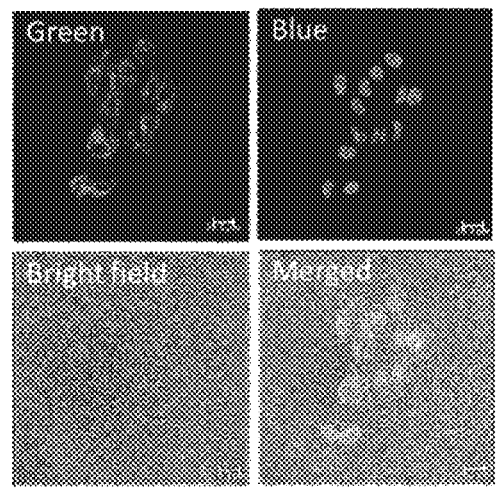
FIG. 10 shows Z-stack confocal microscope analysis images of the peptide structure (No. 94) according to an embodiment of the present invention.

FIG. 10 shows a Z-stack confocal microscope analysis image of peptide construct No. 94 using the SK-RC-52 cell line. It was confirmed that the peptide construct No. 94 binds well to CAIX ECD expressed in cells.

5-3. Biodistribution Analysis Using Experimental Animal Models

Figure 11A:
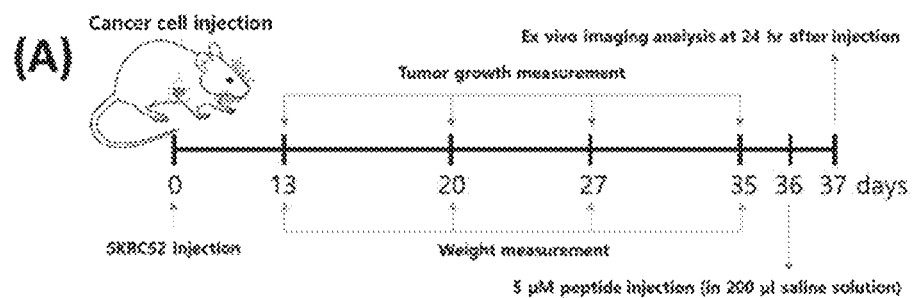
FIG. 11a to 11c show the biodistribution analysis results of the peptide constructs according to an embodiment of the present invention in mouse xenotransplanted with SK-RC-52 cell lines.

Using 6-week-old female BALB/c nude mouse (Orient Bio, Korea), $2 \times 10^6$ cells of the SK-RC-52 were subcutaneously injected into the upper side of left forelimb of the nude mouse. After subcutaneous injection, weight and tumor size were measured on days 13, 20, 27 and 35 (FIG. 11a). The size of the tumor was measured using a caliper as [volume= $((width)^2 \times (length))/2$].

Figure 11B:
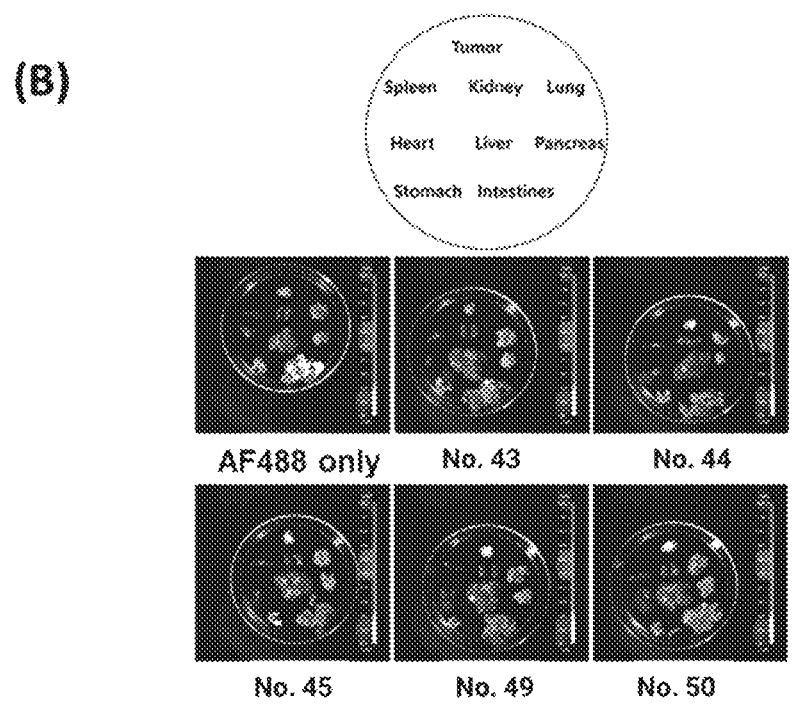

On the 36th day after the SK-RC-52 cell lines was xenotransplanted, 200 μL each of 5 μM peptide construct (5% DMSO in saline solution) was injected by tail intravenous injection. 24 hours after injection, the photographed mice were sacrificed by injecting an excess of carbon dioxide, and ex vivo imaging was photographed by excising tumors and organs (liver, kidney, intestine, lung, spleen, stomach, pancreas, heart) by laparotomy (FIG. 11b).

Figure 11C:
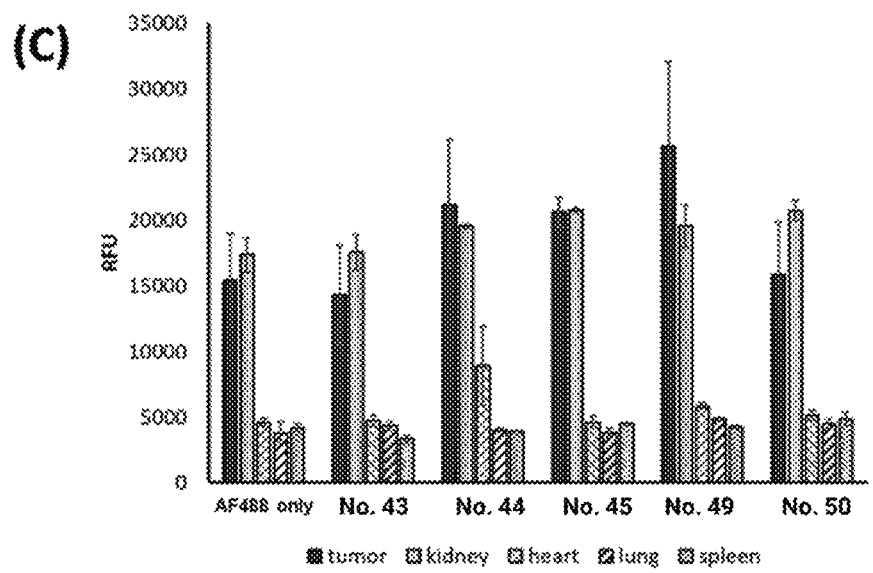

After taking ex vivo imaging of the tumor, liver, kidney, intestine, lung, spleen, stomach, and heart of each group obtained from animal experiments, they were frozen on dry ice and stored at −80° C. until the experiment. After measuring the weight of each tumor before the experiment, 100 μL of ice-cold homogenization buffer solution (pH 7.4 PBS with traces of DNase 1 in 40 mM EDTA, 6 mg/mL trypsin, 1.6% Triton X-100) was added as buffer solution per 100 mg of organ weight, and homogenization was performed for 5 minutes using FastPrep-24 5G (MPbiomedicals, USA). The homogenized organs were measured for fluorescence by dispensing the 100 μL of the homogenate into a 96-well black plate using an EnSpire Multimode Microplate Reader (PerkinElmer, USA) (FIG. 11c). It was confirmed that the peptide constructs specifically bind to tumors overexpressing CAIX compared to other organs.

5-4. Anti-Cancer Effect Analysis of Peptide Structure-Drug Conjugate

Animal experiments were conducted to confirm whether the conjugate in which a drug was conjugated to a peptide construct exhibited anticancer activity in vivo. SK-RC-52 cell line, a renal cancer cell that overexpresses CAIX, was diluted in PBS to $2 \times 10^6$ cells and was injected subcutaneously in the side of right anterior of 6-week-old female BLAB/c nude mice. Mice transplanted with tumor cells were weighed for 2-3 weeks to measure the health changes of the mice, and the size of the tumor (width×width×length/ 2) was measured using a Digimatic Caliper (Cat #500-151- 30, Mitutoyo, Japan). When the size of the tumor reached about 100 $mm^3$, it was divided into a control group in which saline containing 1% DMSO and 2% EtOH was injected into the tail vein, a peptide treated group in which only the peptide construct was injected into the tail vein (i.e., peptide construct No. 85), and a PDCI treated group where PDCI, in which the peptide construct and the drug (MMAE) are bonded through a linker (i.e., peptide construct No. 86 in the form of a drug conjugate), was treated with the tail vein. Each group had 3 animals, and the peptide treated group had 2 animals. Saline containing 200 μl of 1% DMSO and 2% EtOH was administered as a vehicle with the administration concentration of 250 nmole/kg. The frequency of administration was at 2-day intervals, 3 times a week, and a total of 7 times, through the tail vein. Body weight and tumor size were measured once every 1 to 3 days.

Figure 12A:
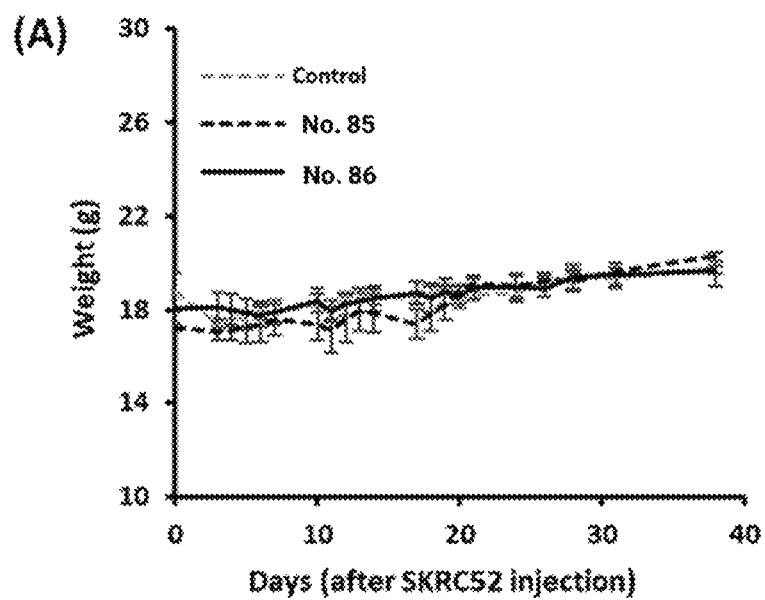
FIG. 12a and FIG. 12b show graph displaying changes of mouse's body weight (FIG. 12a) and tumor size (FIG. 12b) by the peptide construct-drug conjugate (No. 86) according to an embodiment of the present invention in mouse xenotransplanted with SK-RC-52 cell lines.
Figure 12B:
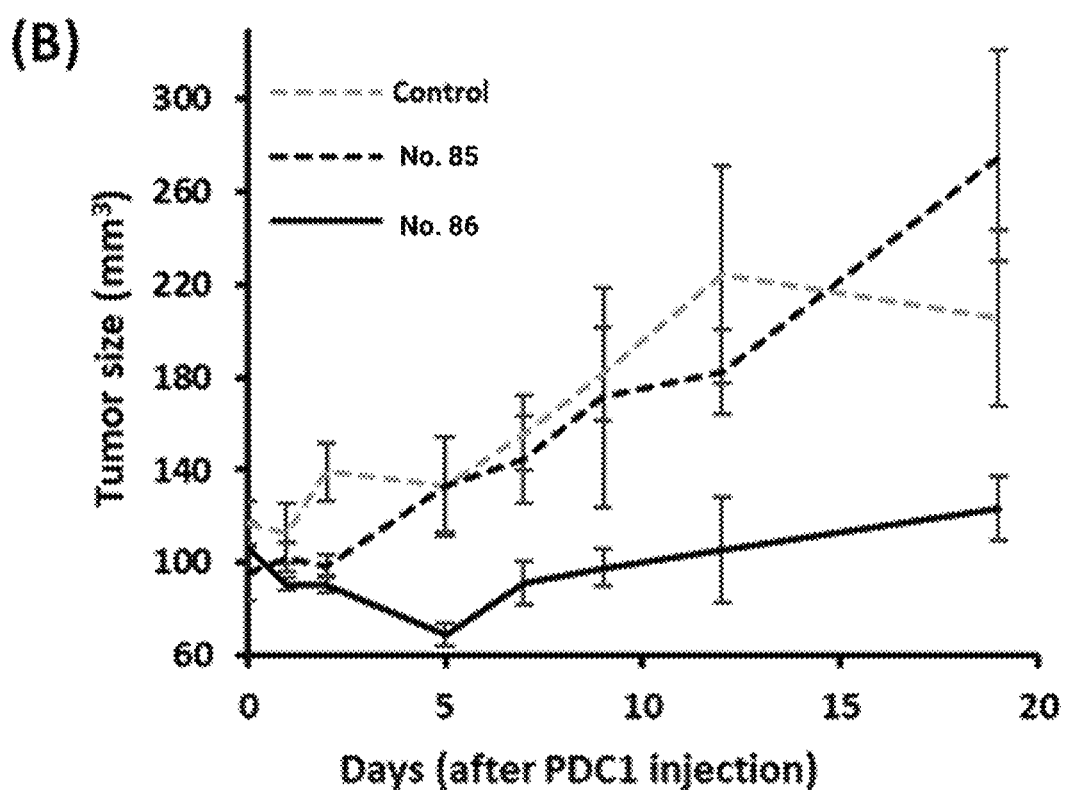

The results are shown in FIGS. 12a and 12b. As shown in FIGS. 12a and 12b, the peptide construct No. 86 in the form of a drug conjugate in which an MMAE drug is conjugated to peptide construct No. 85 through a linker does not cause a serious change in the weight of the mouse (FIG. 12a), showed an anticancer effect that significantly reduced the size of the tumor overexpressing CAIX (FIG. 12b).

5-5. In Vivo SPECT/CT Imaging Experiment of Isotope ($^{177}$Lu)-Labeled Peptide Construct A diagnostic imaging and therapeutic functionality were identified by labeling the isotope of the peptide construct. The peptide construct No. 95 was dissolved in DMSO to make a 10 mM stock solution, and then was diluted with a pH 5.5 ammonium acetate buffer solution, preparing 1 mM peptide construct solution. After taking a volume of 7 nmole from the 1 mM solution and mixing with 1 mCi isotope ($^{177}$LuCl$_3$, Eckert & Ziegler Radiopharma GmbH), pH 7.0 ammonium acetate buffer solution was added to make pH 5.5. Isotope labeling was performed at 90° C. for 1 hour. After labeling was completed, the samples were cooled to room temperature and purified using a Sep-Pak column (Cat #186005125, Waters). After loading the sample on the activated Sep-Pak column (5 mL of ethanol, 5 mL of distilled water), washing with 5 mL of distilled water, the solution eluted with 1.5 mL of ethanol was concentrated by purging with nitrogen. The concentrated ethanol solution was diluted with saline before use.

SK-RC-52 cell line (Memorial Sloan-Kettering Cancer Center, MSK, New York, USA), a human-derived renal cell carcinoma (RCC) cell line, was injected subcutaneously into 6-week-old male BALB/c nude mice (Orient Bio, Seoul, Korea) at 2×10$^6$ cells/100 µL per mouse into the lower armpit of the right forelimb. Groups were separated based on the size of tumors when the average size of tumors generated by engraftment of transplanted cancer cells SK-RC-52 was 100 mm$^3$ (80-100 mm$^3$). Weight and tumor size were measured twice a week, and tumor size was measured by measuring the width and length of the tumor using Vernier Calipers (Mitutoyo, Kawasaki, Tumor volume Japan). The tumor volume was calculated by using the equation below.

$$\text{Tumor volume (mm}^3\text{)} = \text{width}^2 \times \text{length}/2$$

Figure 13:
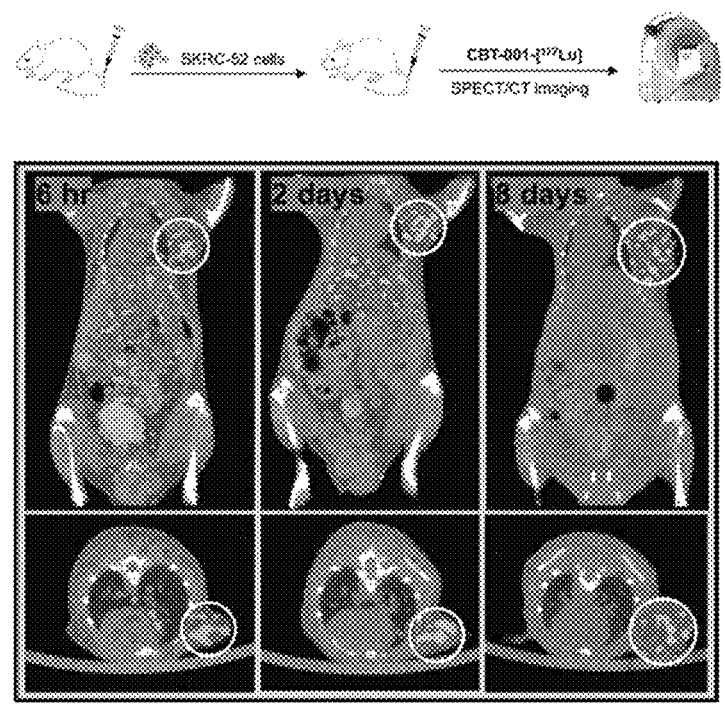
FIG. 13 shows the in vivo SPECT/CT imaging experiment results using an isotope ($^{177}$Lu)-labeled peptide construct (No. 95) according to an embodiment of the present invention in mouse xenotransplanted with SK-RC-52 cell lines.

When the size of tumors generated by transplantation of SK-RC-52 (a renal cell carcinoma cell line) reached an average of 100 mm$^3$ (80-100 mm$^3$), the peptide construct No. 95 labeled with isotope $^{177}$Lu of 100-150 µL, of which a radiation dose amounts to 600-700 µCi, was administered once to mice by tail vein injection, and SPECT/CT (Simens Inveon, software: InveonAcqusitionWorkplace) was measured at 6 hours, 2 days, and 8 days, respectively. For imaging, the mouse was anesthetized with 0.2% isoflurane in oxygen for about 3 to 5 minutes, and then the mouse was placed in the equipment. Next, the anesthetic was continuously injected into the mouse at 1.5 L/min, measuring SPECT for 50 minutes and CT for 7 minutes. And images were obtained with Inveon Research Workplace 4.2. FIG. 13 shows the SPECT/CT video image photograph obtained above. It was confirmed that the isotope $^{177}$Lu-labeled peptide construct No. 95 remained bound to cancer cell SK-RC-52 even after 8 days.

Thereafter, mice whose SPECT/CT measurement was completed up to 8 days after sample injection were euthanized by carbon dioxide (CO$_2$) inhalation, and tumors and organs (liver, kidney, spleen) were removed after laparotomy. The weight of the extracted tumor and organ was measured, respectively, and the radiation dose for each organ was measured using a portable radioactivity meter (Inspectorsurvey meter, INSPECTER (078-510)). After converting the remaining amount of isotope $^{177}$Lu-labeled peptide construct No. 95 measured in this way into radioactive intensity per unit weight, the relative radioactive intensity of the remaining organs based on the tumor value was calculated and shown in Table 1 below.

TABLE 1

| Organ/tissue | 8 Days post injection |
|---|---|
| Tumor | 1 |
| Liver | 0.08 |
| Kidney | 0.33 |
| Spleen | 0.07 |

5-6. Anticancer Effect Analysis of CAIX Target Peptide (Peptide Construct No. 95) Labeled with an Isotope ($^{177}$Lu)

Figure 14:
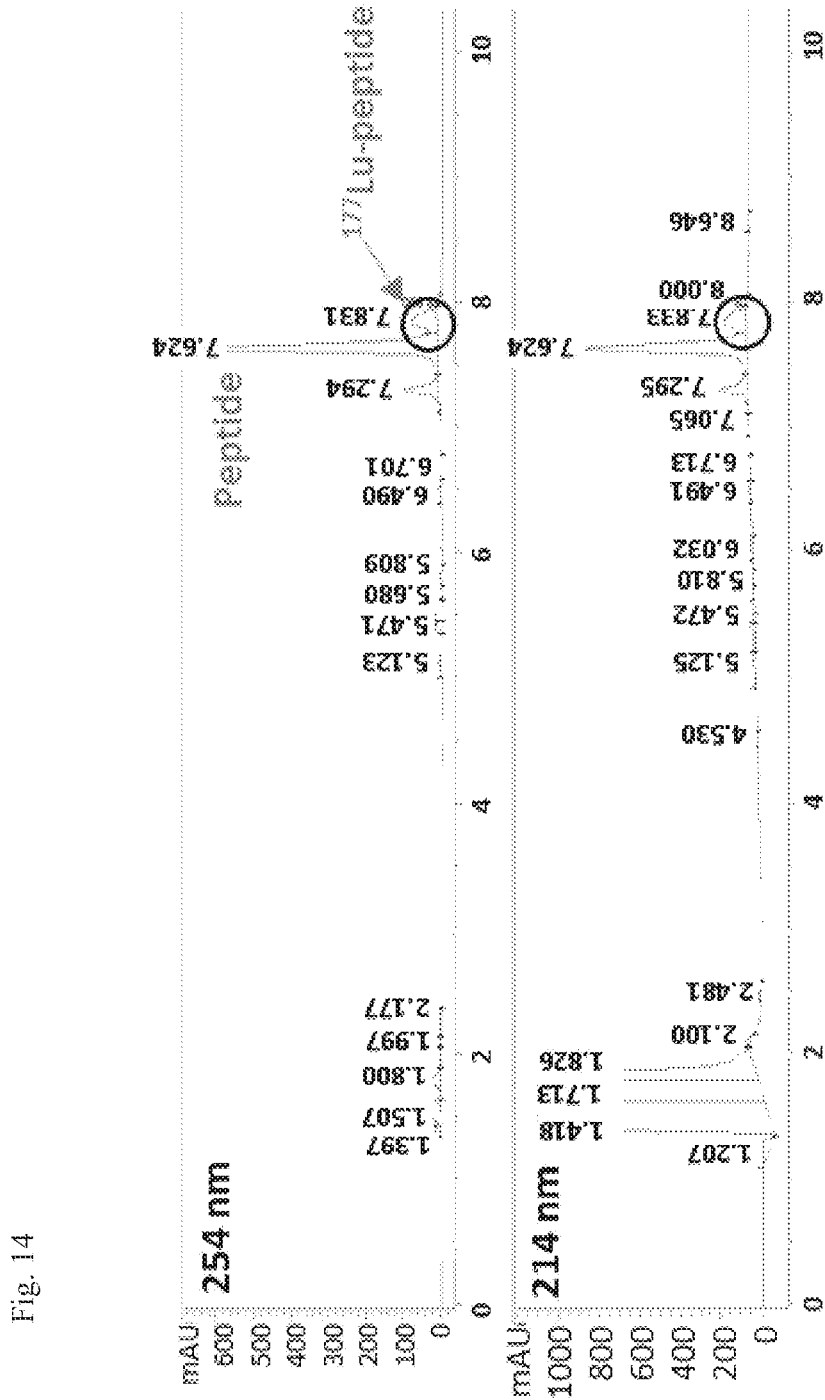
FIG. 14 shows the results of chromatogram in which the isotope ($^{177}$Lu)-labeled peptide construct (No. 95) is purified with LC.

The peptide construct No. 95 was dissolved in DMSO to make a 10 mM stock solution, and then was diluted with the pH 5.5 ammonium acetate buffer solution, preparing 1 mM peptide construct solution. After taking a volume of 40 nmole from the 1 mM solution and mixing with 14 mCi isotope ($^{177}$LuCl$_3$, Eckert & Ziegler Radiopharma GmbH), pH 7.0 ammonium acetate buffer was added to make pH 5.5. Isotope labeling was performed at 90° C. for 1 hour. After labeling was completed, the samples were cooled to room temperature and purified using the 1200 Infinity LC system (Agilent) under the following conditions: (1) stationary phase is an Agilent Poroshell 120 EC-C18 column (4.6×50 mm, 2.7 µm), (2) mobile phase solvent is a mixture of 0.1% TFA-added tertiary distilled water and ACN, (3) flow rate is 1 mL/min, and (4) the detection wavelengths are 254 nm and 214 nm. The chromatogram of the $^{177}$Lu-labeled target peptide construct No. 95 is shown in FIG. 14.

The $^{177}$Lu-labeled target peptide construct No. 95 obtained by purification was loaded onto the activated Sep-Pak column (5 mL of ethanol, 5 mL of distilled water), washed with 5 mL of distilled water to remove the organic solvent. A solution eluted sequentially with 500 µL of ACN:H$_2$O (1:1) and 700 µL of ethanol was concentrated by purging with nitrogen. The concentrated ethanol solution was diluted with saline (EtOH 20%, DMSO 1%) before use.

SK-RC-52 cell lines, a renal cancer cell overexpressing CAIX, was diluted in PBS at 2×10$^6$ and injected subcutaneously into the side of right anterior of 6-week-old female BLAB/c nude mice (Orient Bio, Korea). Mice in which tumor cells were transplanted were weighed for 2 to 3 weeks to measure the health change of the mice, and the size of the tumor (width$^2$×length/2) was measured using the Digimatic Caliper (Cat #500-151-30, Mitutoyo, Japan). When the size of the tumors reached about 100 mm$^3$, the mice were divided into 6 as the control group where saline was injected as a vehicle and 6 as the experimental group where about 500 µCi of target peptide construct No. 95 labeled with $^{177}$Lu was injected into the tail vein. Body weight and tumor size were measured three times a week.

Figure 15A:
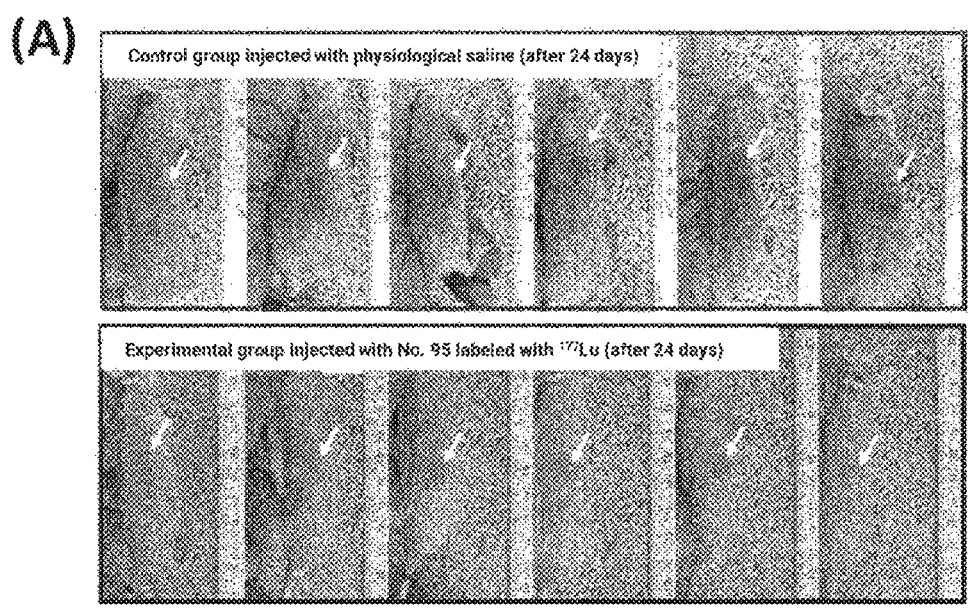
FIG. 15a to FIG. 15c show photographs (FIG. 15a) and graphs (FIG. 15c) showing the changes of tumor size of a mouse and graphs showing body weight changes (FIG. 15b), produced by an isotope ($^{177}$Lu)-labeled peptide construct (No. 95) according to an embodiment of the present invention in a mouse xenotransplanted with SK-RC-52 cell lines.
Figure 15B:
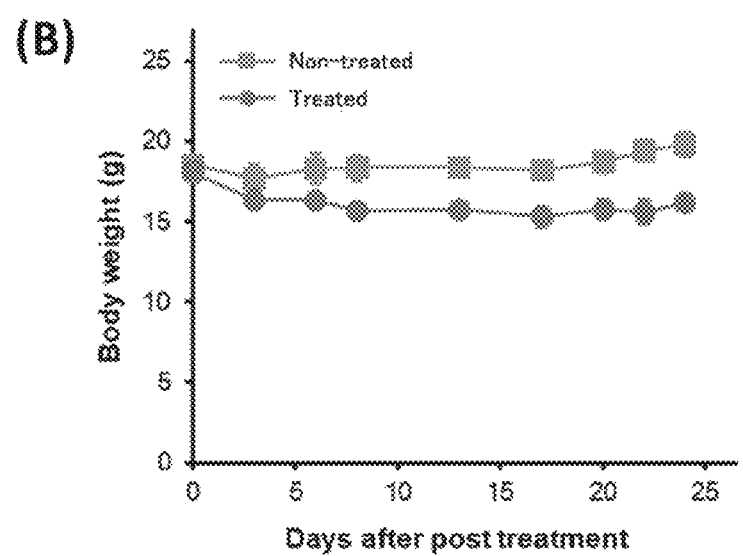
Figure 15C:
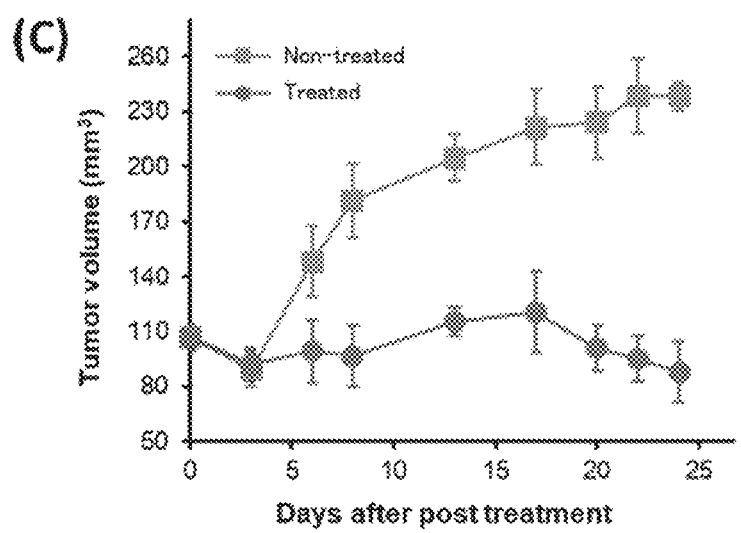

The results are shown in FIGS. 15a to 15c. As shown in FIGS. 15a to 15c, the $^{177}$Lu-labeled target peptide construct No. 95 did not cause a significant change in the body weight of the mice (FIG. 15b) and exhibited an anticancer effect of the significant reduction in size of CAIX-overexpressing tumors (FIGS. 15a and 15c).

The description of the present invention described above is for illustrative purposes, and those skilled in the art to which the present invention belongs are not limited to the scope of the present invention by the disclosed embodiments and accompanying drawings. And it will be understood that various modifications are possible in other specific forms within the scope that does not deviate from the technical spirit of the present invention.

SEQUENCE LIST

TABLE 2

| Seq ID No. | Amino Acid Sequences |
|---|---|
| 1 | RAHKHYH |
| 2 | HRKHDDN |
| 3 | AYYRKKW |
| 4 | RRLLFSG |
| 5 | RRFHFTH |
| 6 | FHSRRDV |
| 7 | VLRNKSD |
| 8 | RSRHFHY |
| 9 | FHRIKHL |
| 10 | RITAINY |
| 11 | YHKHIRQ |
| 12 | HFVKKFR |
| 13 | FFKRKHE |
| 14 | HGHLFKR |
| 15 | RFHHFRN |
| 16 | RLSKFHS |
| 17 | YETFRTR |
| 18 | RRFRHYH |
| 19 | RRXRHKH (wherein, X = U(1-Nal)) |
| 20 | HYHRFRR |
| 21 | HXHRFRR (wherein, X = U(Phe(F$_5$))) |

TABLE 2-continued

| Seq ID No. | Amino Acid Sequences |
|---|---|
| 22 | HXHRFRR (wherein, X = U(Phe(4-NH$_2$))) |
| 23 | HXHRFRR (wherein, X = U(1-Nal)) |
| 24 | HXHRFRR (wherein, X = U(BiP(4,4-))) |
| 25 | HYHRXRR (wherein, X = U(Phe(F$_5$))) |
| 26 | HYHRXRR (wherein, X = U(Phe(4-NH$_2$))) |
| 27 | HYHRXRR (wherein, X = U(1-Nal)) |
| 28 | HYHRXRR (wherein, X = U(BiP(4,4-))) |
| 29 | RRFRY |
| 30 | RRXRY (wherein, X = U(1-Nal)) |
| 31 | RRFRK |
| 32 | RRXRK (wherein, X = U(1-Nal)) |
| 33 | ERXRK (wherein, X = U(1-Nal)) |
| 34 | RRXEK (wherein, X = U(1-Nal)) |
| 35 | RRXRY (wherein, X = U(homo-f)) |
| 36 | ERXEK (wherein, X = U(1-Nal)) |
| 37 | YRFRR |
| 38 | YEFRR |
| 39 | YRFER |
| 40 | YRFRE |
| 41 | KRXRR (wherein, X = U(1-Nal)) |
| 42 | YRXRR (wherein, X = U(1-Nal)) |
| 43 | KRFRR |
| 44 | X1RX2RR (wherein, X1 = U(Phe(4-NH$_2$)), X2 = U(1-Nal)) |

In the sequence above, the amino acid may be a D-amino acid or an L-amino acid

The invention claimed is:

1. A CAIX-specific peptide construct comprising a peptide ligand consisting of any one of amino acid sequence selected from the group consisting of SEQ ID NOs: 1 to 44, wherein at least one of the constituent amino acids is composed of D-amino acids and a lysine (Lys) residue among the constituent amino acids may be substituted with a chemical functional group at the side chain ε-amino group; and a sulfonamide functional group-containing amino acid residue linked to the peptide ligand directly or through a spacer;

wherein the peptide construct has a cyclic structure represented by Formula 1 below:

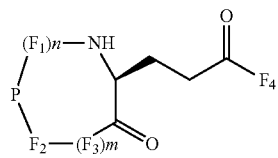

[Formula 1]

wherein,

P is the peptide ligand, $F_1$ is a glycine (Gly) or a sulfonamide functional group-containing amino acid residue, $F_2$ is a sulfonamide functional group-containing amino acid residue, $F_3$ is a glycine (Gly) or a functional group-containing amino acid residue other than sulfonamide, n and m are each independently 0 or 1, $F_4$ is a group of the general formula —$(S_1)_o$—$(F_5)_p$—$(S_2)_q$—$(F_6)_r$—$NH_2$, wherein $S_1$ and $S_2$ are each independently a spacer, $F_5$ and $F_6$ are each independently a functional group-containing amino acid residue other than sulfonamide, wherein the functional group other than sulfonamide is chelator, cycloalkane having 5 to 15 carbon atoms, biotin, glucoheptonic acid, 4-(p-iodophenyl) butyric acid (IB), fluorescent dye, or cytotoxic agent, and o, p, q and r each independently represent an integer of 0 to 6.

2. The CAIX-specific peptide construct according to claim 1, wherein the sulfonamide functional group-containing amino acid residue has the following structure

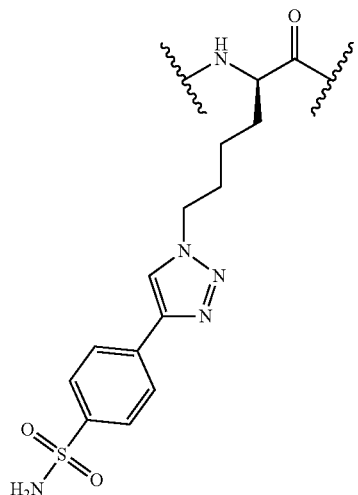

Uk(SFA)

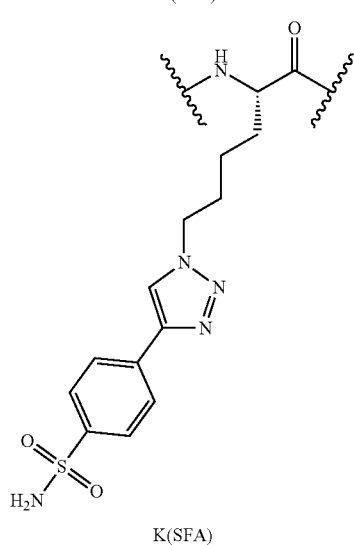

K(SFA)

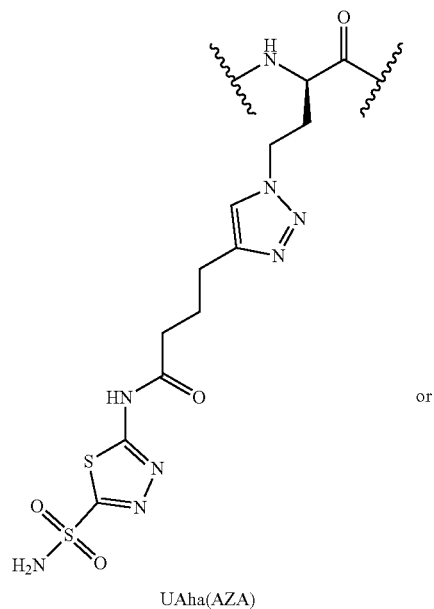

UAha(AZA)

or

-continued

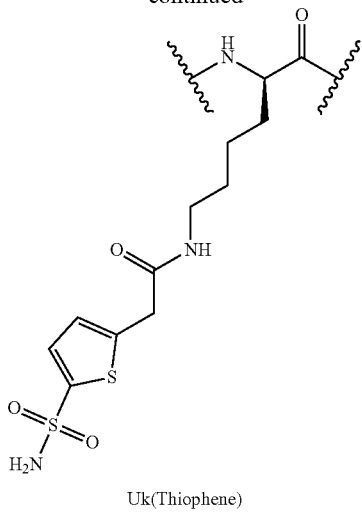

Uk(Thiophene)

3. The CAIX-specific peptide construct of claim 1, wherein the functional group-containing amino acid residues other than sulfonamide is introduced through a side chain ε-amino group of a lysine residue.

4. The CAIX-specific peptide construct of claim 1, wherein the chelator is one or more selected from 1,4,7,10-tetraazacyclododecane-1,4,7,10-tetraacetic acid (DOTA), 1,4,7-triazacyclononane-1,4,7-triacetic acid (NOTA), ethylenediaminetetraacetic acid 2,2',2",2"'-(ethane-1,2-diyldinitrilo)tetraacetic acid (EDTA), 1,4,7,10,13,16-hexaazacyclooctadecane-N,N',N",N''',N"",N""'-hexaacetic acid (HEHA), 2-[4-nitrobenzyl]-1,4,7,10,13-pentaazacyclopentadecane-N,N',N",N''',N""-pentaacetic acid (PEPA), 1,4,7,10-tetraazacyclododecane-1,4,7,10-tetra(methylene phosphonic acid) (DOTP), (1R,4R,7R,10R)-α,α',α",α"'-tetramethyl-1,4,7,10-tetraazacyclododecane-1,4,7,10-tetraacetic acid)tetrasodium salt (DOTMA), 2-[bis[2-[bis(carboxymethyl)amino]ethyl]amino]acetic acid (DTPA), and triethylenetetramin (TETA).

5. The CAIX-specific peptide construct of claim 1, wherein the cycloalkane having 5 to 15 carbon atoms is one or more selected from cyclopentane, cyclohexane, cycloheptane, cyclooctane, cyclononane, cyclodecane, adamantane, norbonane, isobornane, and tricyclodecane.

6. The CAIX-specific peptide construct according to claim 1, wherein the spacer is at one or more selected from polyethyleneglycol (PEG) linker, glycine, sarcosine, and peptide linkers consisting of 1 to 5 D-amino acids or L-amino acids.

7. The CAIX-specific peptide construct of claim 1, wherein the peptide construct has a structure of Formula 6, 7 or 8 below:

[Formula 6]

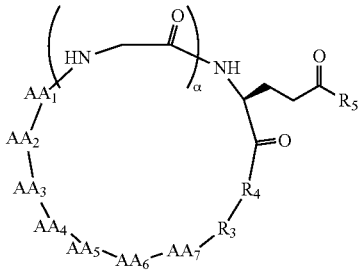

| No. | R$_4$ | R$_3$ | α | AA$_7$ | AA$_6$ | AA$_5$ | AA$_4$ | AA$_3$ | AA$_2$ | AA$_1$ | R$_5$ |
|---|---|---|---|---|---|---|---|---|---|---|---|
| 35 |  | K(SFA) | 1 | r | r | f | h | f | t | h | NH$_2$ |
| 36 |  | K(SFA) | 1 | r | r | f | h | f | t | h | (PEG1)$_2$-K(biotin)-NH$_2$ |
| 37 | K(cyclooctane) | K(SFA) | 1 | r | r | f | h | f | t | h | (PEG1)$_2$-K(biotin)-NH$_2$ |
| 38 |  | K(SFA) | 0 | r | r | f | r | h | y | h | (PEG1)$_2$-K(biotin)-NH$_2$ |
| 39 | K(Admantane) | K(SFA) | 0 | r | r | f | r | h | y | h | (PEG1)$_2$-K(biotin)-NH$_2$ |
| 40 | K(cyclooctane) | K(SFA) | 0 | r | r | f | r | h | y | h | (PEG1)$_2$-K(biotin)-NH$_2$ |
| 41 |  | Uk(SFA) | 0 | h | y | h | r | f | r | r | (PEG1)$_2$-K(biotin)-NH$_2$ |
| 42 | Uk(cyclooctane) | Uk(SFA) | 0 | h | y | h | r | f | r | r | (PEG1)$_2$-K(biotin)-NH$_2$ |
| 43 |  | Uk(SFA) | 0 | h | y | h | r | f | r | r | (Sar)$_6$-K(AF488)-NH$_2$ |
| 44 | Uk(cyclooctane) | Uk(SFA) | 0 | h | y | h | r | f | r | r | (Sar)$_6$-K(AF488)-NH$_2$ |
| 45 | Uk(Admantane) | Uk(SFA) | 0 | h | y | h | r | f | r | r | (PEG1)$_2$-K(AF488)-NH$_2$ |
| 46 | Uk(Admantane) | Uk(SFA) | 0 | h | y | h | r | f | r | r | (PEG1)$_2$-K(biotin)-NH$_2$ |
| 47 | Uk(Admantane) | Uk(SFA) | 0 | h | y | h | r | f | r | r | K(DOTA)-(PEG1)$_2$-K(biotin)-NH$_2$ |
| 48 | Uk(Admantane) | Uk(SFA) | 0 | h | y | h | r | f | r | r | (PEG1)$_2$-K(DOTA)-NH$_2$ |

-continued

| | | | | | | | | | | |
|---|---|---|---|---|---|---|---|---|---|---|
| 49 | Uk(Admantane) | Uk(SFA) | 0 | h | y | h | r | f | r | r | (Sar)₆-K(AF488)-NH₂ |
| 50 | Uk(Admantane) | Uk(SFA) | 0 | h | y | h | r | f | r | r | K(AF488)-NH₂ |
| 51 | Uk(Admantane) | UAha(AZA) | 0 | h | y | h | r | f | r | r | (PEG1)₂-K(biotin)-NH₂ |
| 52 | G | UAha(AZA) | 0 | h | y | h | r | f | r | r | (PEG1)₂-K(biotin)-NH₂ |
| 53 | Uk(Admantane) | Uk(Thiophene) | 0 | h | y | h | r | f | r | r | (PEG1)₂-K(biotin)-NH₂ |
| 54 | G | Uk(Thiophene) | 0 | h | y | h | r | f | r | r | (PEG1)₂-K(biotin)-NH₂ |
| 55 | K(Admantane) | K(SFA) | 0 | h | U(Phe(F₅)) | h | r | f | r | r | (PEG1)₂-K(biotin)-NH₂ |
| 56 | K(Admantane) | K(SFA) | 0 | h | U(Phe(4-NH₂)) | h | r | f | r | r | (PEG1)₂-K(biotin)-NH₂ |
| 57 | K(Admantane) | K(SFA) | 0 | h | U(1-Nal) | h | r | f | r | r | (PEG1)₂-K(biotin)-NH₂ |
| 58 | K(Admantane) | K(SFA) | 0 | h | U(BiP(4,4-)) | h | r | f | r | r | (PEG1)₂-K(biotin)-NH₂ |
| 59 | Uk(Admantane) | Uk(SFA) | 0 | h | y | h | r | U(Phe(F₅)) | r | r | (PEG1)₂-K(biotin)-NH₂ |
| 60 | Uk(Admantane) | Uk(SFA) | 0 | h | y | h | r | U(Phe(4-NH₂)) | r | r | (PEG1)₂-K(biotin)-NH₂ |
| 61 | Uk(Admantane) | Uk(SFA) | 0 | h | y | h | r | U(1-Nal) | r | r | (PEG1)₂-K(biotin)-NH₂ |
| 62 | Uk(Admantane) | Uk(SFA) | 0 | h | y | h | r | U(BiP(4,4-)) | r | r | (PEG1)₂-K(biotin)-NH₂ |

][Formula 7]

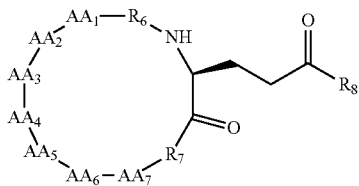

| No. | R₇ | AA₇ | AA₆ | AA₅ | AA₄ | AA₃ | AA₂ | AA₁ | R₆ | R₈ |
|---|---|---|---|---|---|---|---|---|---|---|
| 63 | K(SFA) | r | r | f | r | h | y | h | K(SFA) | UK(DOTA)-(PEG1)₂-K(biotin)-NH₂ |
| 64 | Uk(SFA) | h | y | h | r | f | r | r | Uk(SFA) | (PEG1)₂-K(biotin)-NH₂ |
| 65 | Uk(SFA) | h | y | h | r | f | r | r | Uk(SFA) | UK(DOTA)-(PEG1)₂-K(biotin)-NH₂ |

[Formula 8]

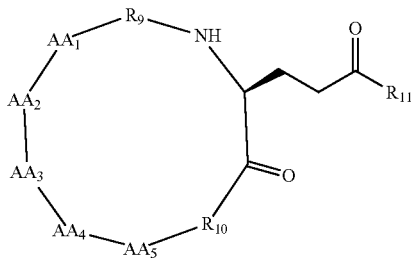

| No. | R₁₀ | AA₅ | AA₄ | AA₃ | AA₂ | AA₁ | R₉ | R₁₁ |
|---|---|---|---|---|---|---|---|---|
| 66 | K(SFA) | r | r | f | r | y | K(SFA) | UK(DOTA)-(PEG1)₂-K(biotin)-NH₂ |
| 67 | K(SFA) | r | r | U(homo-f) | r | y | K(SFA) | UK(DOTA)-(PEG1)₂-K(biotin)-NH₂ |
| 68 | K(SFA) | r | r | U(1-Nal) | r | Uk(PhF₅) | K(SFA) | UK(DOTA)-(PEG1)₂-K(biotin)-NH₂ |
| 69 | K(SFA) | r | r | U(1-Nal) | e | Uk(PhF₅) | K(SFA) | UK(DOTA)-(PEG1)₂-K(biotin)-NH₂ |
| 70 | K(SFA) | e | r | U(1-Nal) | e | Uk(PhF₅) | K(SFA) | UK(DOTA)-(PEG1)₂-K(biotin)-NH₂ |
| 71 | Uk(SFA) | y | r | f | r | r | Uk(SFA) | UK(DOTA)-(PEG1)₂-K(biotin)-NH₂ |
| 72 | Uk(SFA) | y | r | f | r | r | Uk(SFA) | Uk(6OH)-Uk(DOTA)-(PEG1)₂-K(biotin)-NH₂ |
| 73 | UAha(AZA) | y | r | f | r | r | UAha(AZA) | K(DOTA)-(PEG1)₂-K(biotin)-NH₂ |
| 74 | Uk(SFA) | y | R | f | r | r | Uk(SFA) | UK(DOTA)-(PEG1)₂-K(biotin)-NH₂ |
| 75 | UOrn(SFA) | y | R | f | r | r | UOrn(SFA) | UK(DOTA)-(PEG1)₂-K(biotin)-NH₂ |
| 76 | UAha(SFA) | y | R | f | r | r | UAha(SFA) | UK(DOTA)-(PEG1)₂-K(biotin)-NH₂ |
| 77 | UAza(SFA) | y | R | f | r | r | UAza(SFA) | UK(DOTA)-(PEG1)₂-K(biotin)-NH₂ |
| 78 | Uk(SFA) | y | R | f | r | r | UAha(SFA) | UK(DOTA)-(PEG1)₂-K(biotin)-NH₂ |
| 79 | UAha(SFA) | y | R | f | r | r | Uk(SFA) | UK(DOTA)-(PEG1)₂-K(biotin)-NH₂ |
| 80 | Uk(SFA) | y | R | f | r | r | Uk(SFA) | se-k(DOTA)-ee-Pra(AF488)-NH2 |

-continued

| | | | | | | | | |
|---|---|---|---|---|---|---|---|---|
| 81 | UAha(SFA) | y | R | f | r | r | UAha(SFA) | se-k(DOTA)-ee-Pra(AF488)-NH2 |
| 82 | Uk(SFA) | y | R | f | r | r | UAha(SFA) | se-k(DOTA)-ee-Pra(AF488)-NH2 |
| 83 | Uk(SFA) | y | R | f | r | r | Uk(SFA) | sdrds-Uk(DOTA)-(PEG1)$_2$-K(biotin)-NH$_2$ |
| 84 | Uk(SFA) | y | R | f | r | r | Uk(SFA) | sdrd-Uk(6OH)-Uk(DOTA)-(PEG1)$_2$-K(biotin)-NH$_2$ |
| 85 | Uk(SFA) | y | R | f | r | r | Uk(SFA) | sd-Uk(6OH)-d-NH$_2$ |
| 86 | Uk(SFA) | y | R | f | r | r | Uk(SFA) | sd-Uk(6OH)-d-Valine-Citrulline-PABC-MMAE |
| 87 | Uk(SFA) | y | e | f | r | r | Uk(SFA) | UK(DOTA)-(PEG1)$_2$-K(biotin)-NH$_2$ |
| 88 | Uk(SFA) | y | r | f | e | r | Uk(SFA) | UK(DOTA)-(PEG1)$_2$-K(biotin)-NH$_2$ |
| 89 | Uk(SFA) | y | r | f | r | e | Uk(SFA) | UK(DOTA)-(PEG1)$_2$-K(biotin)-NH$_2$ |
| 90 | Uk(SFA) | Uk(PhF$_5$) | r | U(1-Nal) | r | r | Uk(SFA) | UK(DOTA)-(PEG1)$_2$-K(biotin)-NH$_2$ |
| 91 | Uk(SFA) | y | r | U(1-Nal) | r | r | Uk(SFA) | UK(DOTA)-(PEG1)$_2$-K(biotin)-NH$_2$ |
| 92 | Uk(SFA) | Uk(PhF$_5$) | r | f | r | r | Uk(SFA) | UK(DOTA)-(PEG1)$_2$-K(biotin)-NH$_2$ |
| 93 | Uk(SFA) | U(Phe(4-NH$_2$)) | r | U(1-Nal) | r | r | Uk(SFA) | UK(DOTA)-(PEG1)$_2$-K(biotin)-NH$_2$ |
| 94 | Uk(SFA) | y | R | f | r | r | Uk(SFA) | VPTLQ-Uk(AF488)-NH$_2$ |
| 95 | Uk(SFA) | y | R | f | r | r | Uk(SFA) | sd-Uk(DOTA)-dds-Uk(IB)-Uk(6OH)-NH$_2$ | wherein lowercase letters represent D-amino acid, uppercase letters represent a L-amino acid, and the substituents indicated by U are as defined below, respectively

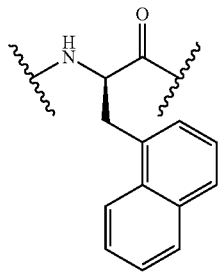

U(1-Nal)

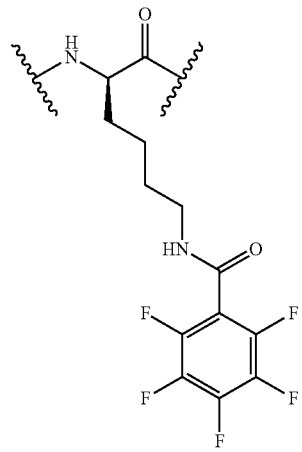

Uk(PhF$_5$)

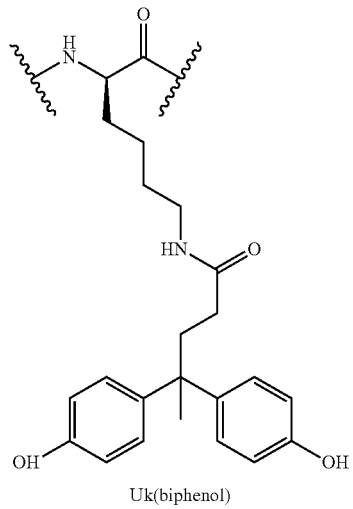

Uk(biphenol)

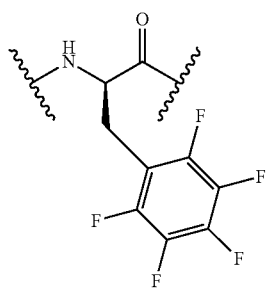

U(Phe(F$_5$))

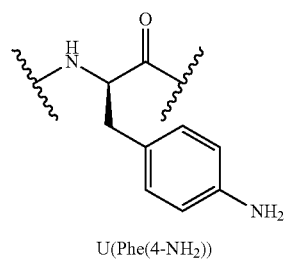

U(Phe(4-NH$_2$))

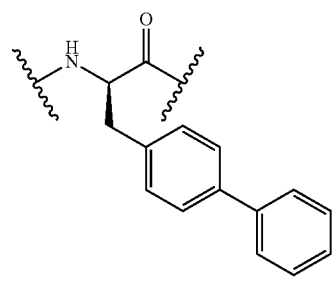

U(BiP(4,4-))

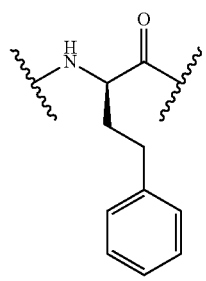

U(homo-f)

-continued
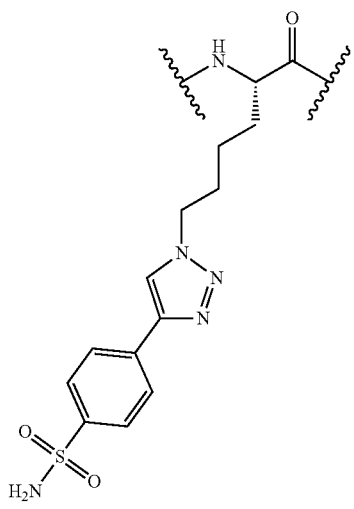
K(SFA)
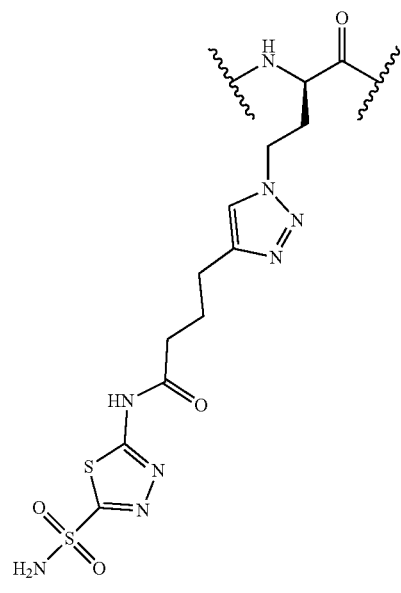
UAha(AZA)
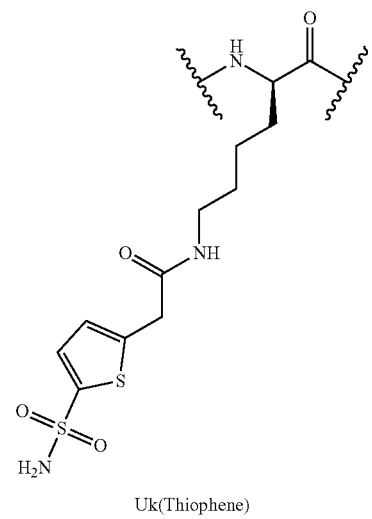
Uk(Thiophene)
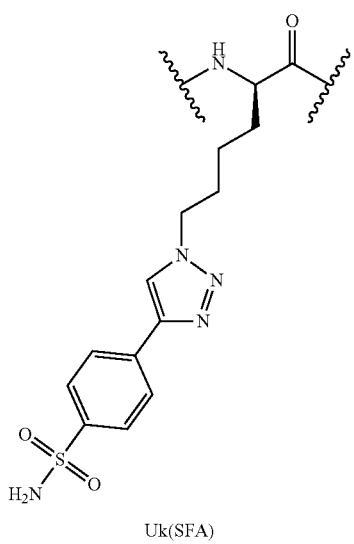
Uk(SFA)
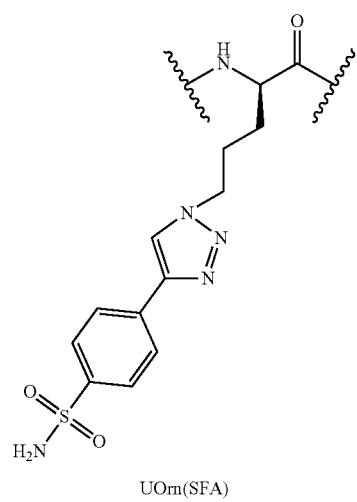
UOrn(SFA)
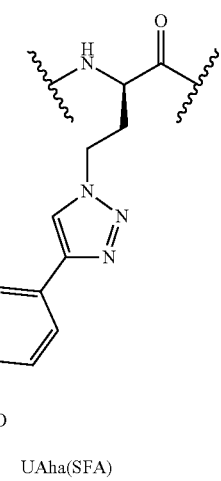
UAha(SFA)
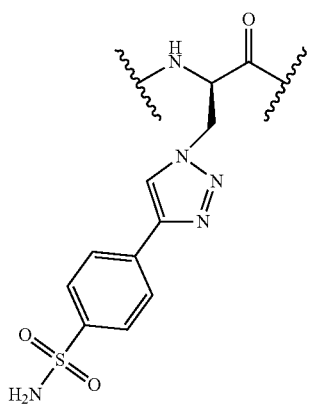
UAza(SFA)
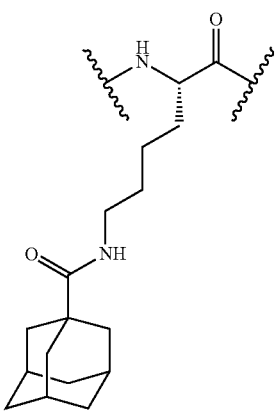
Uk(Adamatane)
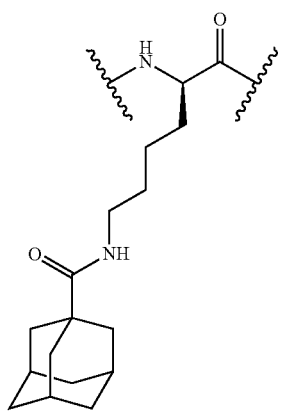
K(Adamantane)

87
-continued
88
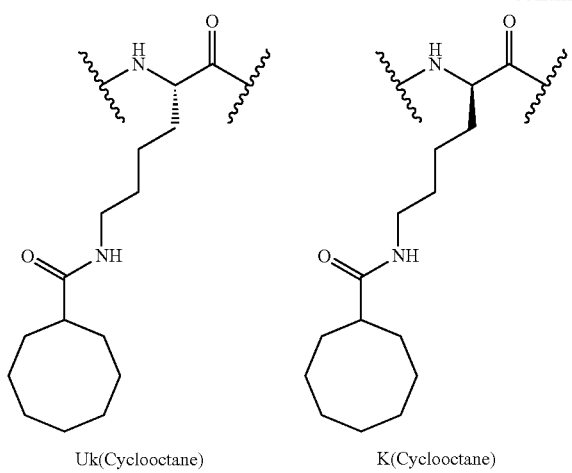
Uk(Cyclooctane)    K(Cyclooctane)
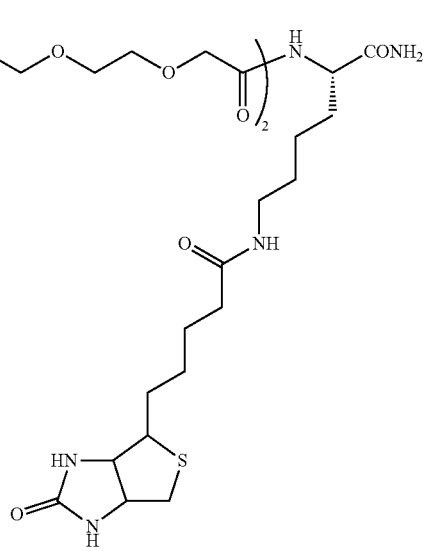
(PEG1)$_2$-K(biotin)-NH$_2$
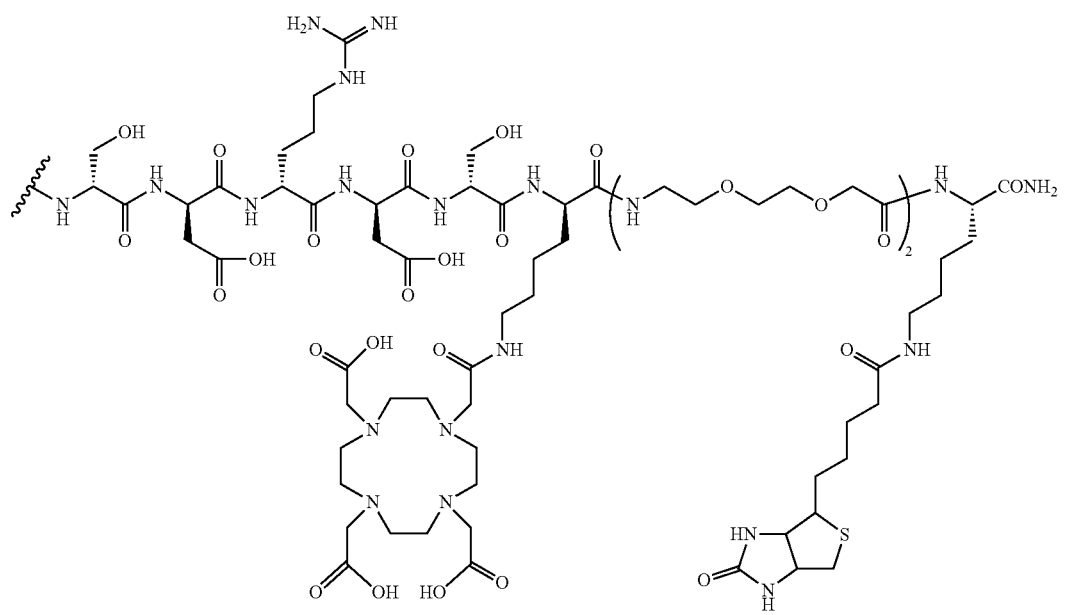
sdrds-Uk(DOTA)-(PEG1)$_2$-K(biotin)-NH$_2$

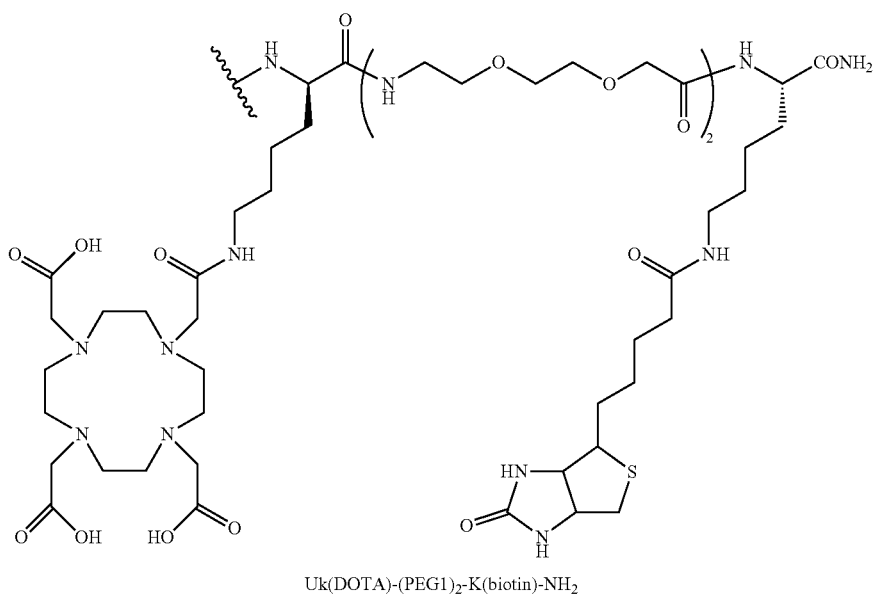
Uk(DOTA)-(PEG1)₂-K(biotin)-NH₂
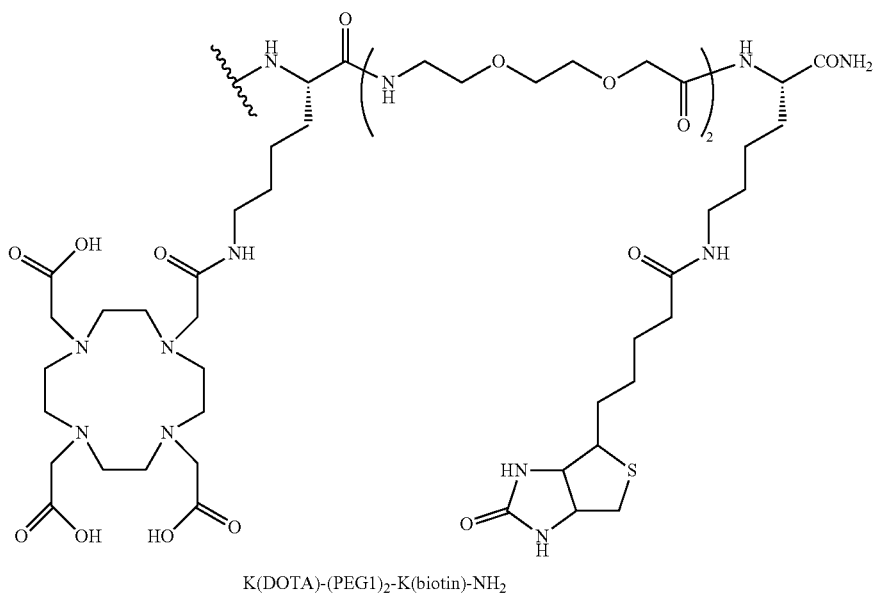
K(DOTA)-(PEG1)₂-K(biotin)-NH₂

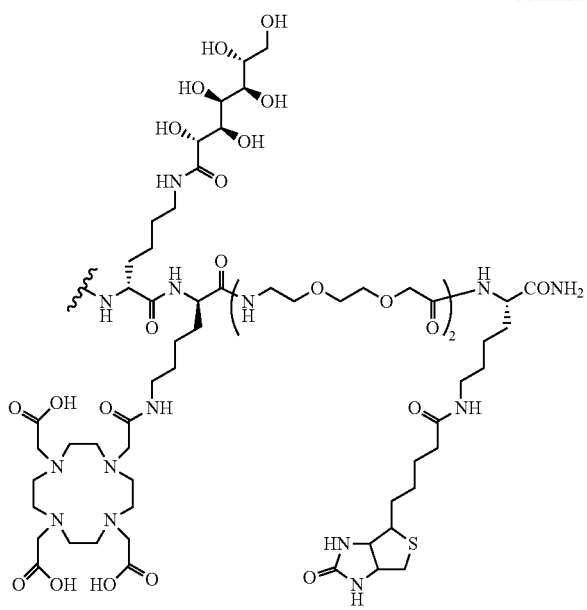
Uk(6OH)-Uk(DOTA)-(PEG1)₂-K(biotin)-NH₂
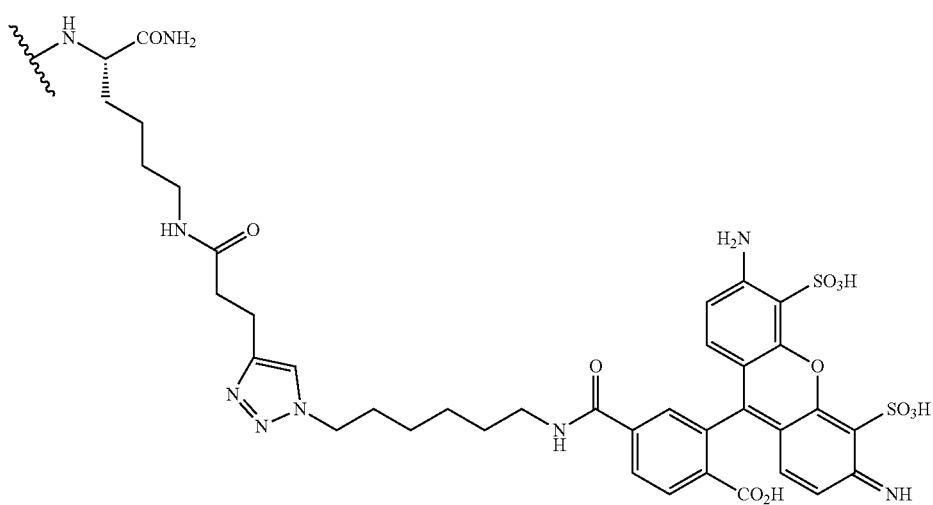
K(AF488)-NH₂

-continued
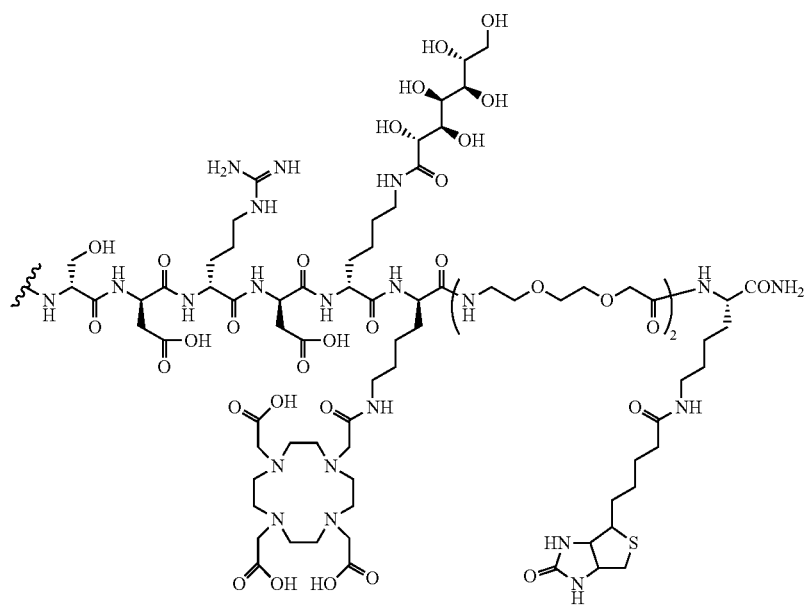
sdrd-Uk(6OH)-Uk(DOTA)-(PEG1)₂-K(biotin)-NH₂
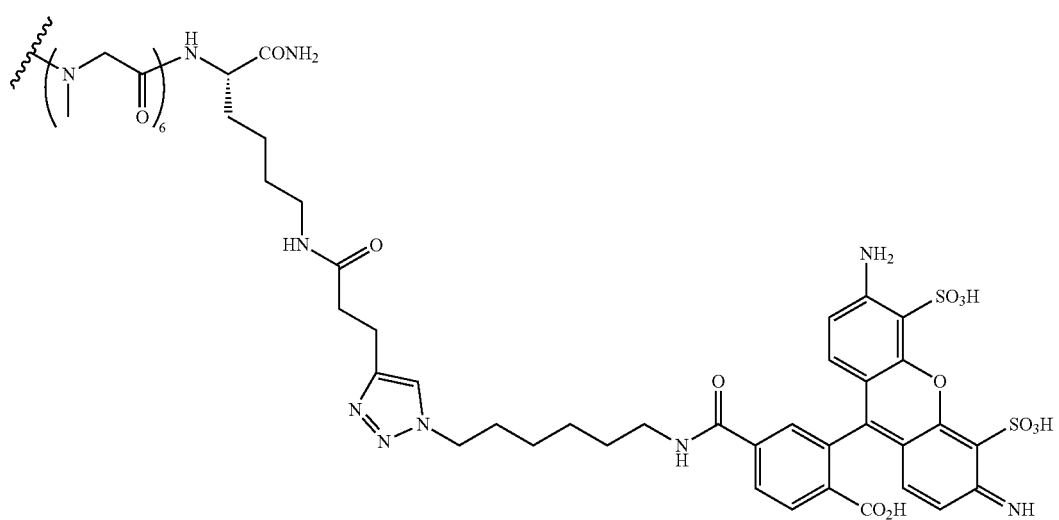
(Sar)₆-K(AF488)-NH₂

-continued
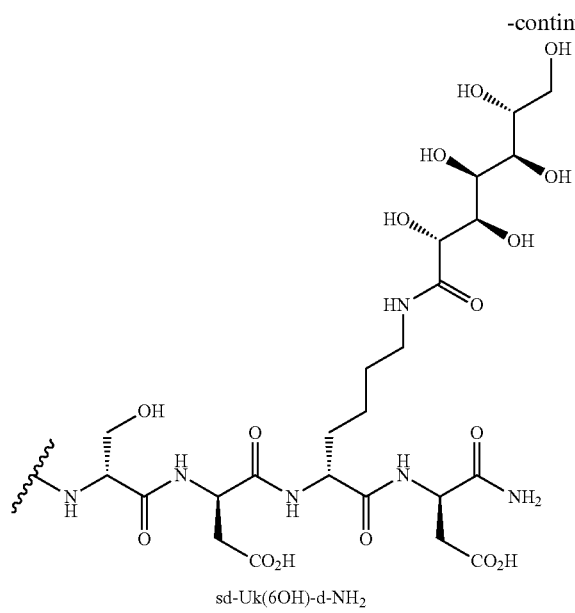
sd-Uk(6OH)-d-NH₂
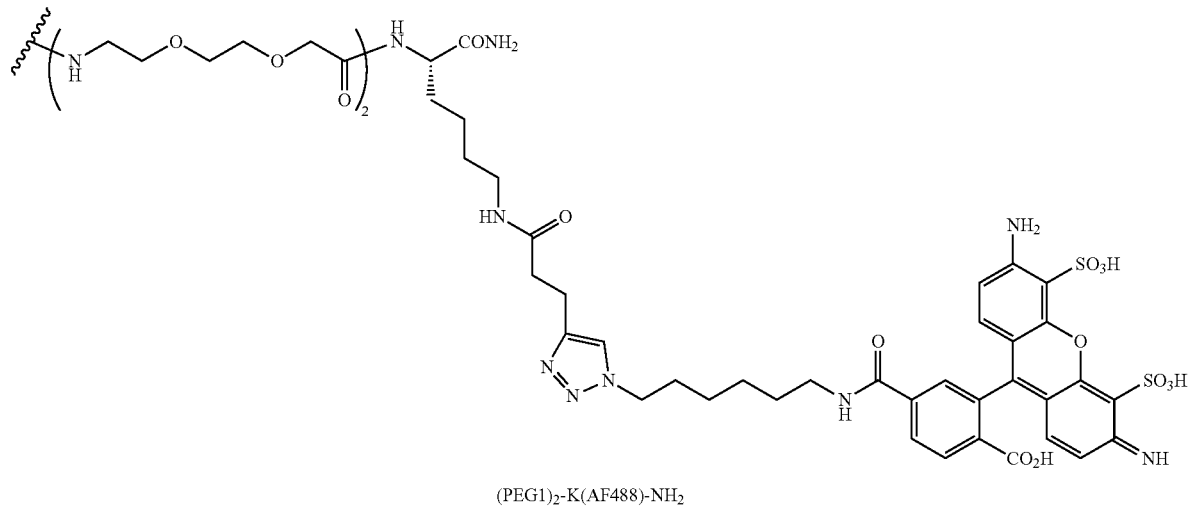
(PEG1)₂-K(AF488)-NH₂

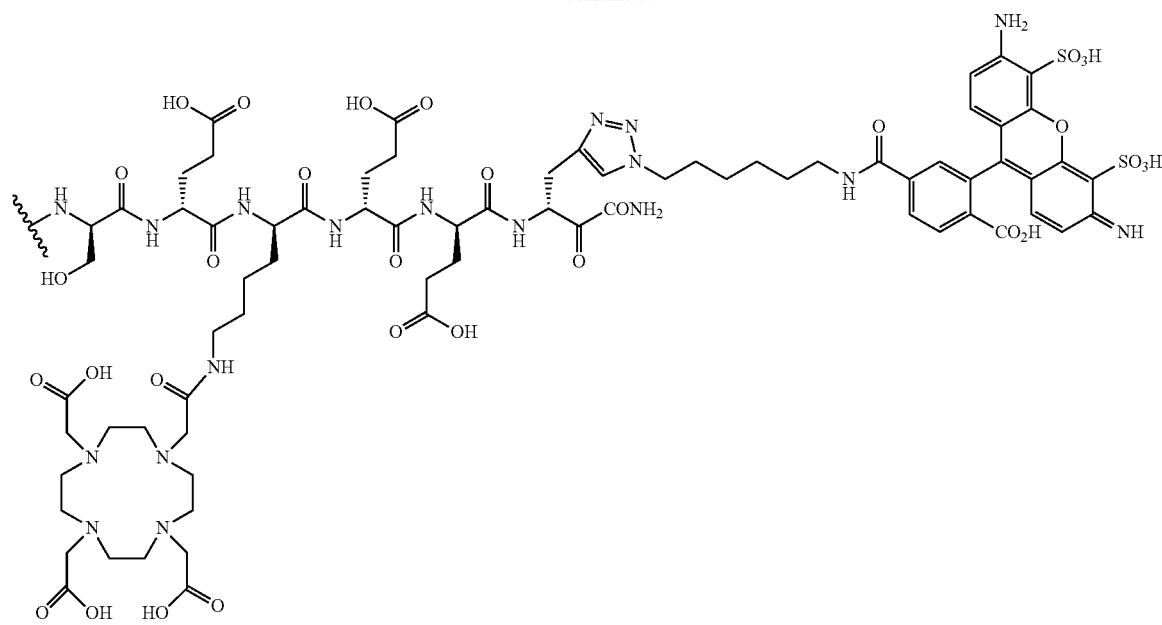
se-Uk(DOTA)-ee-Pra(AF488)-NH2
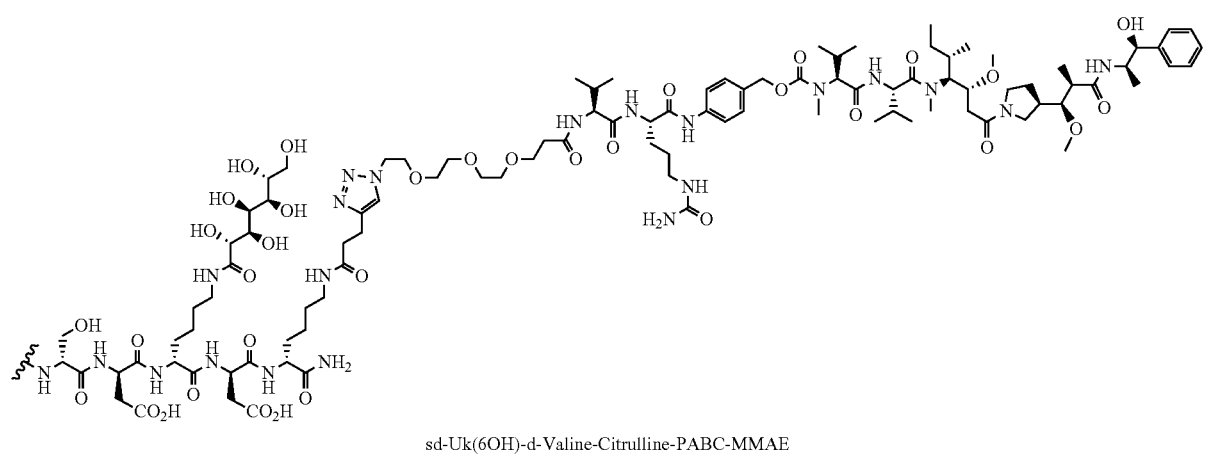
sd-Uk(6OH)-d-Valine-Citrulline-PABC-MMAE
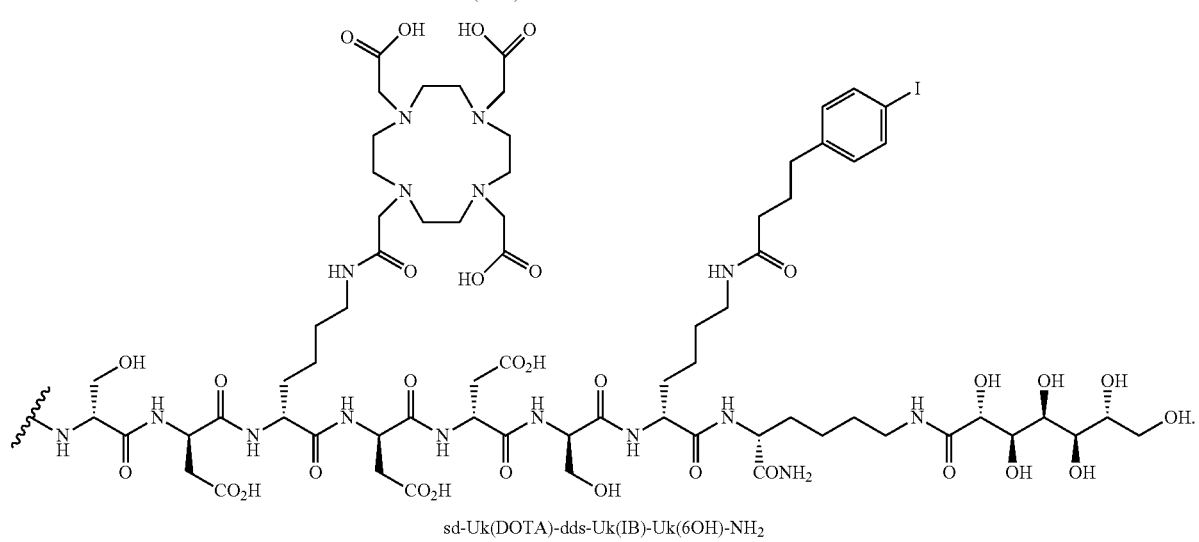
sd-Uk(DOTA)-dds-Uk(IB)-Uk(6OH)-NH2

8. A conjugate comprising the peptide construct according to claim 1 or 7 linked to fluorescent dye, a cytotoxic agent or radioactive isotope directly or via a linker.

9. The conjugate of claim 8,
wherein the linker is one or more selected from 6-maleimidocaproyl (MC), maleimidopropanoyl (MP), valine-citrulline (val-cit), alanine-phenylalanine (ala-phe), p-aminobenzyloxycarbonyl (PAB), N-succinimidyl 4-(2-pyridylthio)pentanoate (SPP), N-succinimidyl 4-(N-maleimidomethyl)cyclohexane-1 carboxylate (SMCC), 4-(2-pyridyldithio) butyric acid-N-hydroxysuccinimide ester (SPDB), and N-succinimidyl (4-iodo-acetyl) aminobenzoate (SIAB).

10. The conjugate of claim 8,
wherein the fluorescent dye is one or more selected from a near-infrared fluorescent dye, fluorescein type, rhodamine type, Alexa Fluor, 4,4-difluoro-4-boro-3a,4a-diaza-S-indacene (BODIPY), Texas Red, dansyl, Lissamine, cyanine (Cy), and phycoerythrin.

11. The conjugate of claim 8,
wherein the cytotoxic agent is one or more selected from toxins, chemotherapeutic agents, drug moieties, antibiotics, and nucleases.

12. The conjugate of claim 8,
wherein the radioisotope is one or more selected from fluorine-18 (F-18), carbon-11 (C-11), carbon-14 (C-14), techthenium-99m (Tc-99m), Copper-64 (Cu-64), Copper-67 (Cu-67), Dysprosium-168 (Dy-168), Bismuth-213 (Bi-213), Samarium-153 (Sm-153), Strontium-89 (St-89), strontium-90 (St-90), erbium-169 (Er-169), phosphorus-32 (P-32), palladium-103 (Pd-103), rhenium-186 (Re-186), Rhenium-188 (Re-188), oxygen-15 (O-15), selenium-75 (Se-75), sodium-24 (Na-24), strontium-85 (Sr-85), lutetium-177 (Lu-177), Yttrium-90 (Y-90), Iodine-123 (I-123), Iodine-125 (I-125), Iodine-131 (I-131), Iridium-192 (Ir-192), iridium-196 (Ir-196), ytterbium-166 (Yb-166), indium-111 (In-111), xenon-133 (Xe-133), nitrogen-13 (N-13), calcium-47 (Ca-47), Cobalt-57 (Co-57), Cobalt-60 (Co-60), Chromium-51 (Cr-51), Krypton-81 (Kr-81), Potassium-42 (K-42) 42), Holmium-166 (Ho-166), Gallium-67 (Ga-67), Gallium-68 (Ga-68), Actinium-225 (Ac-225), Zirconium-89 (Zr-89), Lead-212 (Pb-212) and astatine-211 (At-211).

13. A pharmaceutical composition for diagnosis, or treatment of cancer comprising the peptide construct of claim 1 or 7.

14. A pharmaceutical composition for diagnosis, or treatment of cancer comprising the conjugate of claim 8.

15. The pharmaceutical composition of claim 13,
wherein the cancer expresses carbonic anhydrase IX.

16. The pharmaceutical composition of claim 13,
wherein the cancer is liver cancer, lung cancer, colorectal cancer, stomach cancer, breast cancer, colon carcinoma, bone cancer, pancreatic cancer, head and neck cancer, uterine cancer, ovarian cancer, rectal cancer, esophageal cancer, small intestine cancer, perianal cancer, fallopian tube carcinoma, endometrial carcinoma, cervical carcinoma, vaginal carcinoma, vulvar carcinoma, prostate cancer, biliary tract cancer, bladder cancer, kidney cancer, ureteric cancer, renal cell carcinoma, renal pelvic carcinoma, melanoma, thyroid cancer, astrocytoma or glioblastoma.

17. The pharmaceutical composition of claim 14,
wherein the cancer expresses carbonic anhydrase IX.

18. The pharmaceutical composition of claim 14,
wherein the cancer is liver cancer, lung cancer, colorectal cancer, stomach cancer, breast cancer, colon carcinoma, bone cancer, pancreatic cancer, head and neck cancer, uterine cancer, ovarian cancer, rectal cancer, esophageal cancer, small intestine cancer, perianal cancer, fallopian tube carcinoma, endometrial carcinoma, cervical carcinoma, vaginal carcinoma, vulvar carcinoma, prostate cancer, biliary tract cancer, bladder cancer, kidney cancer, ureteric cancer, renal cell carcinoma, renal pelvic carcinoma, melanoma, thyroid cancer, astrocytoma or glioblastoma.

* * * * *